(12) United States Patent
Pertsinidis

(10) Patent No.: US 12,332,177 B2
(45) Date of Patent: Jun. 17, 2025

(54) 3D INTERFEROMETRIC LATTICE LIGHT-SHEET IMAGING

(71) Applicant: MEMORIAL SLOAN KETTERING CANCER CENTER, New York, NY (US)

(72) Inventor: Alexandros Pertsinidis, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 305 days.

(21) Appl. No.: 18/022,965

(22) PCT Filed: Aug. 24, 2021

(86) PCT No.: PCT/US2021/047302
§ 371 (c)(1),
(2) Date: Feb. 23, 2023

(87) PCT Pub. No.: WO2022/046738
PCT Pub. Date: Mar. 3, 2022

(65) Prior Publication Data
US 2023/0333018 A1 Oct. 19, 2023

Related U.S. Application Data

(60) Provisional application No. 63/070,125, filed on Aug. 25, 2020.

(51) Int. Cl.
*G02B 21/22* (2006.01)
*G01N 21/64* (2006.01)
(Continued)

(52) U.S. Cl.
CPC ......... *G01N 21/6458* (2013.01); *G02B 21/08* (2013.01); *G02B 21/16* (2013.01)

(58) Field of Classification Search
CPC ............... G01N 1/00; G01N 2001/002; G01N 2021/6463; G01N 2021/6478;
(Continued)

(56) References Cited

U.S. PATENT DOCUMENTS

2016/0004058 A1 1/2016 Wayne
2017/0251191 A1* 8/2017 Huang ................... G02B 21/22

FOREIGN PATENT DOCUMENTS

WO WO-2018/106678 A1 6/2018

OTHER PUBLICATIONS

International Search Report and Written Opinion issued for PCT/US2021/047302 dated Dec. 28, 2021 (9 pages).
(Continued)

*Primary Examiner* — Don K Wong
(74) *Attorney, Agent, or Firm* — Foley & Lardner LLP

(57) ABSTRACT

Disclosed is three-dimensional interferometric lattice light-sheet (3D-iLLS) imaging, an approach that overcomes limitations of prior microscopy techniques. 3D-iLLS provides, by virtue of selective-plane illumination (SPIM), low light levels and photobleaching, while providing increased background suppression and significantly improved volumetric imaging/sectioning capabilities through 4Pi interferometry. An example setup demonstrated 3D-iLLS with axial resolution and single-particle localization precision down to <100 nm (FWHM) and <10 nm (1σ), respectively. 3D-iLLS enables a fuller elucidation of sub-cellular phenomena by enhanced 4D resolution and improved SNR during live imaging.

20 Claims, 35 Drawing Sheets

(51) Int. Cl.
*G02B 21/08* (2006.01)
*G02B 21/16* (2006.01)

(58) Field of Classification Search
CPC ....... G01N 2021/6476; G01N 21/6489; G01N 2021/6491; G02B 1/00; G02B 5/00; G02B 5/005; G02B 5/08; G02B 5/0808; G02B 5/20; G02B 6/0001; G02B 6/0011; G02B 6/0013; G02B 6/0033; G02B 21/00; G02B 21/004; G02B 21/0096; G02B 21/06; G02B 21/18; G02B 21/32; G02B 26/00; G02B 26/001; G02B 27/10; G02B 27/18; G02B 30/00; G02B 30/50; G02B 30/60; G02F 1/133603; G02F 1/133604

See application file for complete search history.

(56) References Cited

OTHER PUBLICATIONS

Invitation to Pay Additional Fees issued for PCT/US2021/047302 dated Oct. 27, 2021 (2 pages).

\* cited by examiner

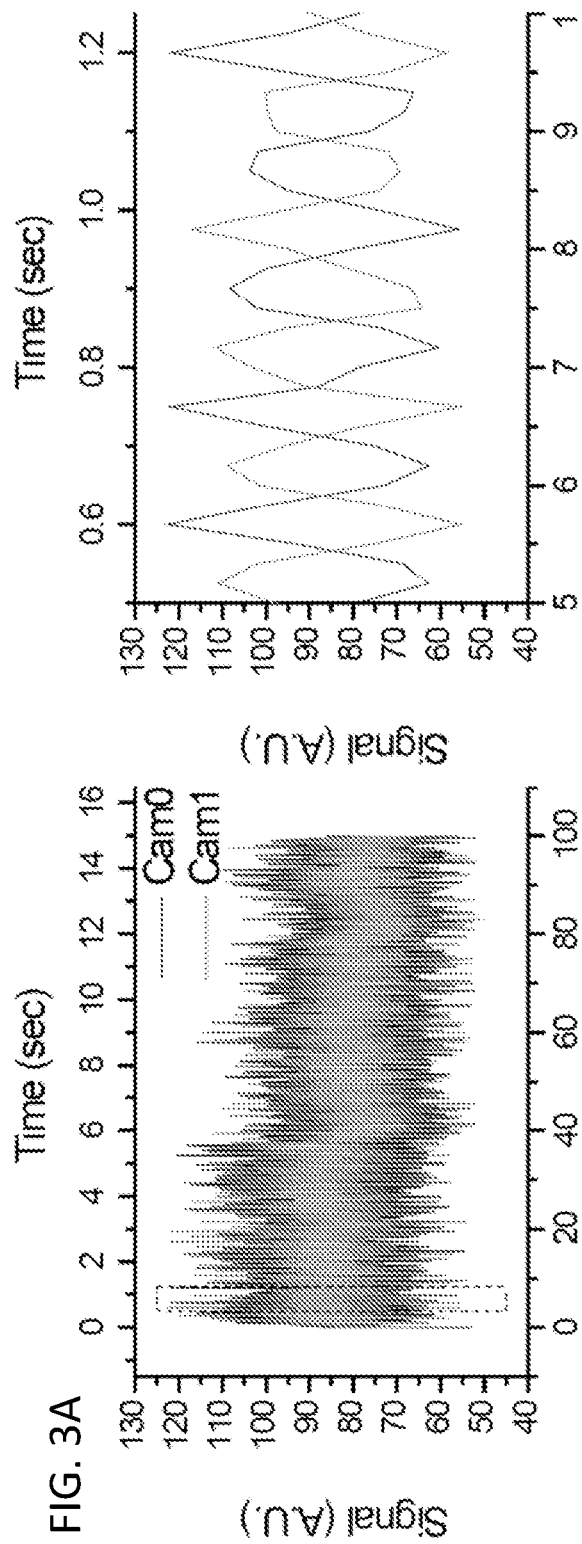
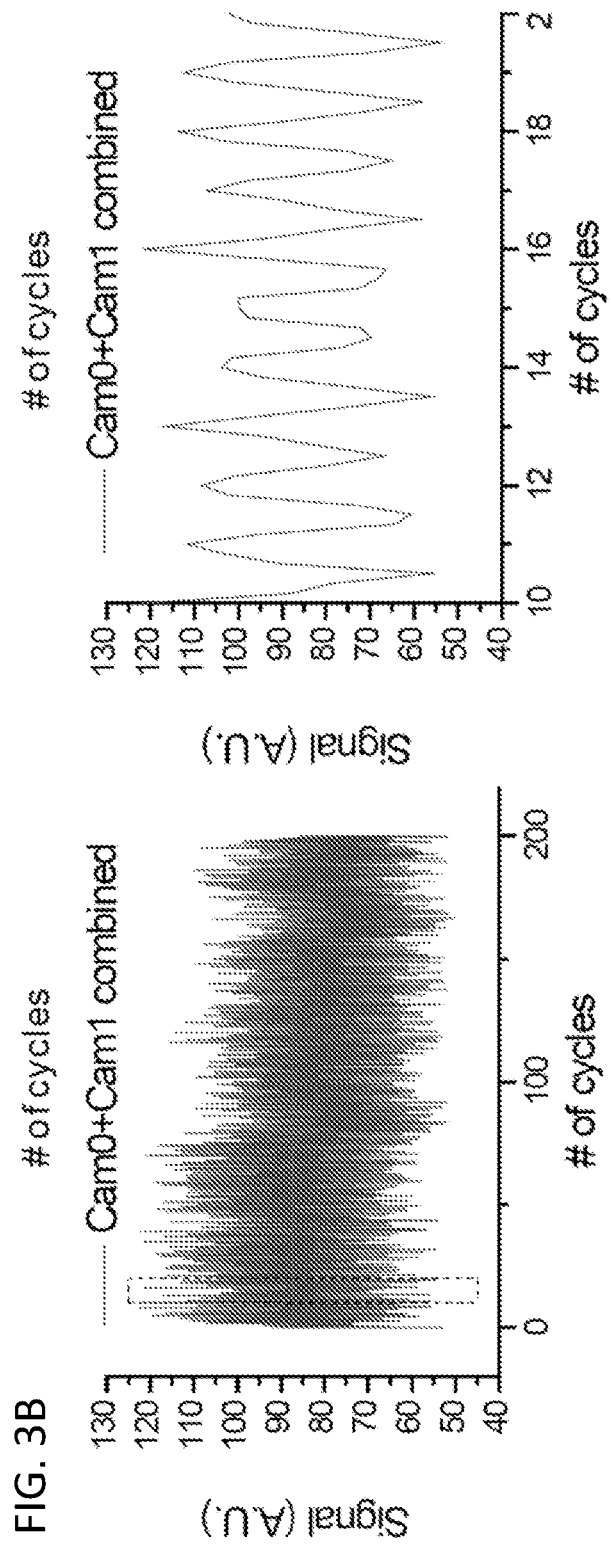
FIG. 3A
FIG. 3B

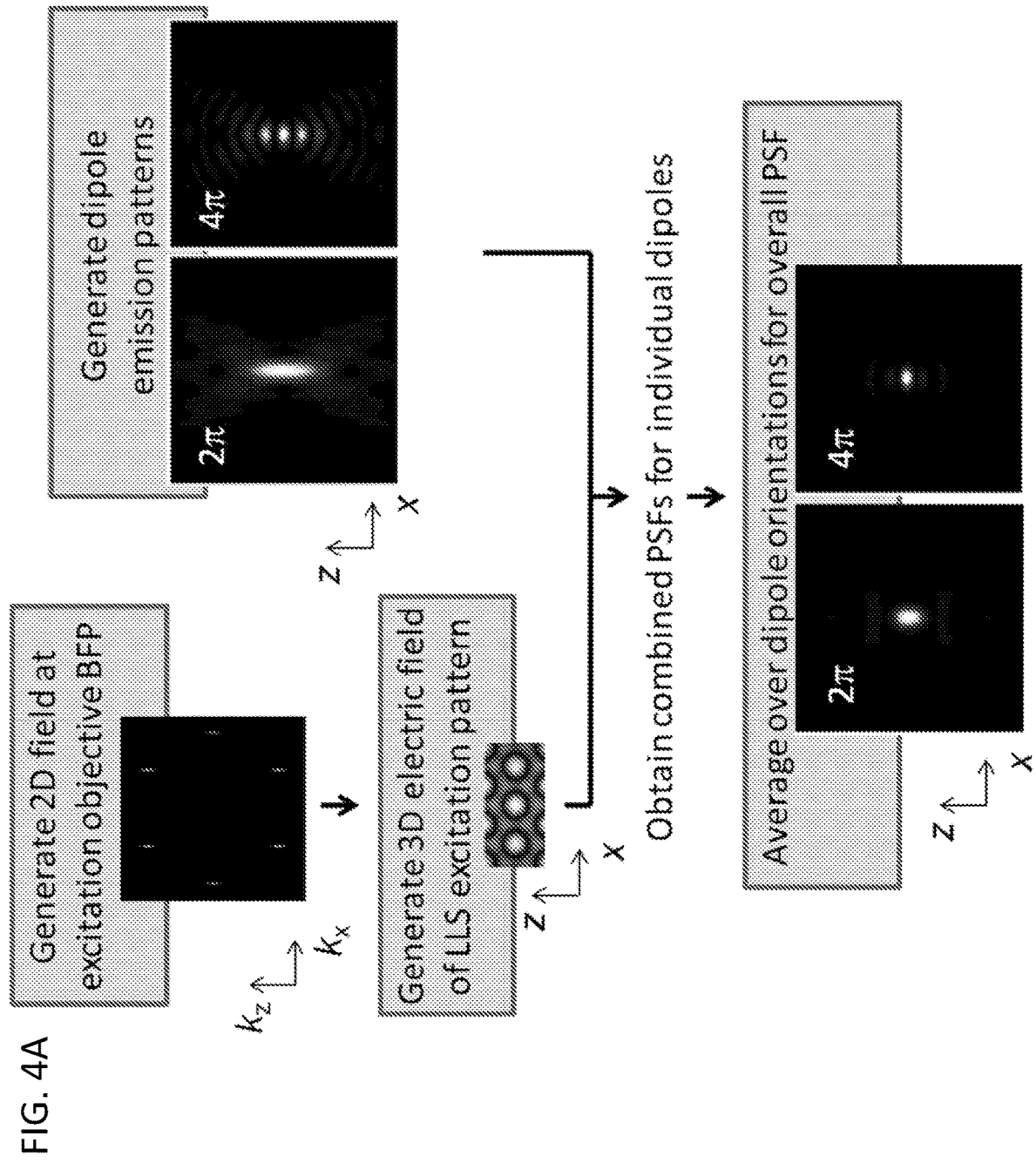

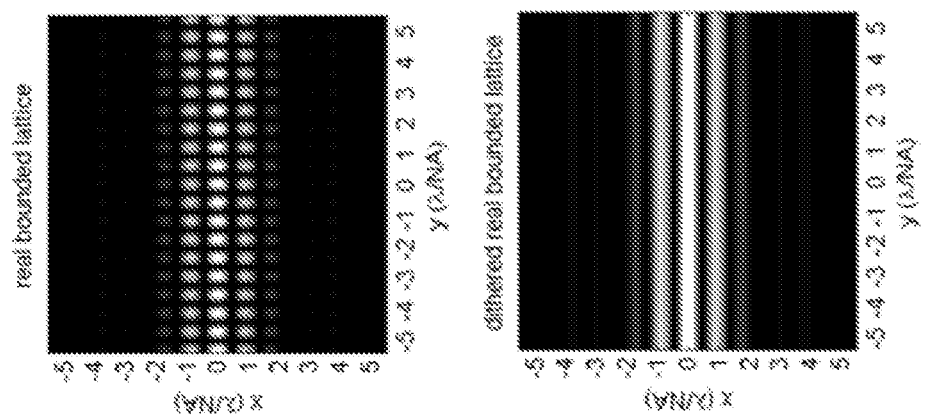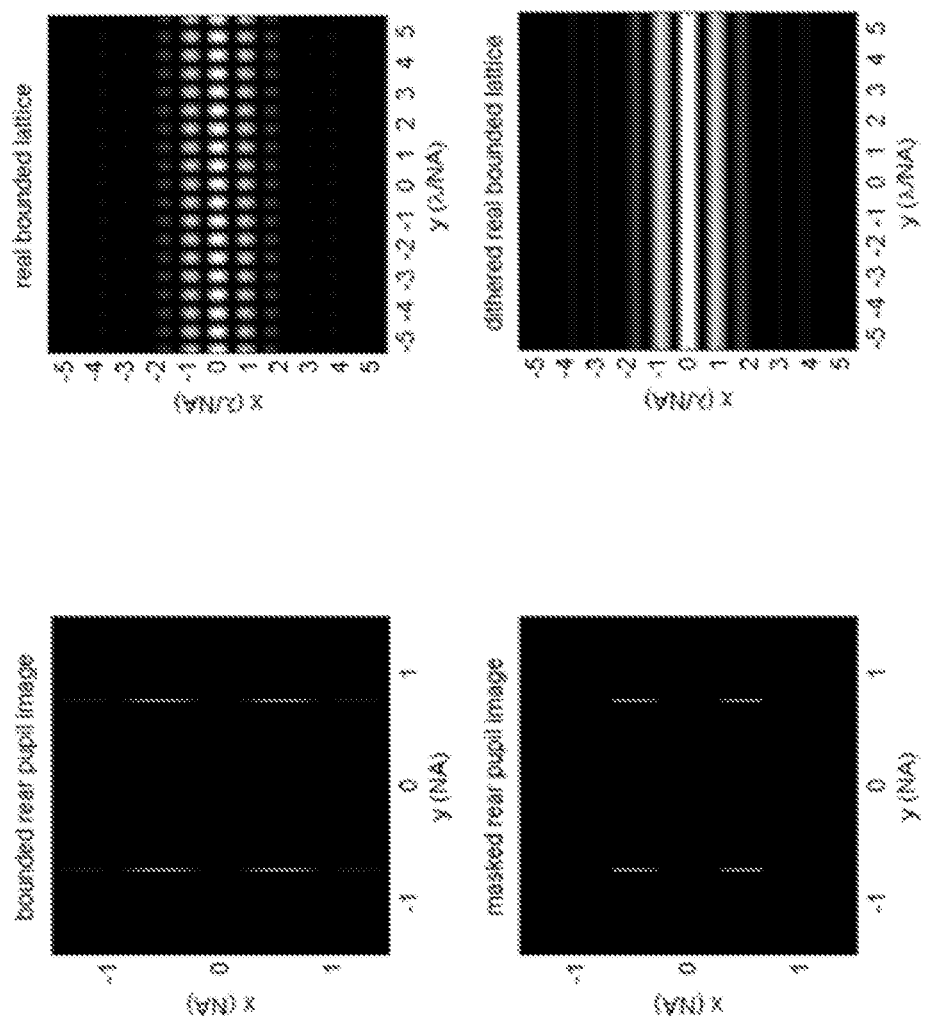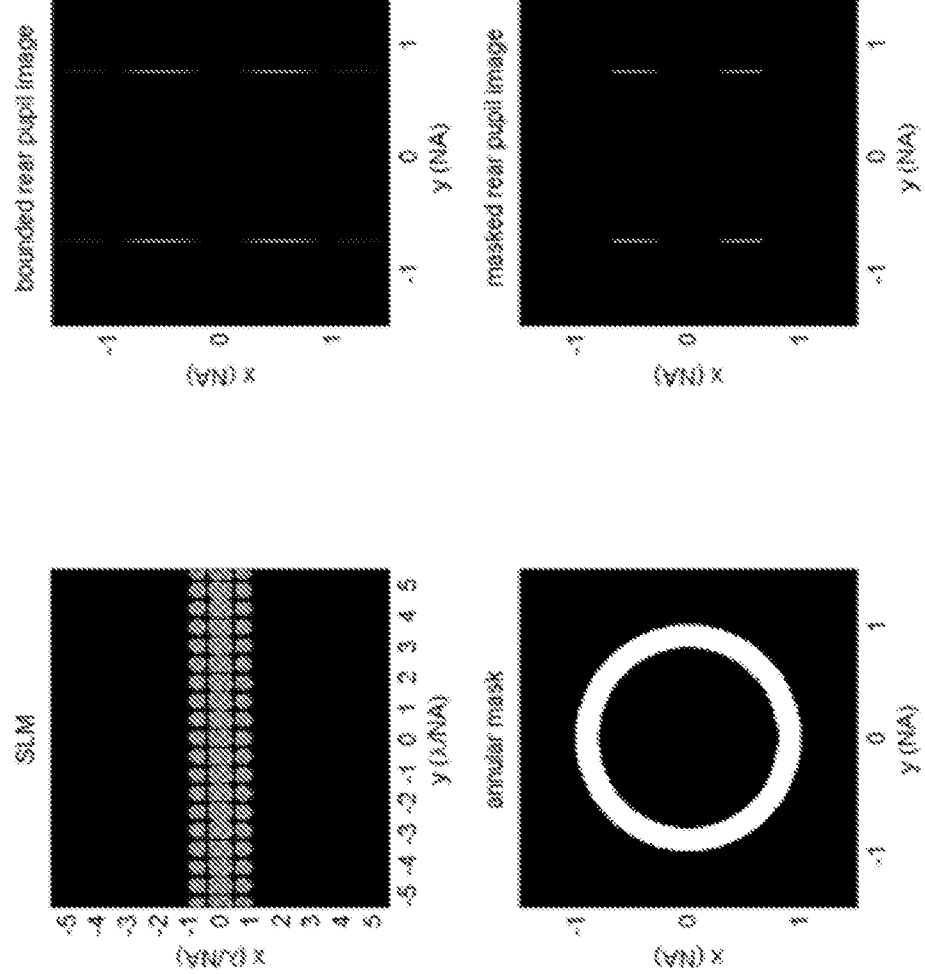

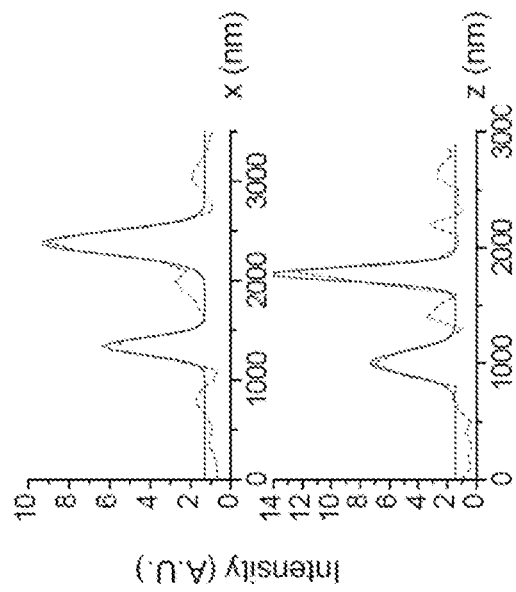
FIG. 13A
FIG. 13B
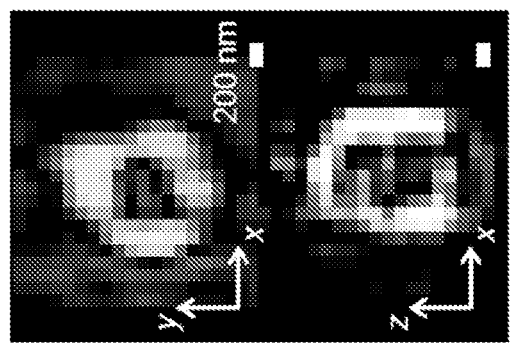
FIG. 13C
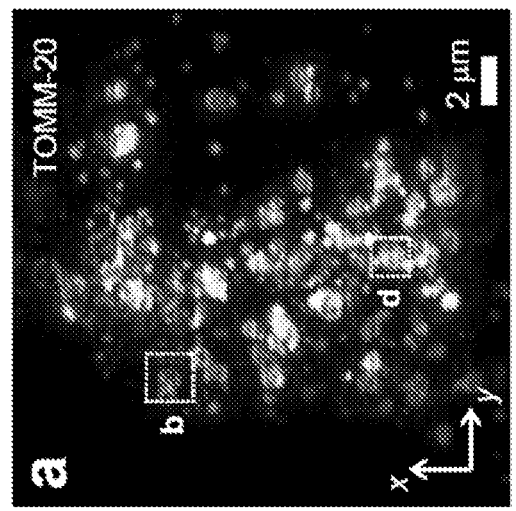
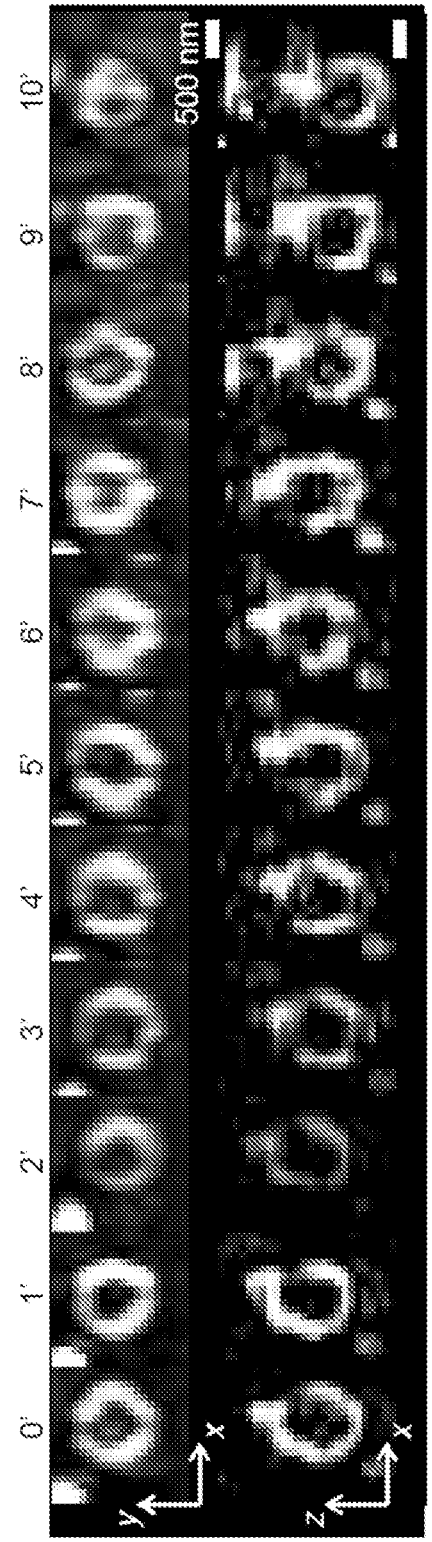
FIG. 13D

3D INTERFEROMETRIC LATTICE LIGHT-SHEET IMAGING

CROSS-REFERENCE TO RELATED APPLICATIONS

This application is a 371 U.S. national phase application of PCT/US2021/047302 filed Aug. 24, 2021, which claims the benefit of and priority to U.S. Provisional Patent Application No. 63/070,125, filed Aug. 25, 2020, the entire contents of each of which is incorporated herein by reference.

STATEMENT REGARDING FEDERALLY SPONSORED RESEARCH

This invention was made with government support under CA008748 and 1DP2GM105443-01, 1R01GM135545-01, and 1R21GM134342-01 awarded by the National Institutes of Health. The government has certain rights in the invention.

TECHNICAL FIELD

The present disclosure is related to systems and methods for three-dimensional fluorescence imaging.

BACKGROUND

Visualizing cellular structure and function requires live-cell imaging with high spatio-temporal resolution and high detection sensitivity. However, extracting high-resolution 4D information from weak and dynamic fluorescence signals in live cells remains challenging.

SUMMARY

In one aspect, various embodiments of the disclosure relate to a microscopic imaging system. The system may comprise a light detection apparatus comprising two opposed detection lenses. The light detection apparatus may be configured to detect fluorescence beams emitted from a sample. The system may comprise a light emission apparatus comprising an excitation lens configured to deliver excitation that is orthogonal to the two opposed detection lenses.

In various embodiments, the light detection apparatus may be configured to combine the detected fluorescence beams.

In various embodiments, the light detection apparatus may comprise an interferometer configured to combine light received via the two opposed detection lenses.

In various embodiments, the system may comprising a beam splitter. The beam splitter may be arranged such that fluorescence beams from the two detection lenses interfere at the beam splitter.

In various embodiments, the beam splitter may be a non-polarizing beam splitter.

In various embodiments, the light detection apparatus may comprise a first camera arranged to detect light exiting the beam splitter in a first direction, and a second camera arranged to detect light exiting the beam splitter in a second direction.

In various embodiments, the excitation lens may be configured to deliver lattice light-sheet (LLS) excitation to the sample from which fluorescence beams are detected via the two opposed detection lenses.

In various embodiments, selective plane illumination for an excitation path may comprise a Bessel beam. In various embodiments, selective plane illumination for an excitation path may comprise an Airy beam. In various embodiments, selective plane illumination for an excitation path may comprise a Bessel beam array. In various embodiments, selective plane illumination for an excitation path may comprise a Gaussian light sheet. In various embodiments, selective plane illumination for an excitation path may comprise light-sheet generation using field synthesis. In various embodiments, selective plane illumination for an excitation path may comprise at least one of, or any combination of, a Bessel beam, an Airy beam, a Bessel beam array, a Gaussian light sheet, or light-sheet generation using field synthesis.

In various embodiments, an excitation path may be orthogonal to an optical axis of the two opposed detection lenses in a 4Pi interferometric arrangement.

In various embodiments, an optical axis of the excitation lens may coincide with a focal plane of the two opposed detection lenses.

In various embodiments, the light emission apparatus may be configured to deliver selective plane illumination of the sample.

In various embodiments, the light emission apparatus is configured to deliver structured illumination of the sample.

In various embodiments, the system may comprise additional excitation lenses approximately orthogonal to the optical axis of the two opposed detection lenses.

In various embodiments, the system may comprise a plurality of additional excitation lenses, each additional excitation lens being positioned at an angle between 75 and 105 degrees with respect to the optical axis of the two opposed detection lenses.

In various embodiments, the system may be a three-dimensional interferometric lattice light-sheet (3D-iLLS) imaging system.

In various embodiments, the system is a three-dimensional interferometric lattice light-sheet with structured illumination microscopy (3D-iLLS-SIM) imaging system.

In another aspect, various embodiments of the disclosure relate to a computer-implemented microscopic imaging method. The method may comprise detecting, via a processor of a computing device, fluorescence beams emitted from a sample using a light detection apparatus comprising two opposed detection lenses. The method may comprise delivering, via the processor, excitation orthogonal to the two opposed detection lenses using a light emission apparatus comprising a plurality of excitation lenses.

In various embodiments, the method may comprise estimating, via the processor, an excitation point spread function (PSF) by computing an excitation electric field. The method may comprise determining, via the processor, a detection PSF by the electric field of single dipole emitters. The method may comprise combining, via the processor, excitation and dipole electric fields into a combined PSF. The method may comprise performing, via the processor, a near uniform orientation sampling and averaging the combined excitation-dipole electric fields of all sampled orientations to obtain a final combined PSF.

In various embodiments, the method may further comprise determining a 3D optical transfer function (OTF), the 3D OTF comprising information about recovering Fourier components of the sample.

In various embodiments, the method may further comprise obtaining an OTF from the PSF. The OTF may be obtained using a transform operation. The OTF may be obtained using a Fourier transform. The OTF may be obtained using a fast Fourier transform. The OTF may be obtained as OTF(k)=FFT(PSF(x)).

In various embodiments, the method may further comprise combining, via the processor, the fluorescence beams detected via the two detection lenses using an interferometer.

In various embodiments, delivering excitation may comprise delivering lattice light-sheet (LLS) excitation to the sample.

In various embodiments, an optical axis of the excitation lens may coincide with a focal plane of the two opposed detection lenses.

In various embodiments, the method may be a 3D interferometric lattice light-sheet (3D-iLLS) imaging method.

In another aspect, various embodiments of the disclosure relate to a fluorescence microscopy system. The system may comprise an objective lens arrangement having a first detection lens and a second detection lens opposing the first detection lens. The first and second detection lenses may be configured to detect fluorescence beams emitted by a target in a sample. The objective lens arrangement may have a plurality of excitation lenses arranged orthogonally to the first and second detection lenses such that an optical axis of the excitation lenses coincides with a focal plane of the first and second detection lenses.

In various embodiments, the system may comprise an interferometer for combining light received at the first and second detection lenses.

In various embodiments, the system may comprise a stage for receiving the sample to be imaged. The system may comprise a light source for delivering excitation beams to the sample to excite a target tagged with a fluorophore. The system may comprise a non-polarizing beam splitter arranged such that fluorescence beams from the two detection lenses interfere at the beam splitter.

Live-cell imaging with high spatiotemporal resolution and high detection sensitivity facilitates the study of the dynamics of cellular structure and function. However, extracting high-resolution 4D (3D space plus time) information from live cells remains challenging, because current methods are slow, require high peak excitation intensities or suffer from high out-of-focus background. Various potential embodiments involve 3D interferometric lattice light-sheet (3D-iLLS) imaging, a technique that requires low excitation light levels and provides high background suppression and substantially improved volumetric resolution by combining 4Pi interferometry with selective plane illumination. As demonstrated here, in various embodiments, 3D-iLLS may have an axial resolution and single-particle localization precision of 100 nm (FWHM) and <10 nm (1σ), respectively. The performance of 3D-iLLS has been illustrated in a range of systems: single messenger RNA molecules, nanoscale assemblies of transcription regulators in the nucleus, the microtubule cytoskeleton, and mitochondria organelles. The enhanced 4D resolution and increased signal-to-noise ratio (SNR) of 3D-iLLS will facilitate the analysis of biological process at the sub-cellular level.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1A, Schematic of experimental setup. ExL: excitation lens; EmL1,2: emission detection lenses. M1-7: mirrors. BS: non-polarizing beam-splitter. PZM: piezo-electric mount (phase shifter). Cam0,1: sCMOS detection cameras. TL: tube lens. F: emission filters. AOTF: Acousto-optic tunable filter. PBS: polarizing beam-splitter. SLM: spatial light modulator. AM: annular mask. FL: Fourier-transform lens. RL: relay lenses. Inset: geometry and coordinate system between lenses. FIG. 1B, Experimental calibration of the conventional LLS and 3D-iLLS PSFs, using 40 nm fluorescent beads. Excitation: 642 nm; emission filter: 700/70 m.

FIG. 2A, Comparison of 3D-iLLS vs. conventional LLS for imaging 24×PP7 mRNAs tagged with tdPCP-Halo-JF646 in fixed U-2 OS cells. xy and yz maximum projections projections. FIG. 2B, z profiles of single mRNAs (dashed lines) and 1D Gaussian peak fits (solid lines), showing increased axial resolution for 3D-iLLS vs. conventional LLS. FIG. 2C, 3D-iLLS image of Brd4 clusters in live mESCs. A single z slice from the raw data is shown. Asterisk marks a bead fiducial. Insets show individual z slices for the cluster indicated by the yellow arrow (3D-iLLS data, 20 nm z steps). FIG. 2D, z profiles (background-subtracted) of single Brd4 clusters imaged with conventional LLS and 3D-iLLS. Solid lines: non-linear least-squares fit to 1D Gaussian peaks for conventional LLS and to equations to the form $$B + \frac{A}{2}(1 \pm \cos(k(z-z_0) + \theta))e^{-\frac{(z-z_0)^2}{2\sigma_z^2}}$$

for 3D-iLLS, for Cam0 and Cam1 respectively. Data in c, d are raw data without deconvolution. Data in a, b are shown after deconvolution.

Figure 3D:
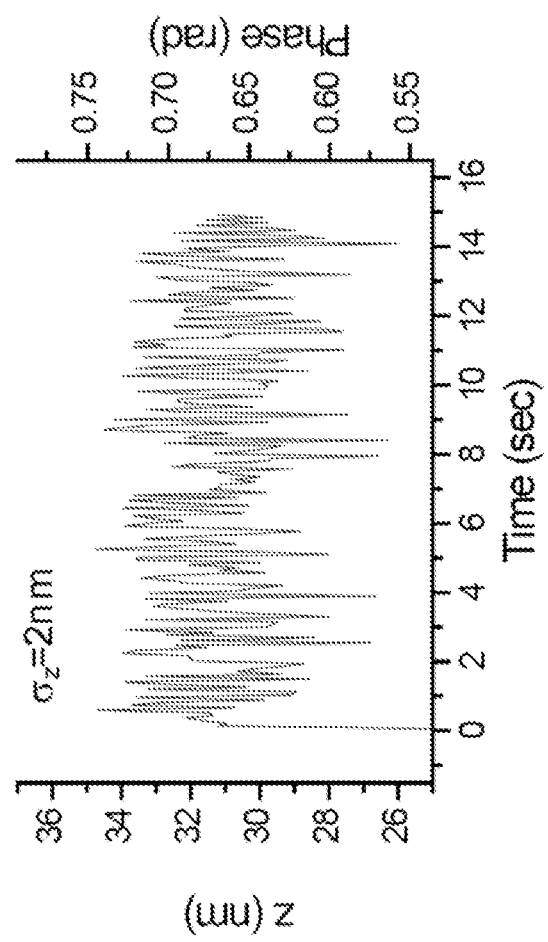
Figure 3C:
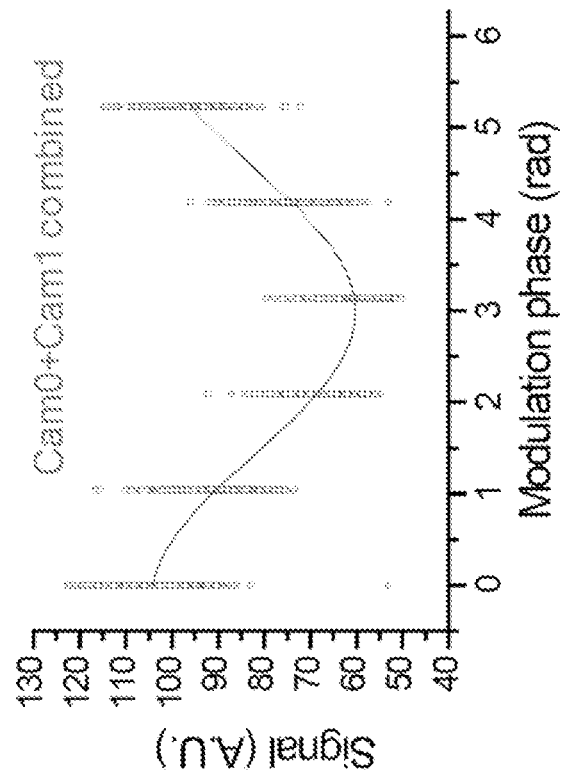
Figure 3E:
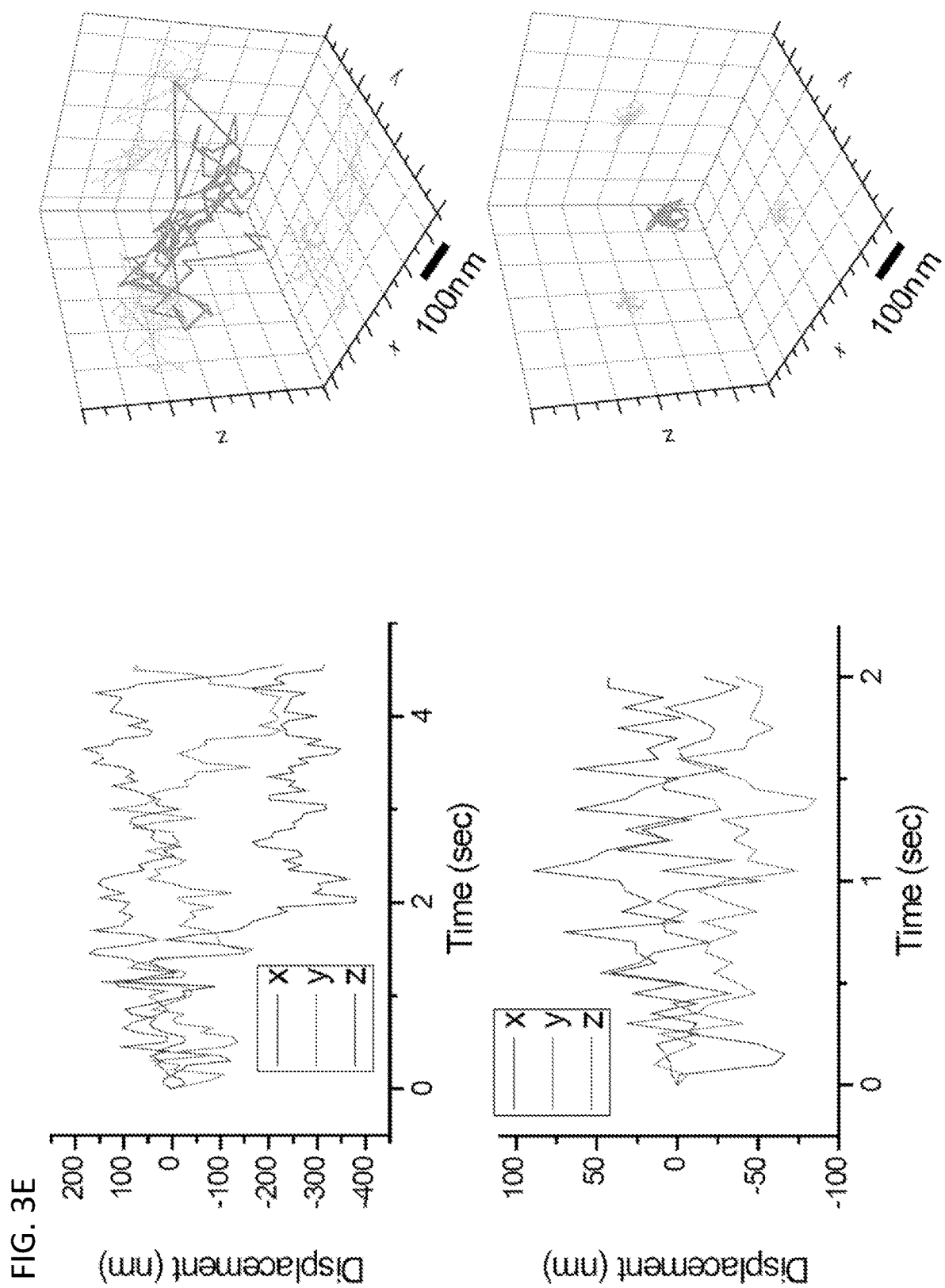

FIGS. 3A-3E illustrate 3D-iLLS and modulation interferometry enable improved axial localization and 3D single-particle tracking according to various potential embodiments. FIGS. 3A-3D, Axial localization performance with 3D-iLLS and 6-phase modulation interferometry. FIG. 3A, Signals from a 40 nm bead on Cameras 0 and 1, over 100 6-step modulation cycles. The piezoelectric phase shifter is stepped in 121.67 nm increments, corresponding to 0°, 60°, 120°, 180°, 240° and 300° relative phases. Right panel: zoom-in of the dotted region in the left panel, illustrating the anti-correlated signal modulation of Cam0 vs. Cam1. FIG. 3B, Signals from Cam0 and Cam1 are combined into a single modulation cycle, doubling the temporal resolution. Right panel: zoom-in of the dotted region in the left panel. FIG. 3C, Superposition of all 200 modulation cycles by collapsing the x axis in the interval [0–2π), showing excellent stability and reproducibility of the setup. Solid line: fit to a sine wave. FIG. 3D, Extracted phase and z coordinate, showing $\sigma_z \approx 2$ nm r.m.s. localization precision. FIG. 3E, 3D tracking of single mRNAs in live U-2 OS cells using 3D-iLLS and 4-phase modulation interferometry. The piezoelectric phase shifter is stepped in 182.5 nm increments, corresponding to 0°, 90°, 180° and 270° relative phases. Cam0 and cam1 signals are combined for extracting z coordinates.

Figure 4B:
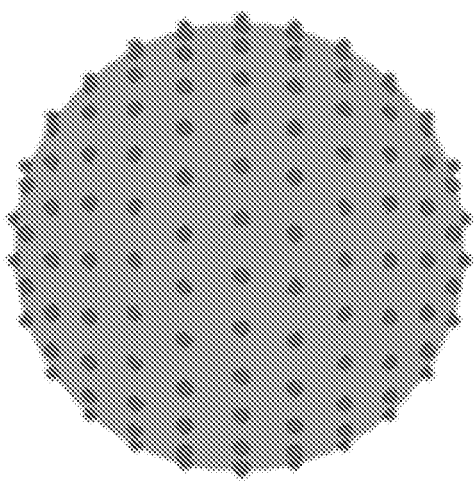

FIGS. 4A and 4B depict numerical calculation of 3D-iLLS PSFs according to various potential embodiments. FIG. 4A, Simulation pipeline. FIG. 4B, Near uniform sampling of 214 orientations viewed from three angles.

Figure 5A:
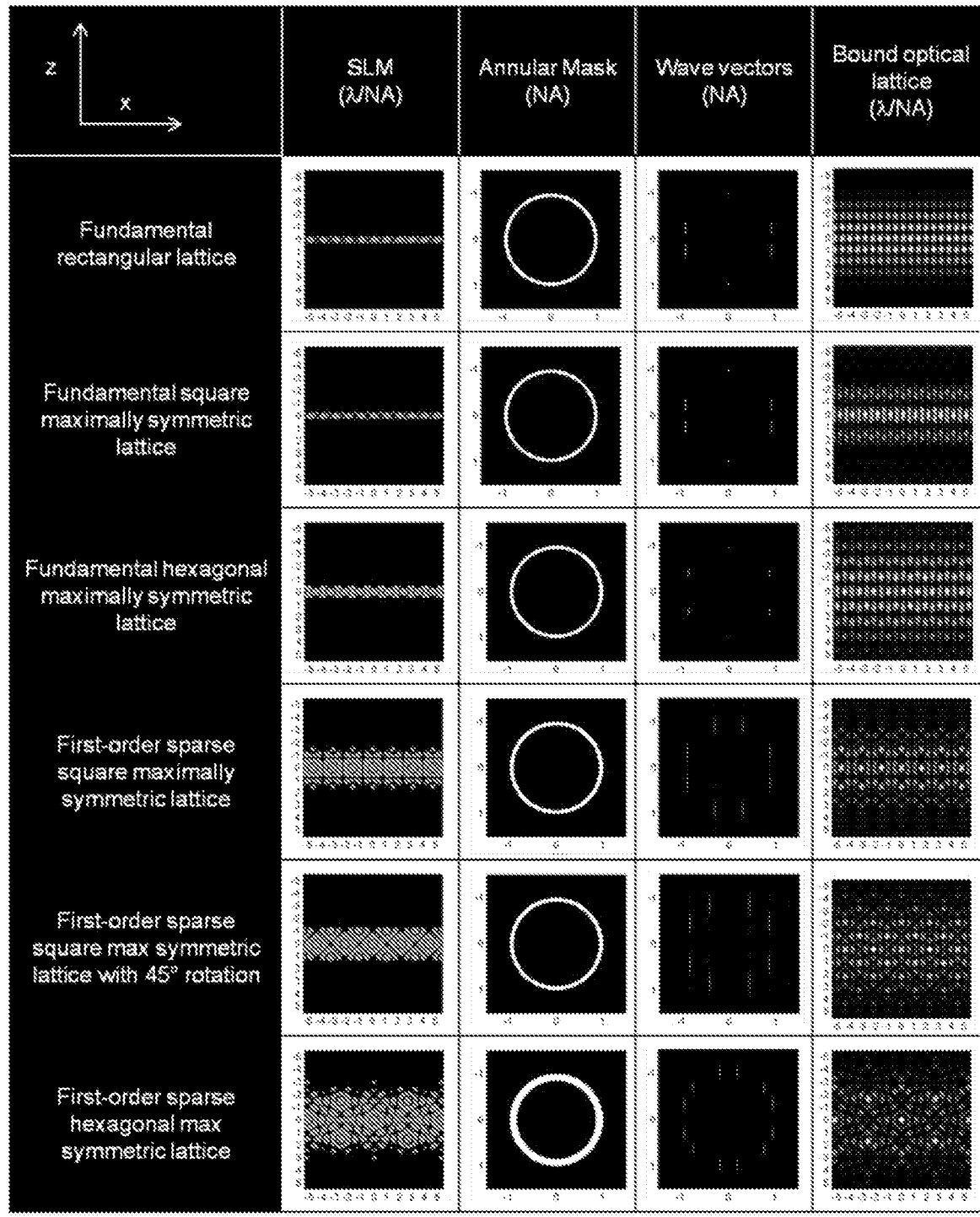
Figure 5B:
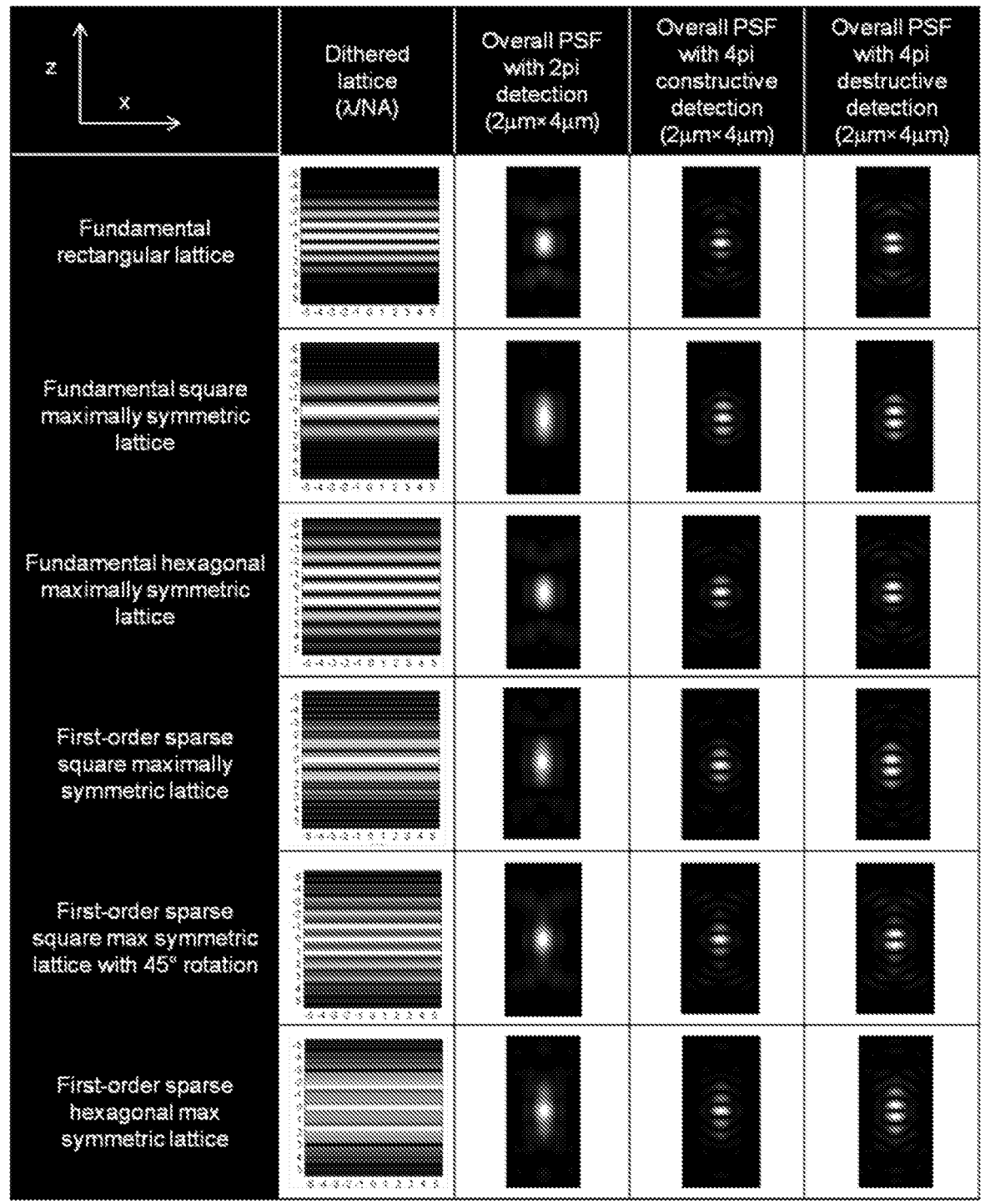

FIGS. 5A and 5B depict numerical 3D-iLLS PSFs for different excitation lattices and comparison with conventional LLS. Simulation parameters are given in Tables 1 and 2.

Figure 6B:
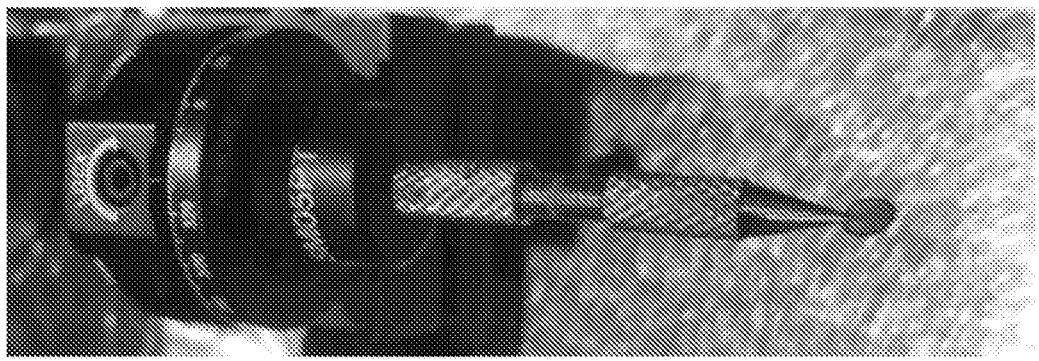
Figure 6A:
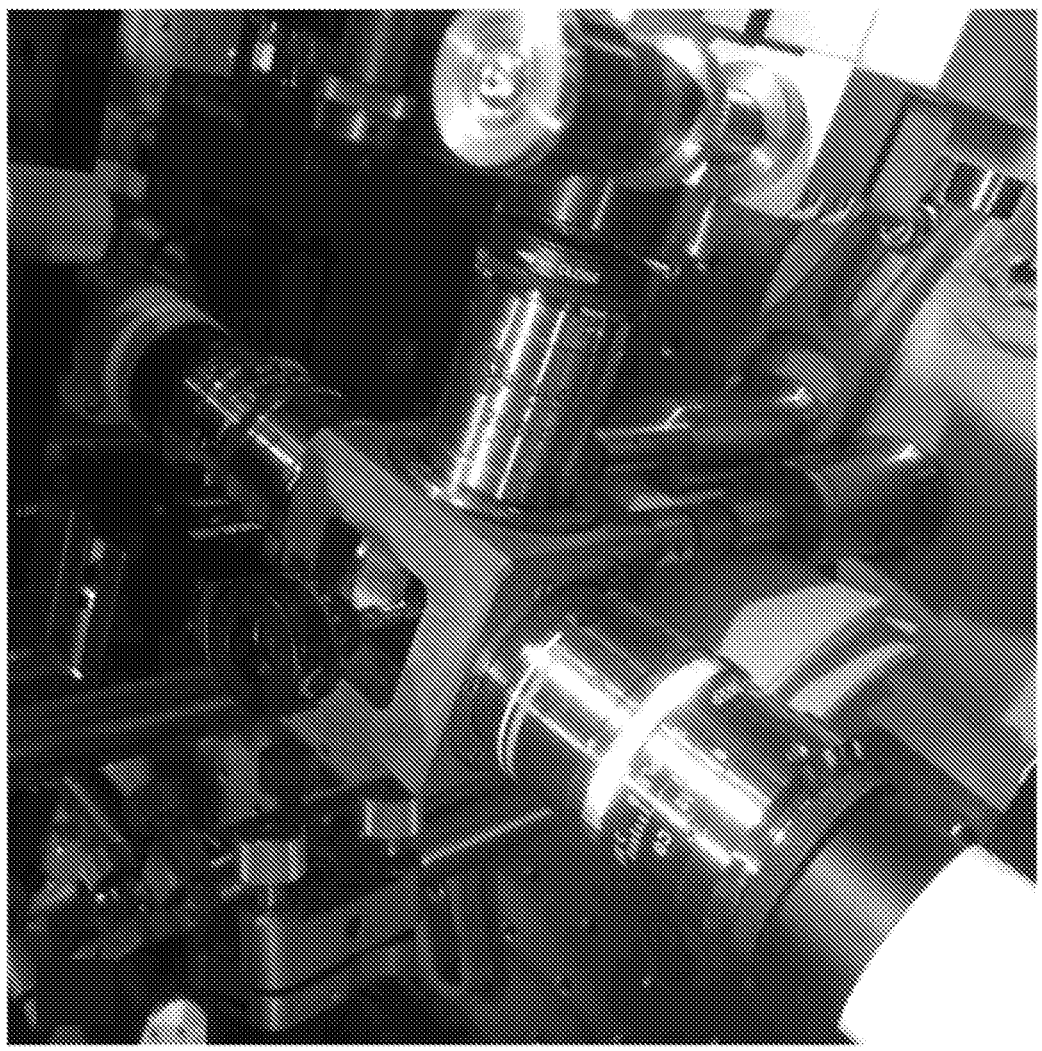
Figure 6C:
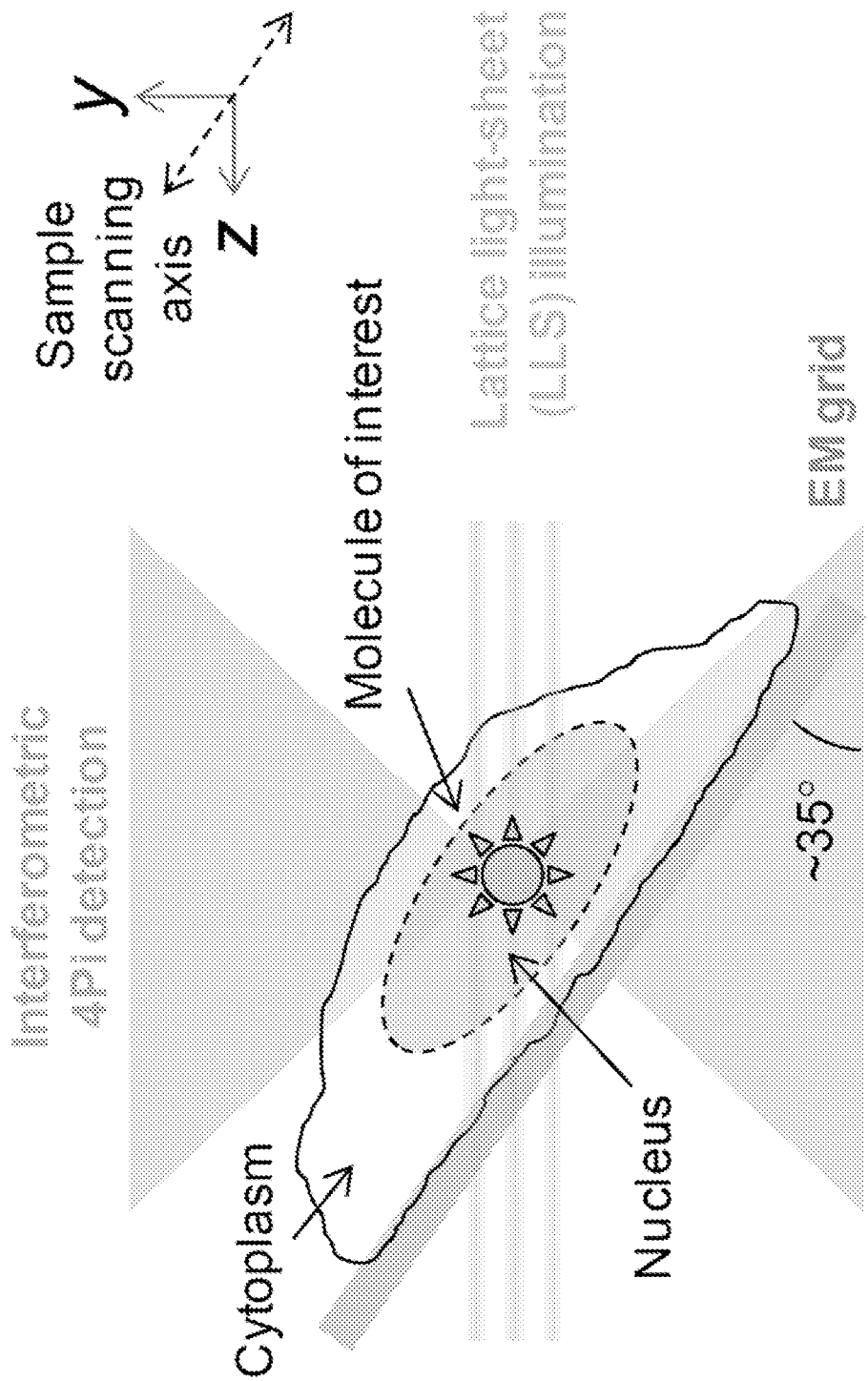

FIGS. 6A-6C depict three-objective 3D-iLLS configuration, liquid sample cell, sample holder and sample mounting geometry according to various potential embodiments. FIG. 6A, photograph of 3D-iLLS setup, highlighting the three-objective configuration, the liquid sample cell and the top-immersion sample holder. FIG. 6B, photograph of the pincher-grip sample holder with mounted EM grid. FIG. 6C, sample mounting geometry.

Figure 7A:
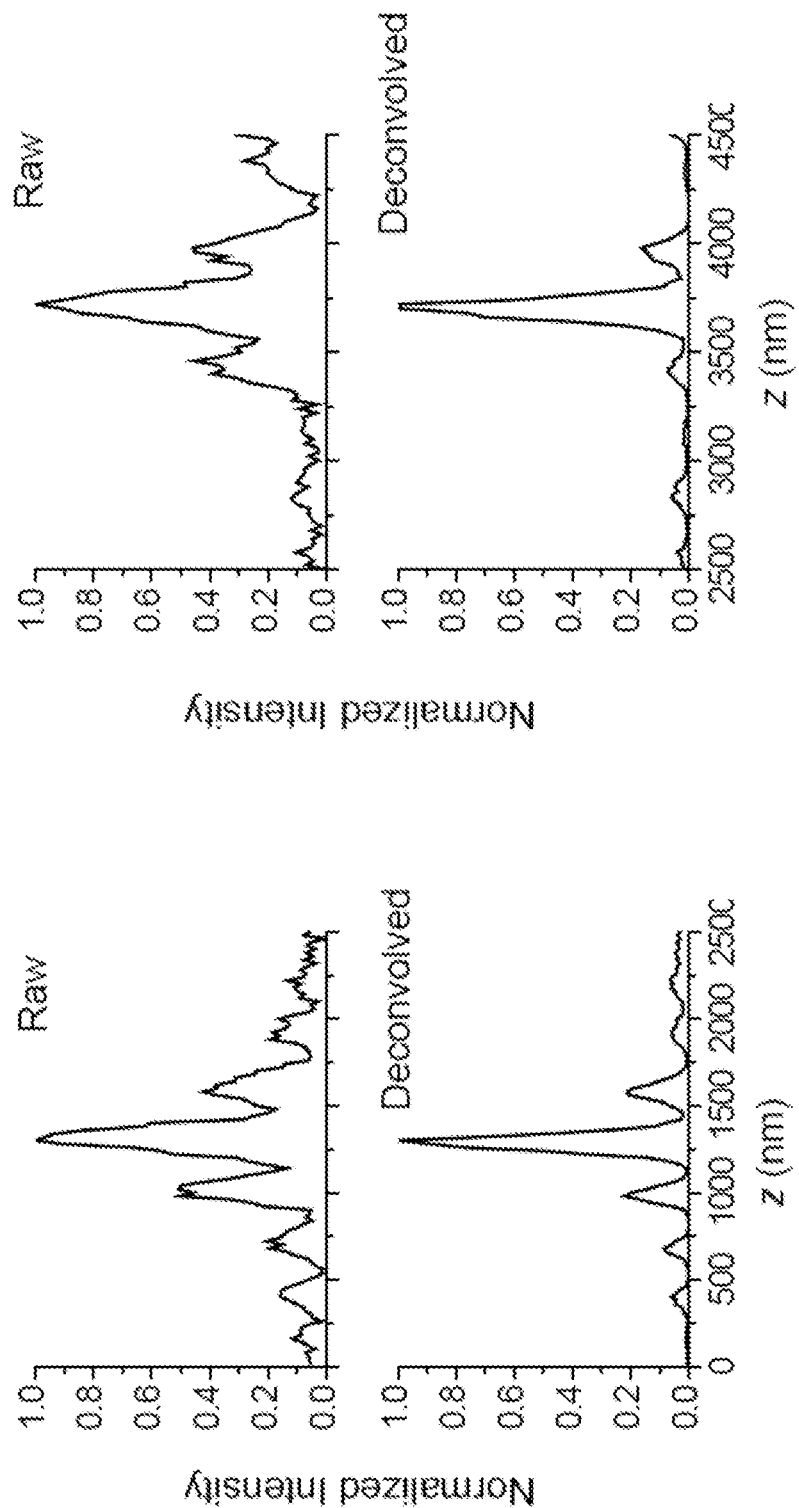

FIG. 7A depicts Reduction of side-lobes in 3D-iLLS imaging using deconvolution according to various potential embodiments. Top: raw z profiles of two individual mRNA molecules. Bottom: z profiles of the same mRNAs, after 10 iterations of the Richardson-Lucy deconvolution algorithm with an experimental PSF.

Figure 7H:
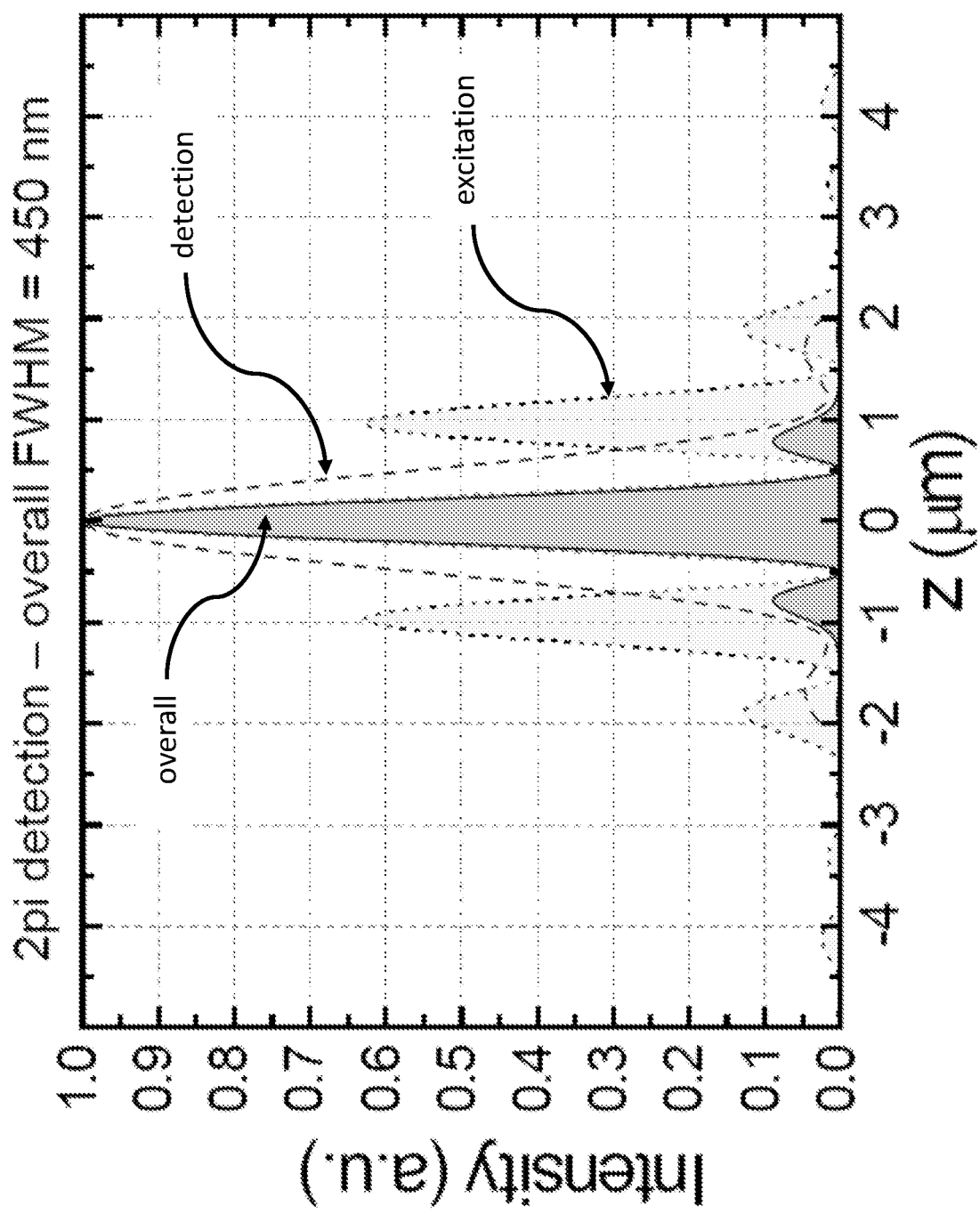
Figure 7I:
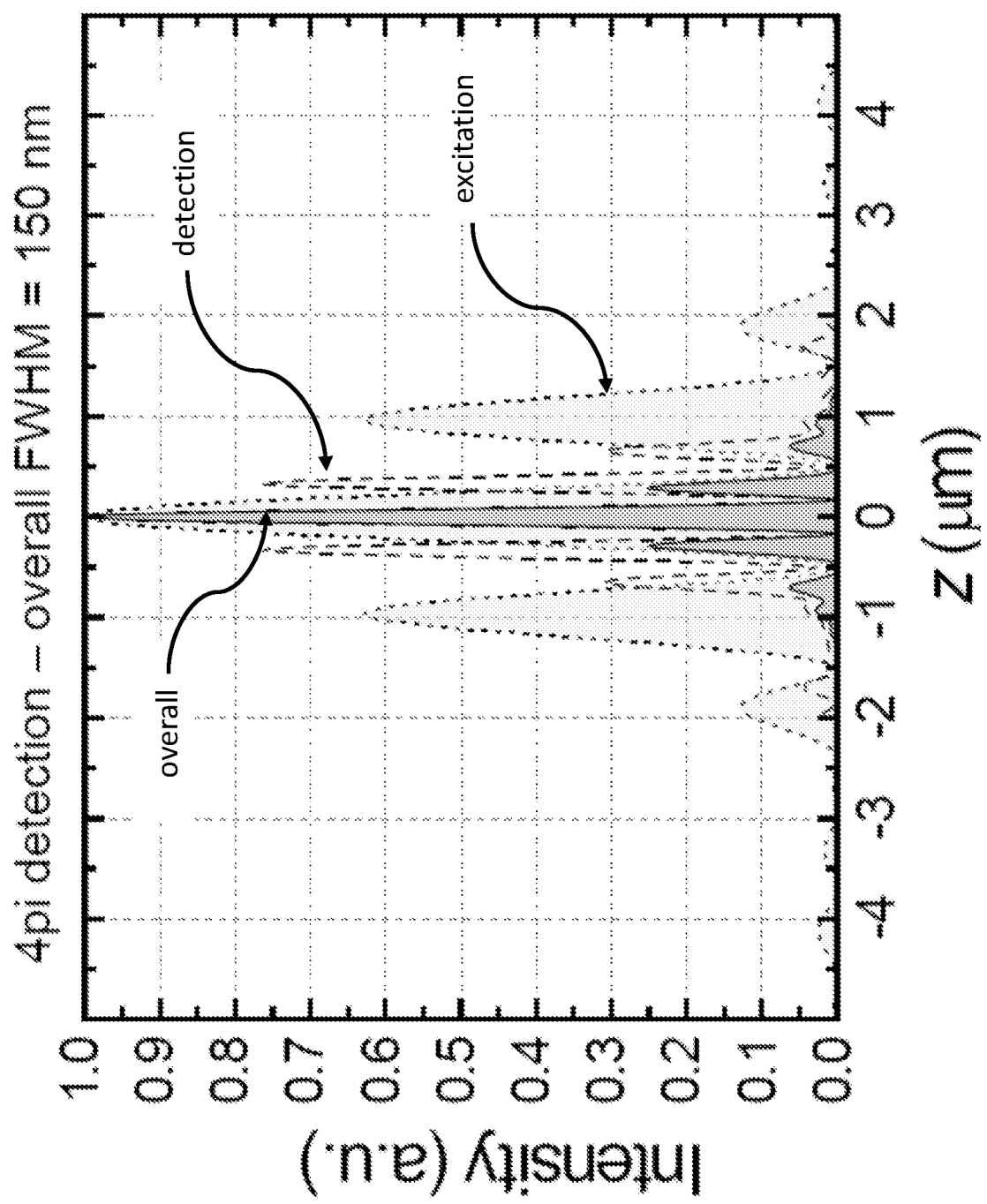

FIGS. 7B-7I depict optimized 3D-iLLS PSF based on a fundamental rectangular 2D bound lattice according to various potential embodiments. FIG. 7B, SLM pattern and FIG. 7C, corresponding intensity at rear pupil. FIG. 7D, Annular mask. FIG. 7E, Intensity at rear pupil after annular mask. FIG. 7F, Resulting 2D bound lattice in real space and FIG. 7G, corresponding dithered lattice excitation pattern. FIG. 7H, axial profile of conventional LLS PSFs. FIG. 7I, Axial profile of 3D-iLLS PSFs. Cyan: "excitation;" yellow: "detection;" gray: "overall."

Figure 8A:
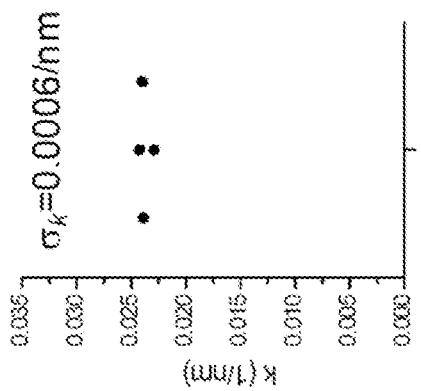
Figure 8B:
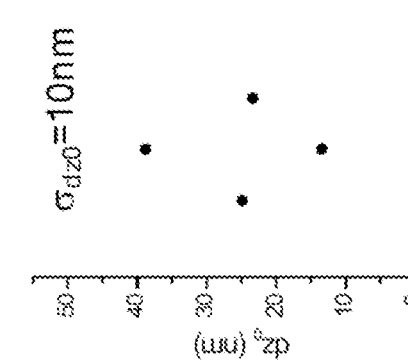
Figure 8C:
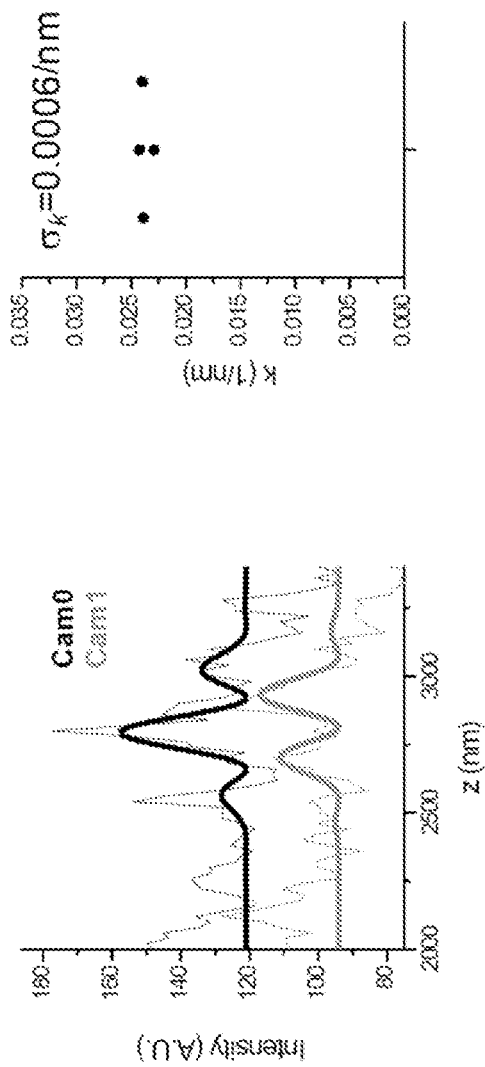
Figure 8D:
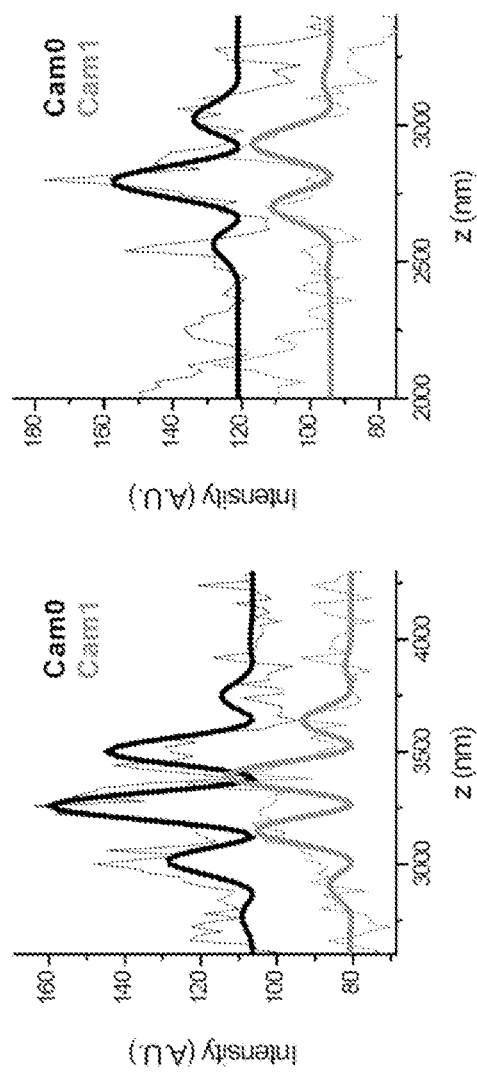
Figure 8E:
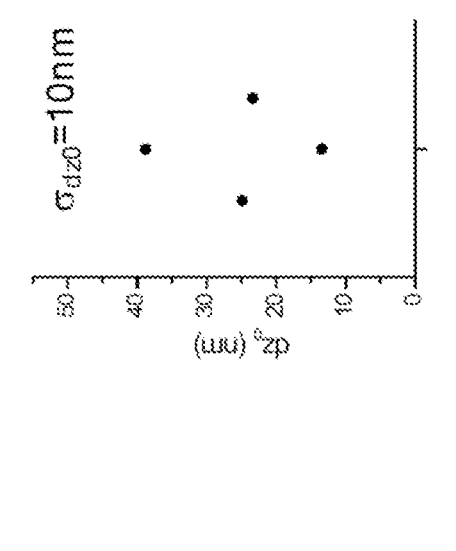
Figure 8F:
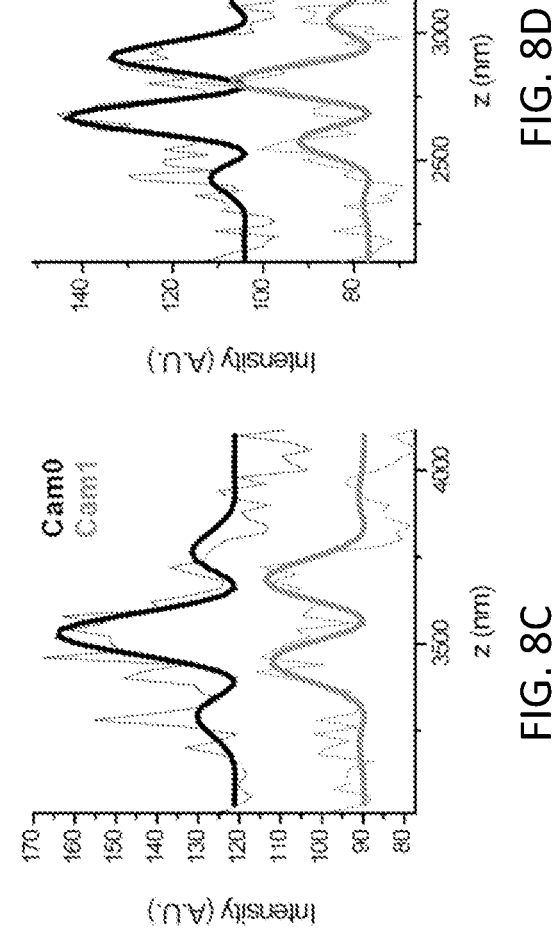

FIGS. 8A-8F depict localization of Brd4 clusters in reconstructed 3D-iLLS images according to various potential embodiments. FIGS. 8A-8D, axial profiles of individual Brd4 clusters. Thick lines show non-linear least-squares fits to equations of the form $$B + \frac{A}{2}(1 \pm \cos(k(z-z_0)+\theta))e^{-\frac{(z-z_0)^2}{2\sigma_z^2}}$$

for Cam0 and Cam1 respectively. Global fitting is performed, with shared k, θ and $\sigma_z$ parameters. We obtain two separate localization measurements of the parameter $z_0$ that indicates the center position of the cluster, estimated independently from Cam0 and Cam1. FIG. 8E, oscillation wavevector k is 0.02375±0.00059 $nm^{-1}$ (mean±SD), indicating a relative error $\sigma_k/k$ of ≈2.5%. FIG. 8F, the center position $z_0$ shows a systematic offset between the two cameras of $dz_0$=25 nm and an r.m.s localization error $\sigma_{dz0}$=10 nm. These systematic and random errors relative to the oscillation period (2π/k=265 nm) are ≈9% and ≈4% respectively.

Figure 9A:
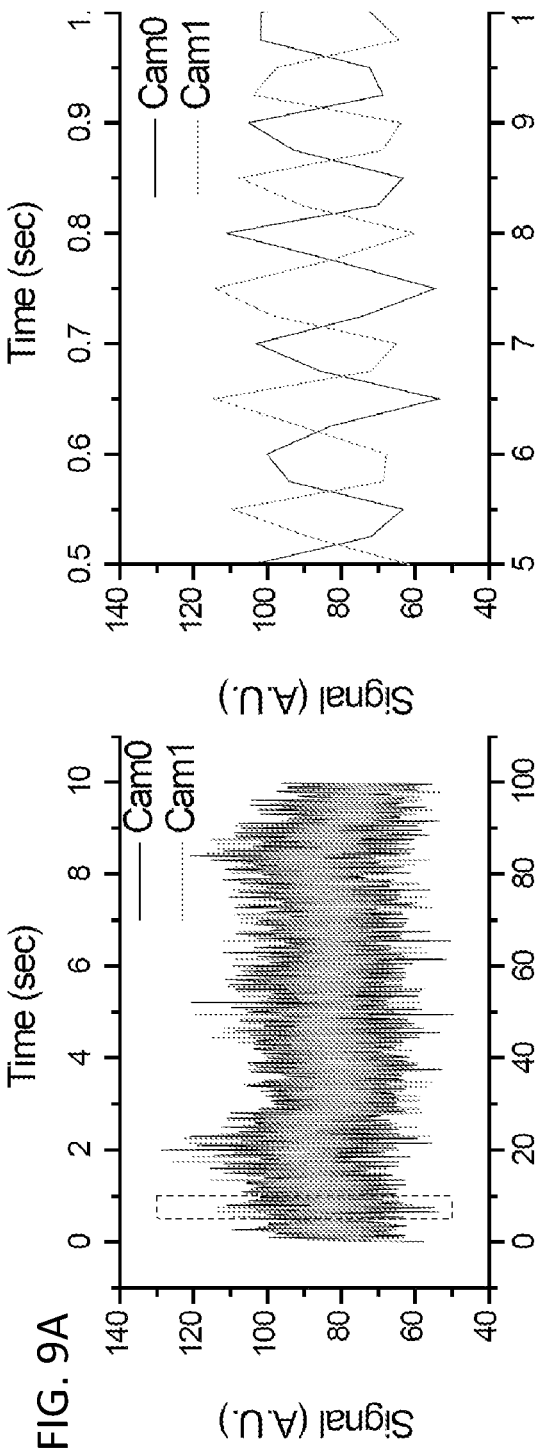
Figure 9B:
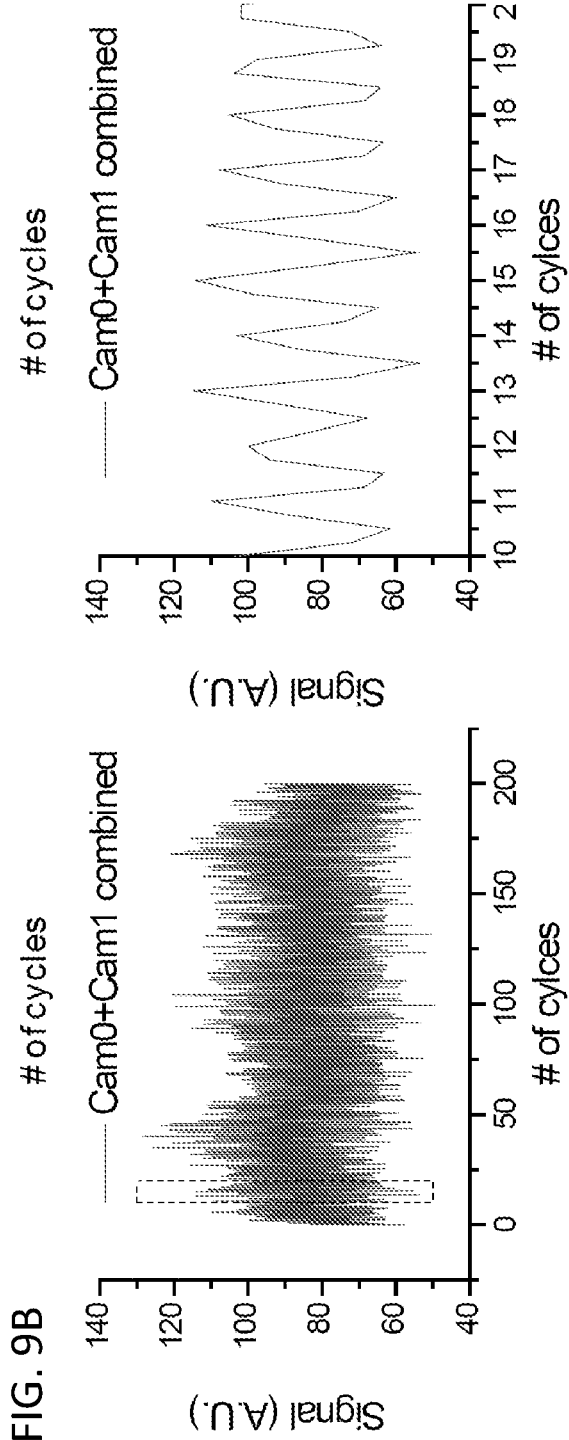
Figures 9C, 9D:
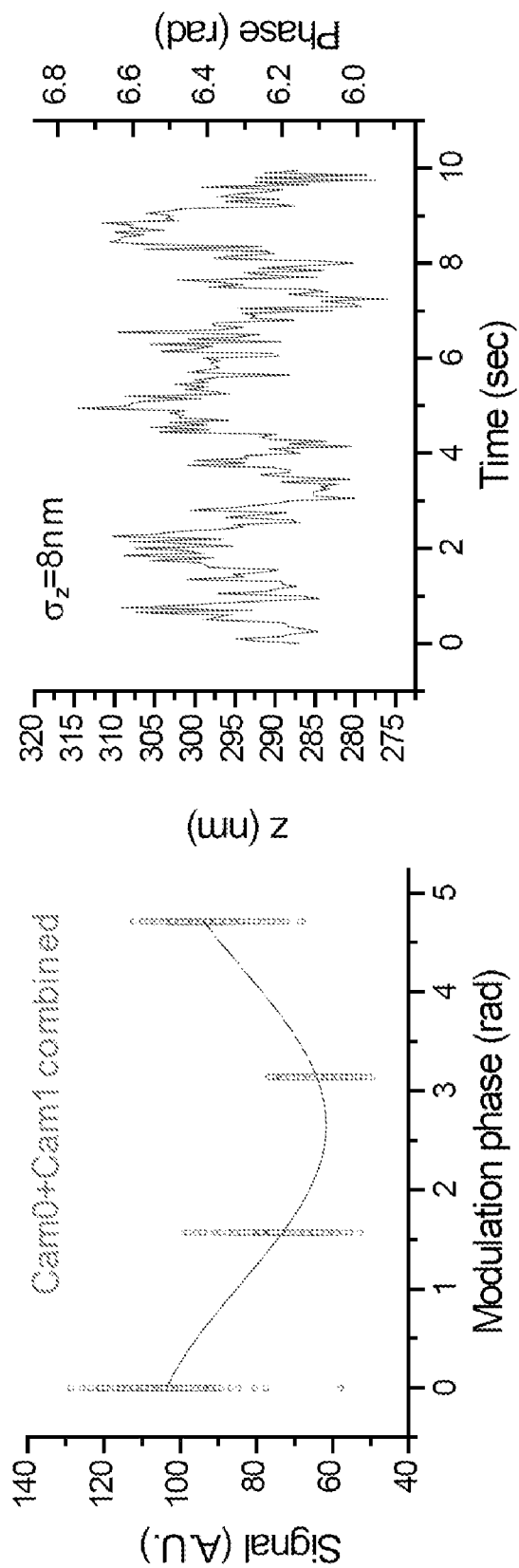

FIGS. 9A-9D depict axial localization performance with 3D-iLLS and 4-phase modulation interferometry. FIG. 9A, Signals from a 40 nm bead on Cameras 0 and 1, over 100 4-step modulation cycles. The piezoelectric phase shifter is stepped in 182.5 nm increments, corresponding to 0°, 90°, 180° and 270° relative phases. Right panel: zoom-in of the dotted region in the left panel, illustrating the anti-correlated signal modulation of Cam0 vs. Cam 1. FIG. 9B, Signals from Cam0 and Cam1 are combined into a single modulation cycle, doubling the temporal resolution. Right panel: zoom-in of the dotted region in the left panel. FIG. 9C, Superposition of all 200 modulation cycles by collapsing the x axis in the interval [0–2π), showing excellent stability and reproducibility of the setup. Solid line: fit to a sine wave. FIG. 9D, Extracted phase and z coordinate, showing $\sigma_z$≈8 nm r.m.s. localization precision.

Figure 10:
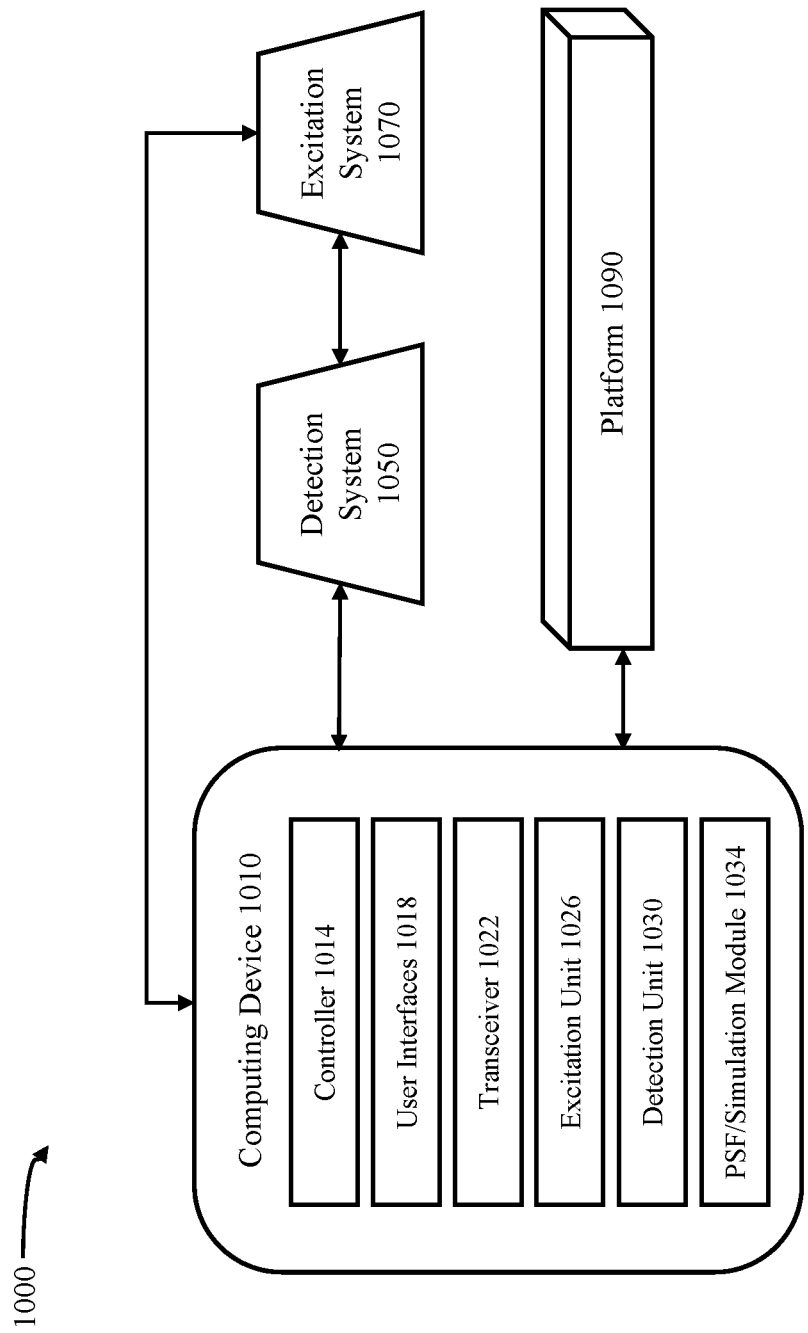

FIG. 10 corresponds with an example system comprising a computing device communicatively coupled with a detection system, an excitation system, and a sample platform, according to various potential embodiments.

Figure 11A:
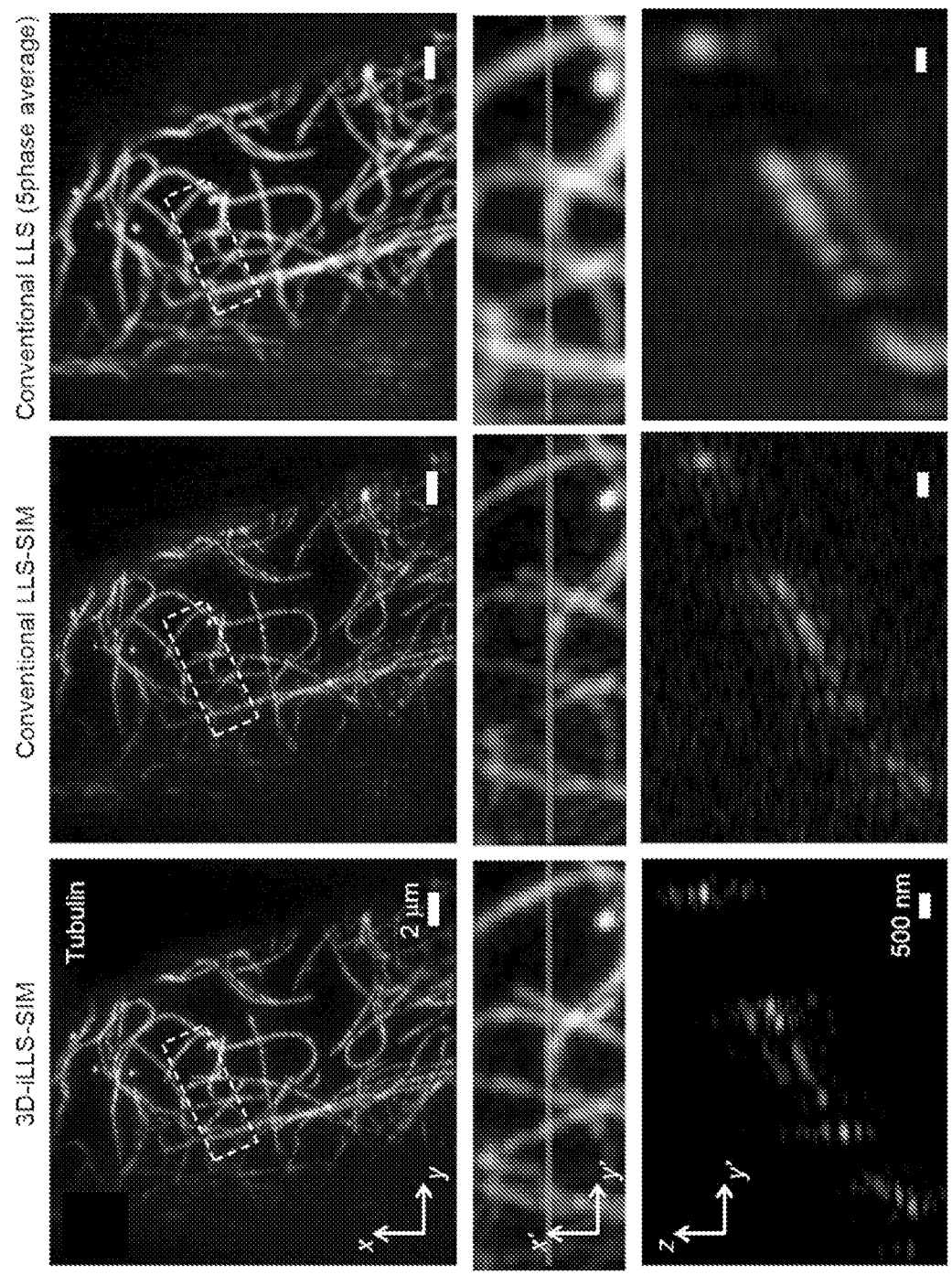
Figures 11B, 11C:
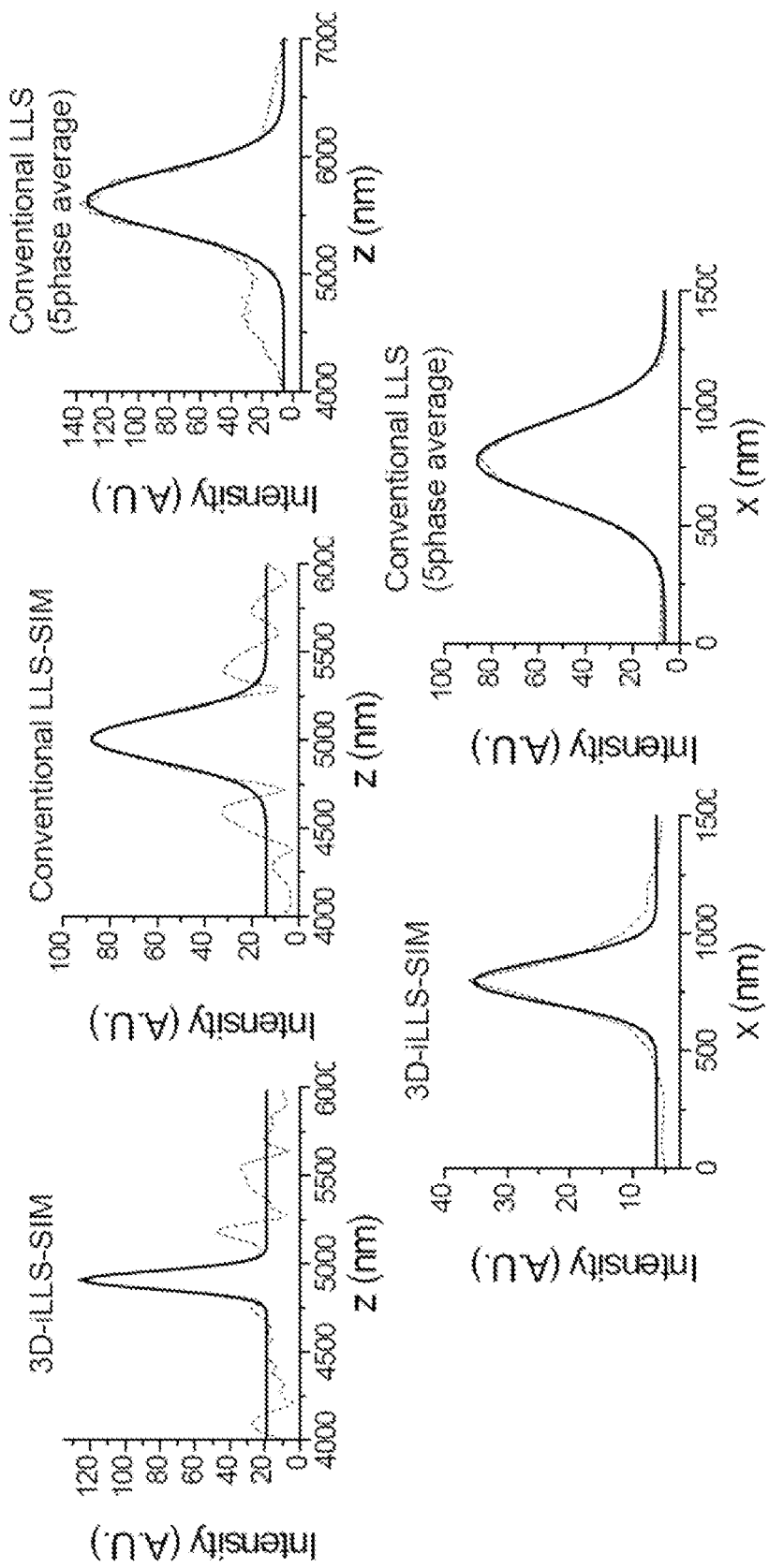

FIGS. 11A-11C depict how 3D-iLLS-SIM enables cellular imaging with improved resolution compared to conventional LLS-SIM and dithered LLS according to various potential embodiments. FIG. 11A Top and middle panels: maximum intensity projections of immunostained microtubules in a fixed COS-7 cell. Bottom panels: slice of the data in the plane indicated by the transparent yellow lines. FIG. 11B, Line profiles of individual microtubules in z. Fitted z FWHM widths are 122 nm, 311 nm and 603 nm for 3D-iLLS-SIM and for conventional LLS-SIM and LLS (five-phase average), respectively. FIG. 11C, Line profiles of individual microtubules in x. Fitted x FWHM widths are 216 nm and 401 nm for 3D-iLLS-SIM and conventional LLS (five-phase average), respectively. FIGS. 11B-C, Dashed lines: raw data; solid lines: 1D Gaussian peak fits. AU, arbitrary units.

Figure 12A:
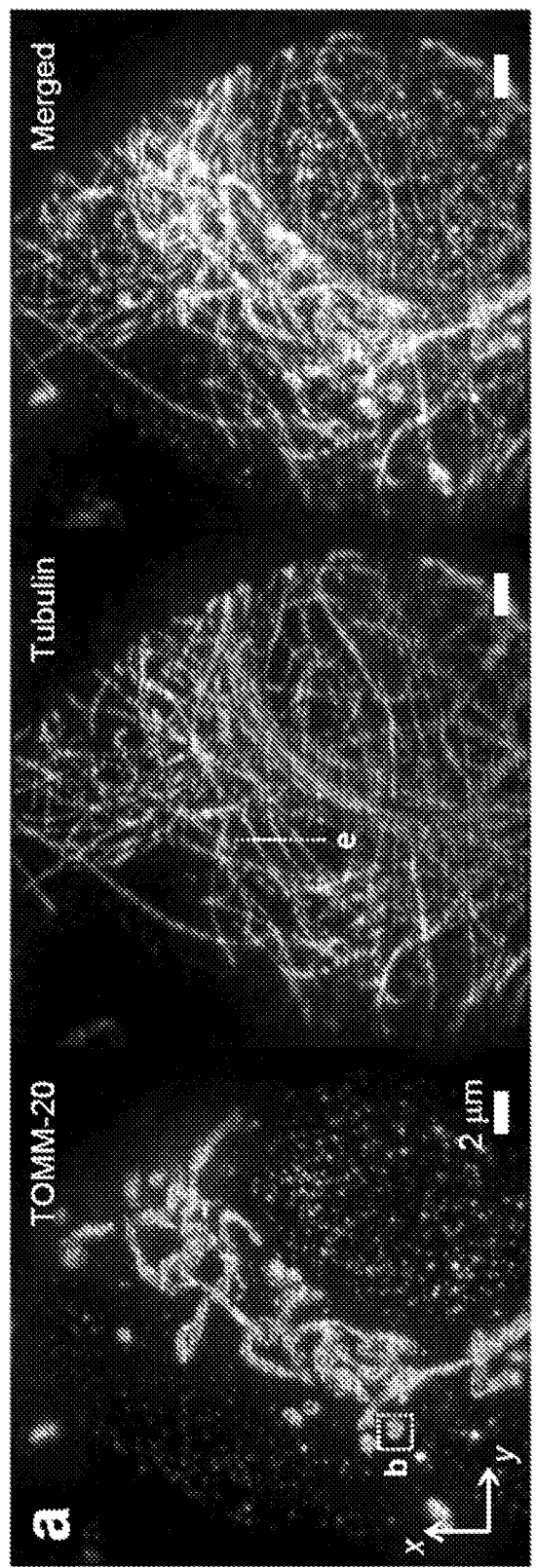
Figure 12B:
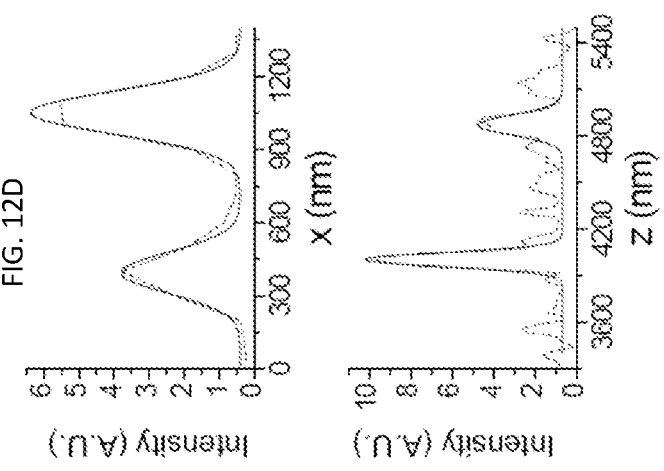
Figure 12C:
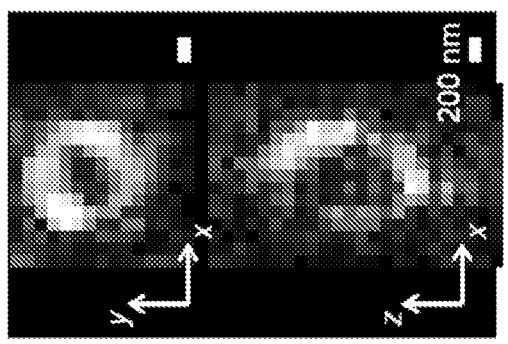
Figure 12D:
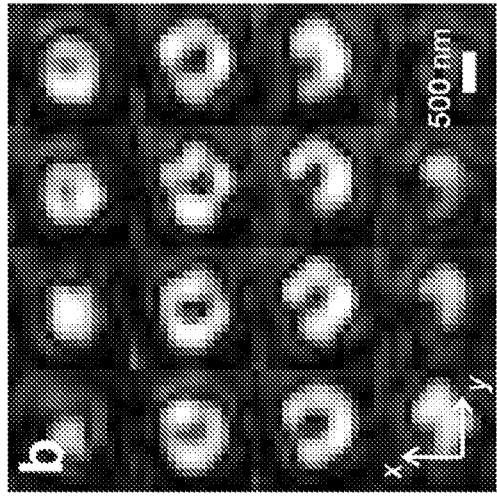
Figure 12E:
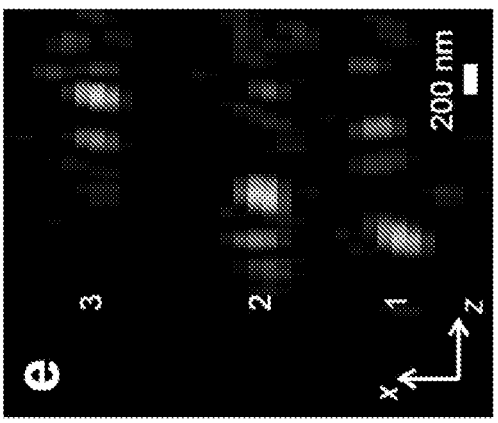
Figure 12F:
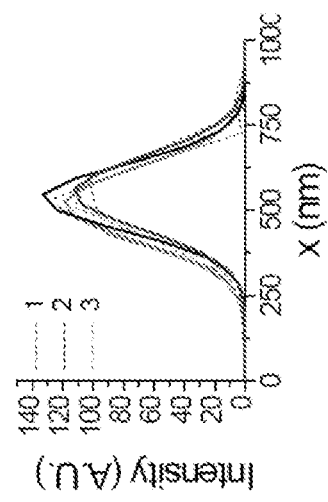

FIGS. 12A-12F depict how 3D-iLLS-SIM enables two-color imaging with extended resolution according to various potential embodiments. FIG. 12A, Two-color imaging of mitochondria (Tomm-20 Atto 647N) and microtubules (tubulin, CF568) in a fixed COS-7 using 3D-iLLS-SIM. Images show maximum intensity projections in the yx plane. FIG. 12B, Montage showing consecutive z sections (100-nm z-steps) through a single mitochondrion (boxed in a). FIG. 12C, Orthoslices and FIG. 12D line profiles of the CF 568 immunostained mitochondrion shown in FIG. 12B. Dashed lines: raw data; solid lines: 1D Gaussian peak fits. Fitted FWHM is 110 nm, and 152 nm in z and 199 nm and 206 nm in x, respectively. FIG. 12E, Orthoslice showing microtubule cross-sections in the zx plane. FIG. 12F, Line profiles (dashed lines) of the microtubules in e and 1D Gaussian peak fits (solid lines). Fitted FWHM is 140 nm, 157 nm and 114 nm in z and 248 nm, 251 nm and 225 nm in x, respectively. AU, arbitrary units.

FIGS. 13A-13D depict how 3D-iLLS-SIM enables time lapse imaging with extended resolution according to various potential embodiments. FIG. 13A, 3D-iLLS-SIM imaging of mitochondria in a live COS-7 cell (Tomm-20-Halo, visualized with JF646-Halo ligand). The image shows maximum intensity projection in the yx plane. FIG. 13B, Orthoslices showing cross-sections of a single mitochondrion (boxed in a) in the xy and xz planes, respectively. FIG. 13C, Line profiles of mitochondrion in FIG. 13B and Gaussian peak fits. Fitted FWHM is 226 nm, and 140 nm in z and 199 nm and 270 nm in x, respectively. FIG. 13D, Orthoslices showing time lapse dynamics of another mitochondrion (second box in a) at 1-min intervals over a 10-min period.

Figure 14:
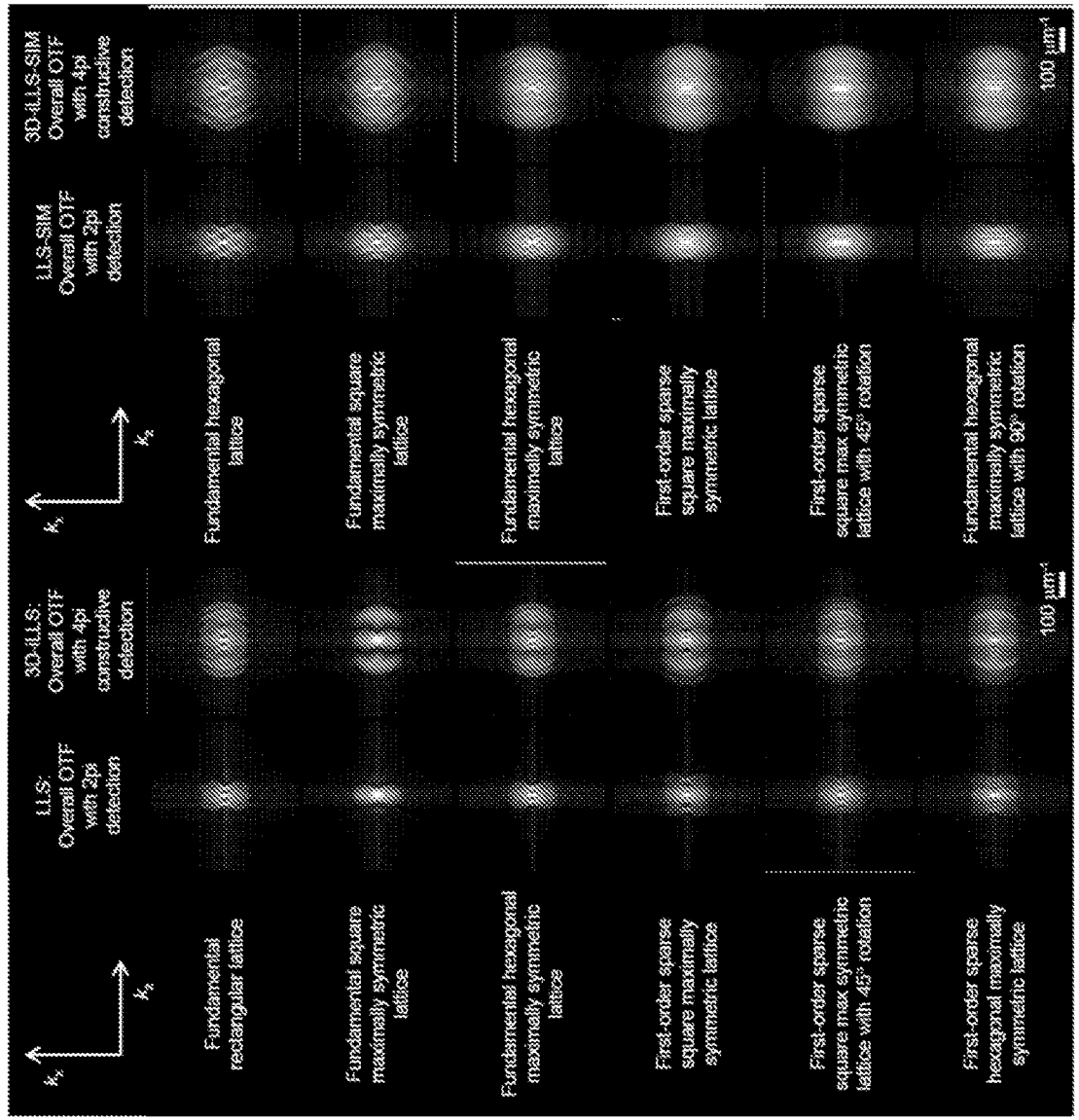

FIG. 14 depicts comparison of OTFs obtained by conventional LLS, 3D-iLLS, conventional LLS-SIM and 3D-iLLS-SIM. Simulation parameters are given in Tables 1 and 2.

Figure 15A:
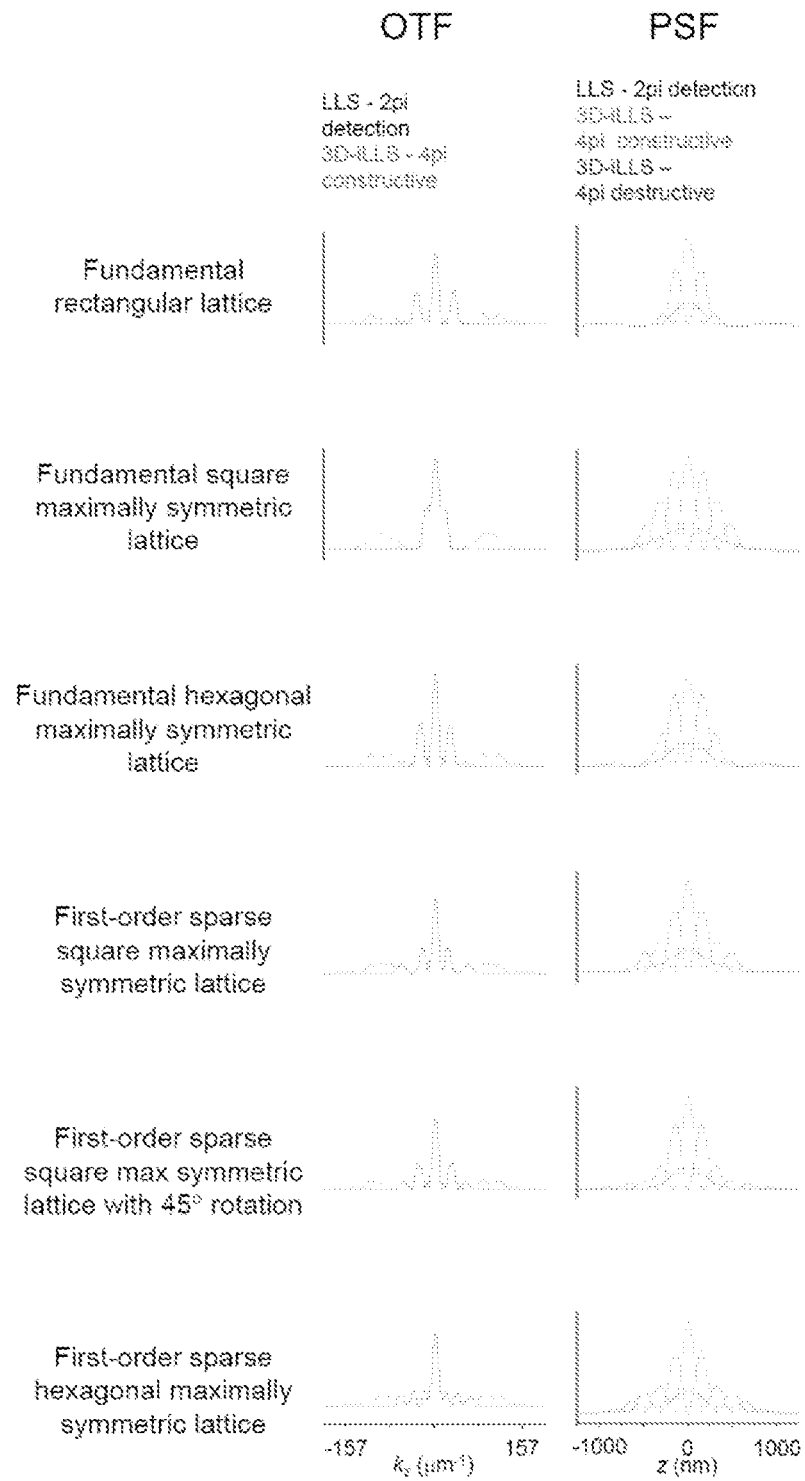
Figure 15B:
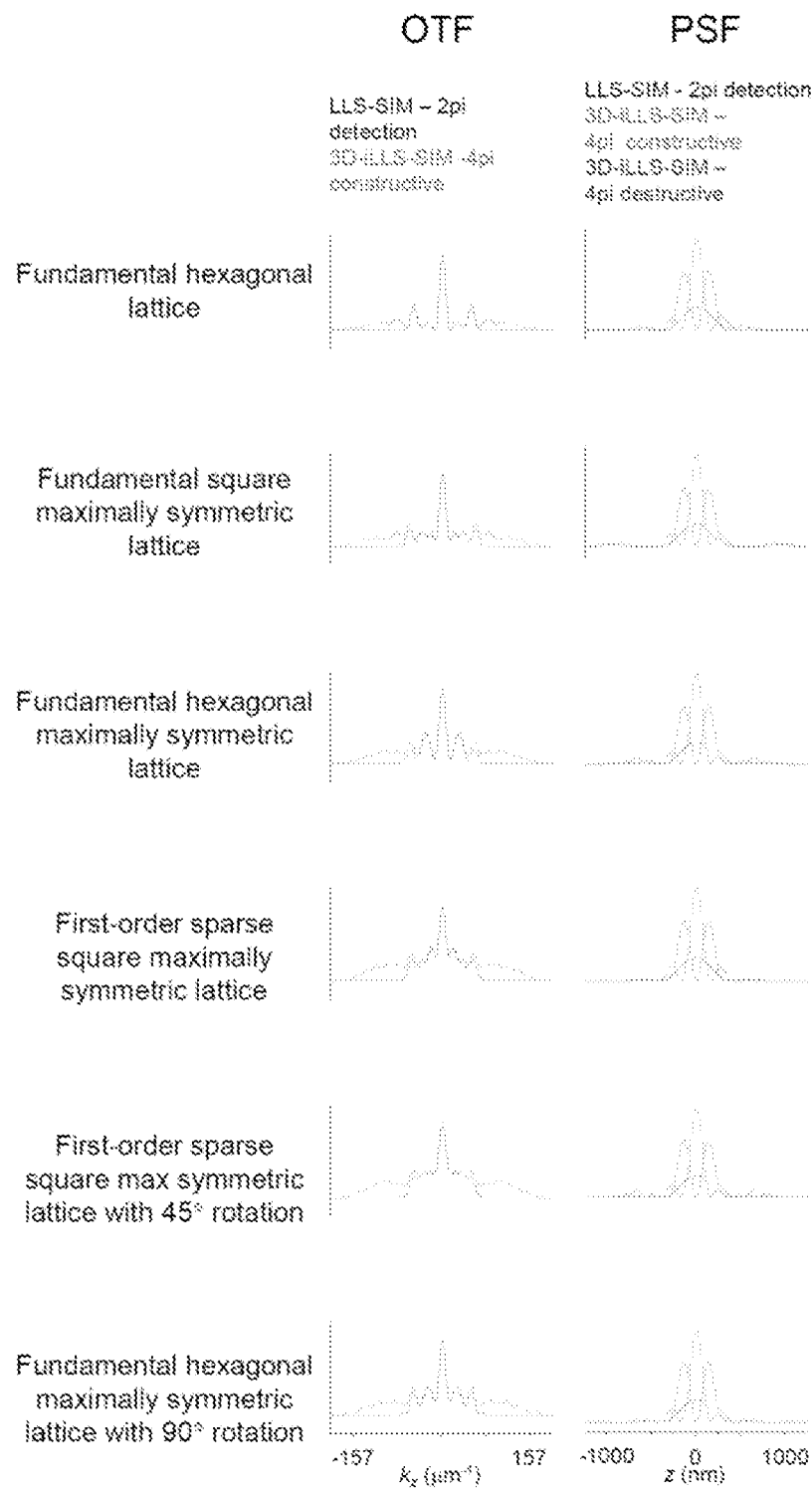

FIGS. 15A and 15B depict line profiles of OTFs and PSFs obtained by conventional LLS, 3D-iLLS, conventional LLS-SIM and 3D-iLLS-SIM, according to various potential embodiments. FIG. 15A, conventional LLS and 3D-iLLS based on dithered LLS excitation. FIG. 15B, conventional LLS-SIM and 3D-iLLS-SIM based on SIM LLS excitation.

Line profiles along the $k_z$ axis ($k_x=0$, $k_y=0$) and z axis (x=0, y=0) are shown for OTFs and PSFs, respectively. Simulation parameters are given in Tables 1 and 2.

Figure 16A:
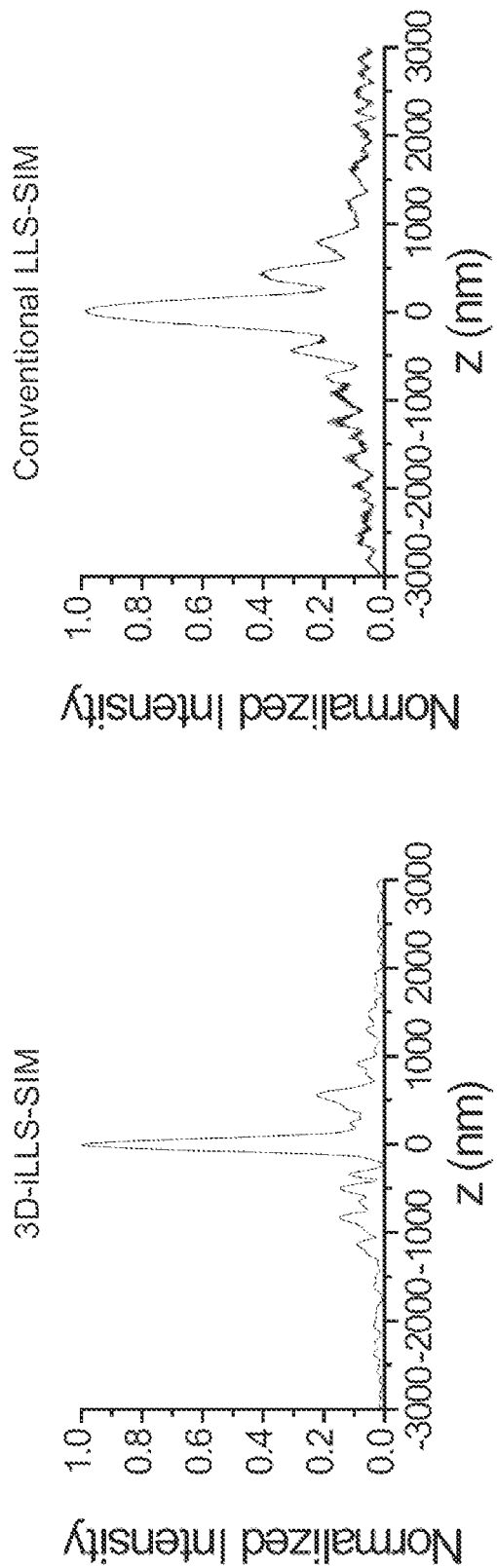
Figures 16B, 16C:
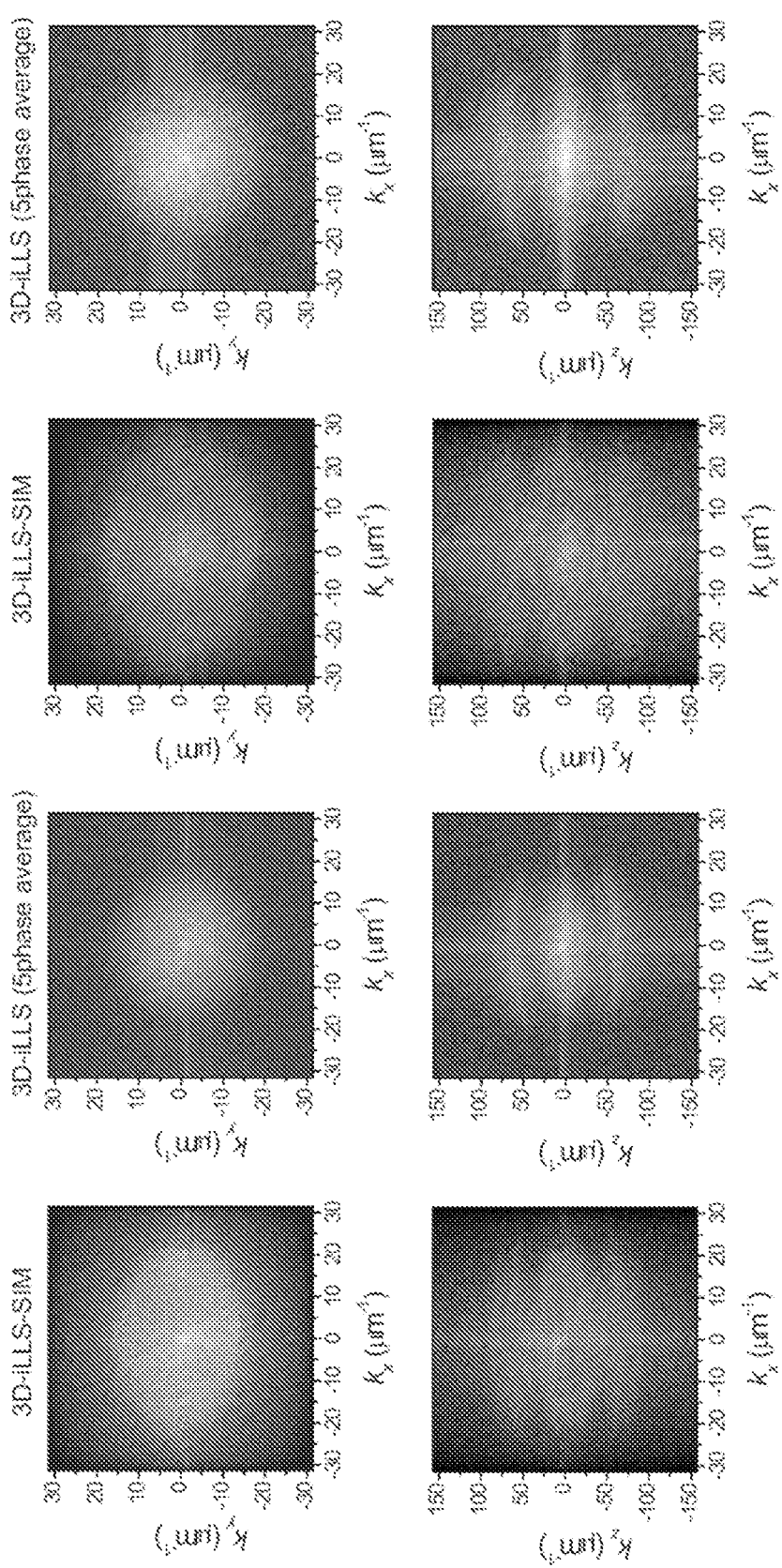

FIGS. 16A-16C depict resolution and recovery of spatial frequencies of conventional LLS-SIM vs. 3D-iLLS-SIM according to various potential embodiments. FIG. 16A, Conventional LLS-SIM vs. 3D-iLLS-SIM of microtubules. Average z profile obtained from n=9 and 7 individual microtubules from the 3D-iLLS-SIM and conventional LLS-SIM. FIG. 16B-C, Fourier transforms of 3D-iLLS-SIM vs. 3D-iLLS images of microtubules and mitochondria. Fourier transforms S(k) correspond to the real-space data shown in FIG. 12A. Maps show $\log(|S(k)|)$ in the $k_x k_y$ and $k_x k_z$ planes. 3D-iLLS data are obtained from the 3D-iLLS-SIM data by 5-phase averaging.

Figure 17A:
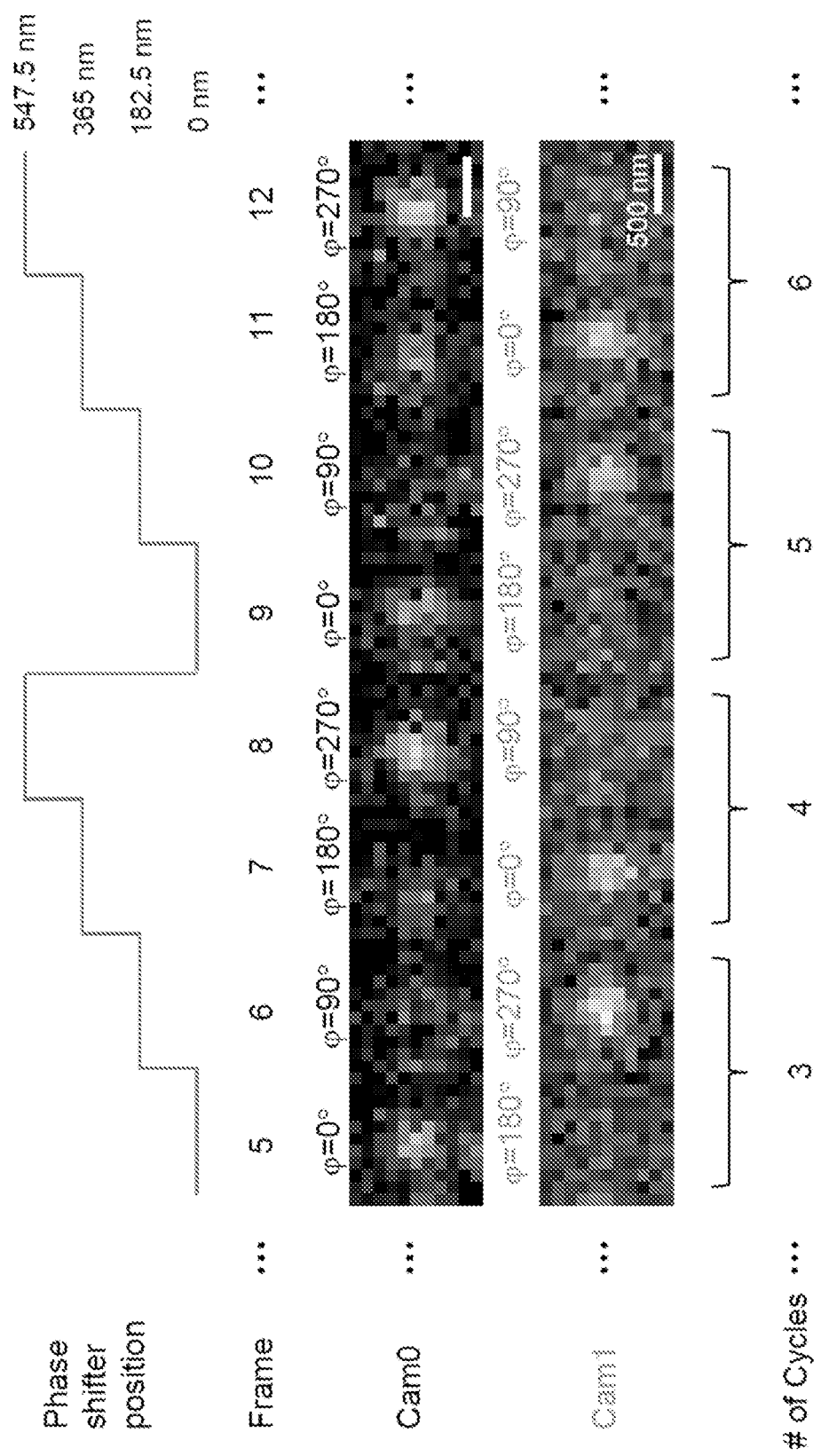
Figure 17B:
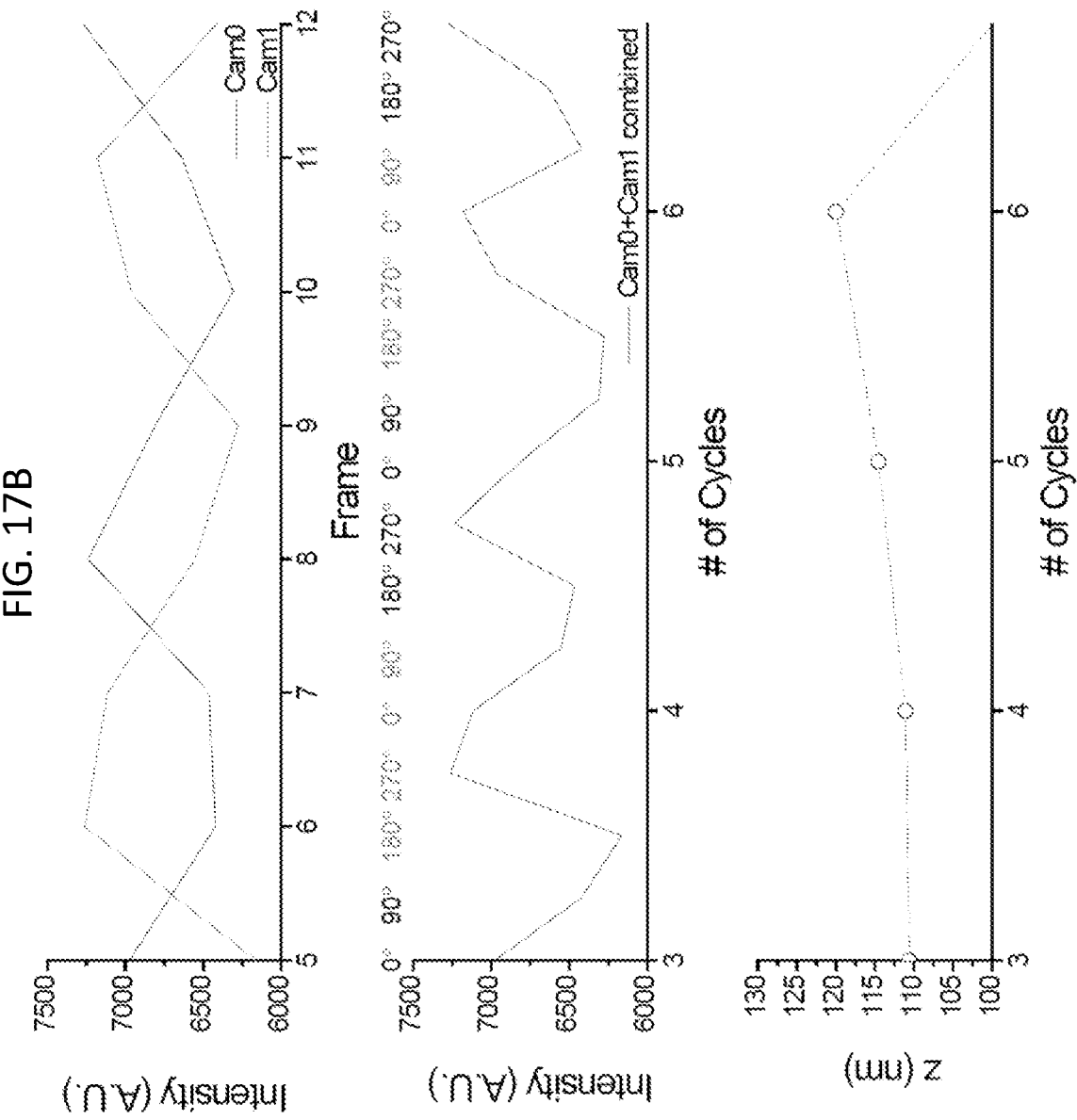

FIGS. 17A and 17B provide an illustration of z tracking using 3D-iLLS modulation interferometry with a 4-step modulation cycle according to various potential embodiments. Data corresponds to part of the trajectory of a single mRNA molecule (shown in the second row of FIG. 3E). FIG. 17A, Top trace shows the displacement of the phase shifter. Four steps are taken, each corresponding to ¼th of the interferometric period. In each step, two phases are measured simultaneously, one on each camera. FIG. 16B, The black and magenta traces show the intensity of the Cam0 and Cam1 images in each frame. The images from the first half of each original 4-step modulation cycle—corresponding to $\varphi=0°$ and $90°$ measured on Cam0 and $\varphi=180°$ and $270°$ measured on Cam—are combined in a single modulation cycle. Similarly, the images from the second half of the original 4-step modulation cycle—corresponding to $\varphi=180°$ and $270°$ measured on Cam0 and $\varphi=0°$ and $90°$ measured on Cam1—are combined in a separate second modulation cycle. The blue line shows this combined Cam0+Cam1 intensity trace. The z position is then extracted by the phase of the intensity modulation, resulting in two successive z position measurements, one each for the first and second part of the original 4-step modulation cycle.

Figures 18A, 18B:
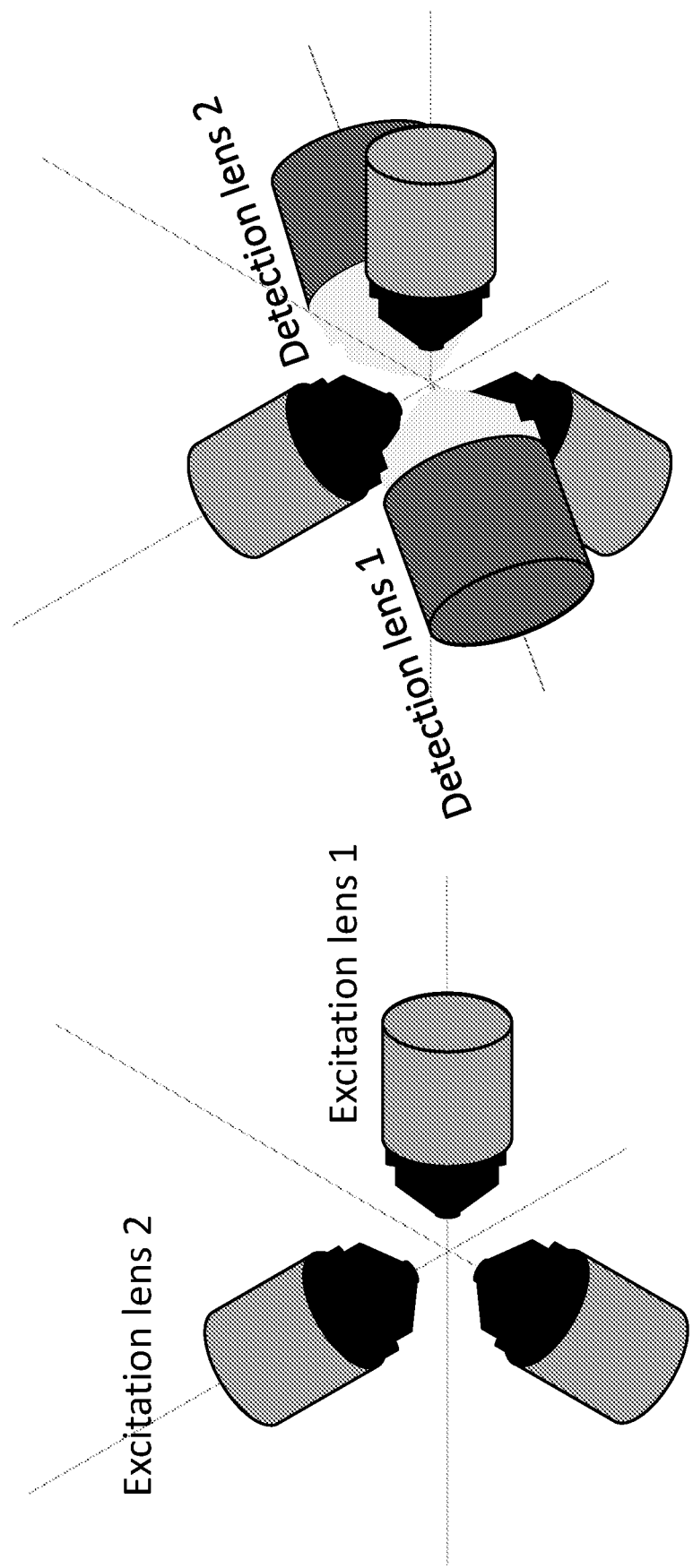

FIGS. 18A and 18B represent example setups according to various potential embodiments, with additional excitation lenses, that could be implemented for full 3D-iLLS-SIM, to provide structured illumination of the sample at various angles in the xy plane and achieve near-isotropic extended spatial resolution.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Understanding cellular structure and function requires live-cell imaging with high spatio-temporal resolution and high detection sensitivity. Direct visualization of molecular processes using single-molecule/super-resolution techniques has thus been transformative. However, extracting the highest-resolution 4D information possible from weak and dynamic fluorescence signals in live cells remains challenging. For example, some of the highest spatial resolution methods, e.g. interferometric (4Pi) approaches[1-6] can be slow, require high peak excitation intensities that accelerate photobleaching or suffer from increased out-of-focus background. Selective-plane illumination (SPIM)[7-12] reduces background, but most implementations typically feature modest spatial, especially axial, resolution. Here we develop 3D interferometric lattice light-sheet (3D-iLLS) imaging, a technique that overcomes many of these limitations. 3D-iLLS provides, by virtue of SPIM, low light levels and photobleaching, while providing increased background suppression and significantly improved volumetric imaging/sectioning capabilities through 4Pi interferometry. We demonstrate 3D-iLLS with axial resolution and single-particle localization precision down to <100 nm (FWHM) and <10 nm (1σ) respectively. 3D-iLLS paves the way for a fuller elucidation of sub-cellular phenomena by enhanced 4D resolution and SNR live imaging.

Interferometric (4Pi) approaches[1-6] achieve high 3D spatial resolution and single-particle localization precision, <100 nm and <10 nm along z respectively. Point-scanning 4Pi imaging[1], with focused excitation and confocal detection, features efficient 3D PSF in terms of reduced side-lobes as well as background reduction. However, point-scanning is limited in temporal resolution when imaging large fields, and short pixel dwell times require high peak excitation intensities that often accelerate photobleaching. Wide-field interferometric setups could in principle achieve faster imaging at reduced peak intensities. However such setups typically have been implemented in an epi-illumination configuration[2-6], which suffers from increased out-of-focus background. Applications have thus been limited to relatively sparse and bright cellular structures with low background. There are many systems where structures of interest might comprise only ~10 molecules[3,13]. Such structures are difficult to visualize in the presence of often overwhelming cellular background such as out-of-focus blur in dense structures, as well as super-Poisson intensity noise due to particle number fluctuations[13]. An approach that can simultaneously achieve high 3D resolution and localization precision and reduced background/photo-bleaching would greatly advance our capabilities to visualize molecular structures and motions at nanometer scales, in the high-background, crowded intracellular milieu.

Selective plane-illumination (light-sheet) approaches illuminate only a thin slice through the sample, overcoming many of the limitations of epi-illumination. In the simplest implementations, a single plane is illuminated with an excitation beam that is perpendicular to the detection optics. A conventional choice for creating the selective plane illumination profile is a Gaussian beam, which can be projected by a separate excitation objective lens mounted perpendicular to the detection lens[10], or reflected by a microfabricated cantilever mirror mounted on an excitation objective lens opposed to the detection lens[9]. In either case, a trade-off between the thickness of the light sheet and the effective field of view due to diffraction needs to be considered and a sweet spot is chosen depending on the requirements of the sample studied. To overcome the constraints due to diffraction of Gaussian beams, non-diffracting beams, such as Bessel[8,11] or Airy[12] beams can be used. Both a single beam[11] and an array of Bessel beams[8] can be scanned to create a light sheet that is thinner than what achieved with a Gaussian beam. However, the non-negligible excitation side-lobes away from the main illumination plane introduce excess background and unnecessary photo-bleaching at out-of-focus parts of the sample that are not imaged. Selective plane illumination based on bound 2D optical lattices, lattice light-sheet (LLS) illumination, can suppress the side lobes while maintaining the non-diffracting property and the thin profile of the light sheet[7]. LLS microscopy demonstrated combined low photo-toxicity, low photo-bleaching and low background, well-suited to live cell imaging studies. In conventional LLS imaging with a single 0.7 NA (numerical aperture) excitation lens and a single 1.1 NA detection lens, a 240 nm×240 nm×380 nm resolution has been achieved[7], while for single-particle localization applications, typical localization precisions[7,14] are ~20 nm in xy and ~45 nm in z. This z performance is significantly lower that what can be achieved by interferometric methods, but unfortunately, possibly due to the constrains of the dual opposed objective lens geometry, it has been challenging to implement selective-plane illumination approaches in interferometric setups, to further reduce background and increase the achievable 3D resolution.

Embodiments of the disclosure relate to interferometric imaging systems and methods for highly-sensitive live-cell imaging that replaces the original epi-illumination scheme with a selective-plane illumination scheme based on optical lattices (LLS illumination). This novel 3D interferometric lattice light-sheet (3D-iLLS) imaging approach achieves a more confined detection volume than conventional LLS microscopy with a single detection objective lens, and thus less out-of-focus background and higher signal-to-noise ratio. The reduced background, higher photon utilization efficiency and the higher optical sectioning capabilities of 3D-iLLS enable visualizing weak sub-cellular structures. Various embodiments demonstrate an achievable z resolution <100 nm (FWHM) and a localization precision <10 nm (1σ), both a factor of ~4× improvement compared to conventional LLS.

Figure 4B:
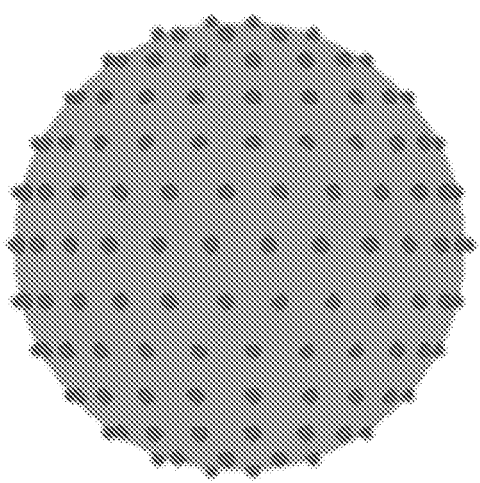
Figure 4B:
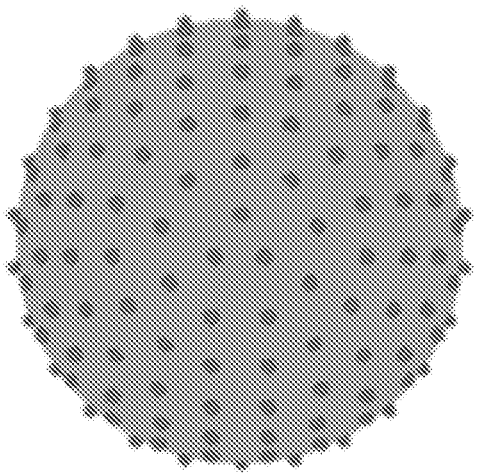

To better understand and optimize 3D-iLLS microscopy, various embodiments may utilize a numerical simulation pipeline (see, e.g., FIG. 4) for calculating the resulting 3D PSFs based on electromagnetic vector-field calculations. The overall 3D-iLLS PSFs show distinct profiles compared to conventional LLS microscopy (see, e.g., FIG. 5). In various embodiments of 3D-iLLS with constructive emission interference, the PSF exhibits a maximum centered at the common focus of the two objectives, with two additional visible side lobes along the z-axis. When emission interferes destructively, the intensity maxima are symmetrically positioned along the z-axis away from the focal plane, with two less pronounced side lobes. In both cases, the volume occupied by the overall PSFs for 4Pi detection is ≈2× less than for 2Pi detection, indicating reduced background and thus higher sensitivity when imaging single molecules and other faint objects at the focal plane. As the overall PSF becomes smaller, background contributions from molecules that diffuse in-and-out of the detection volume, or from molecules that bind to loci nearby, are reduced. This effect allows individual molecules and faint structures of interest at the focal plane to be visualized not only with higher z resolution but also with increased sensitivity and higher signal-to-noise ratio (SNR).

For purposes of reading the description of the various embodiments below, the following descriptions of the sections of the specification and their respective contents may be helpful:

Section A describes various embodiments of 3D Interferometric Lattice Light-Sheet (3D-iLLS) Imaging;

Section B describes numerical calculations of 3D-iLLS PSFs (point spread functions); and Section C describes a computing environment which may be useful for practicing embodiments described herein.

Section A: 3D Interferometric Lattice Light-Sheet (3D-iLLS) Imaging

Figure 1A:
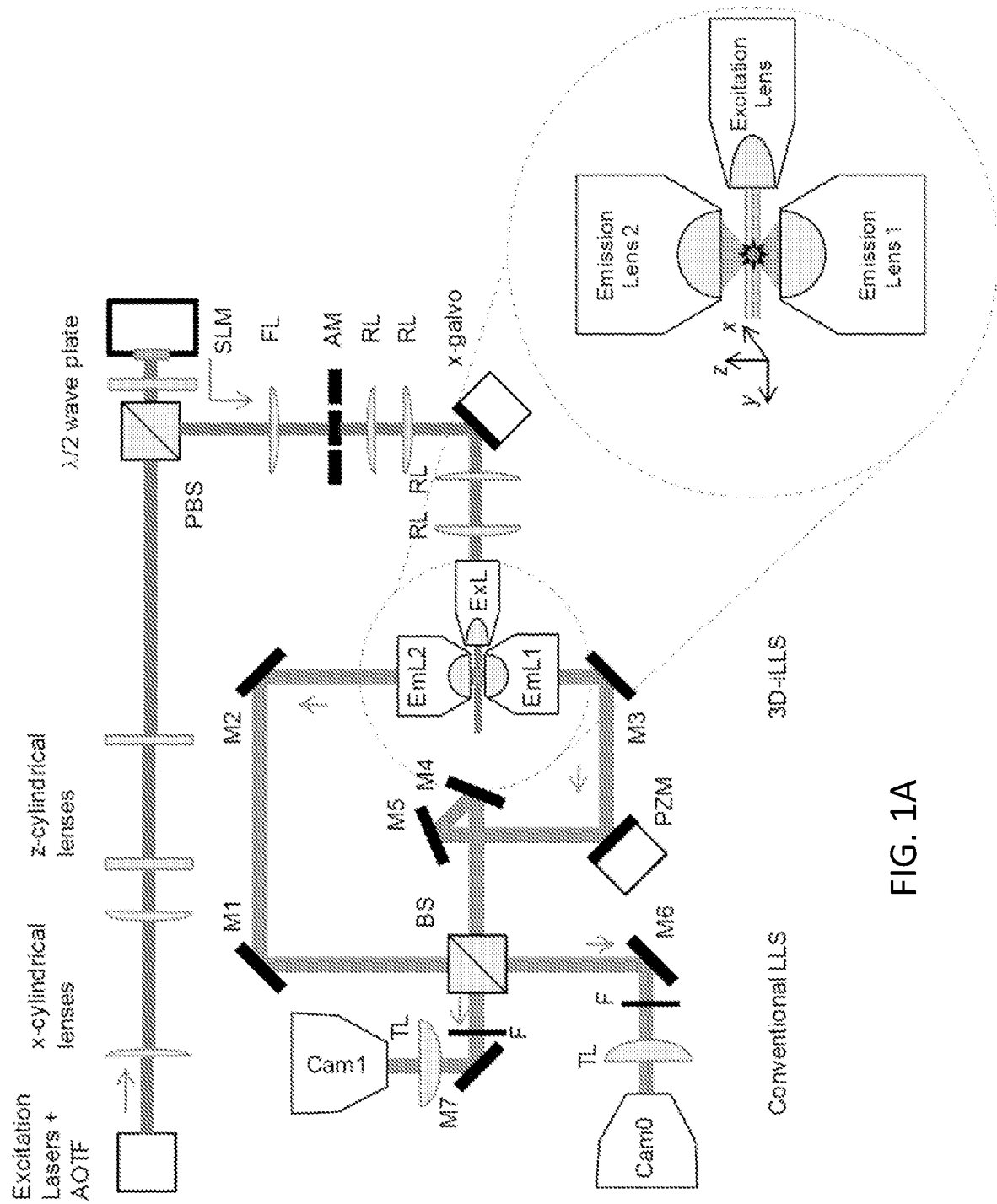
FIGS. 1A and 1B depict principles of 3D-iLLS, optical setup schematic and comparison of PSF (point spread function) properties of 3D-iLLS versus conventional LLS, according to various potential embodiments.
Figure 1B:
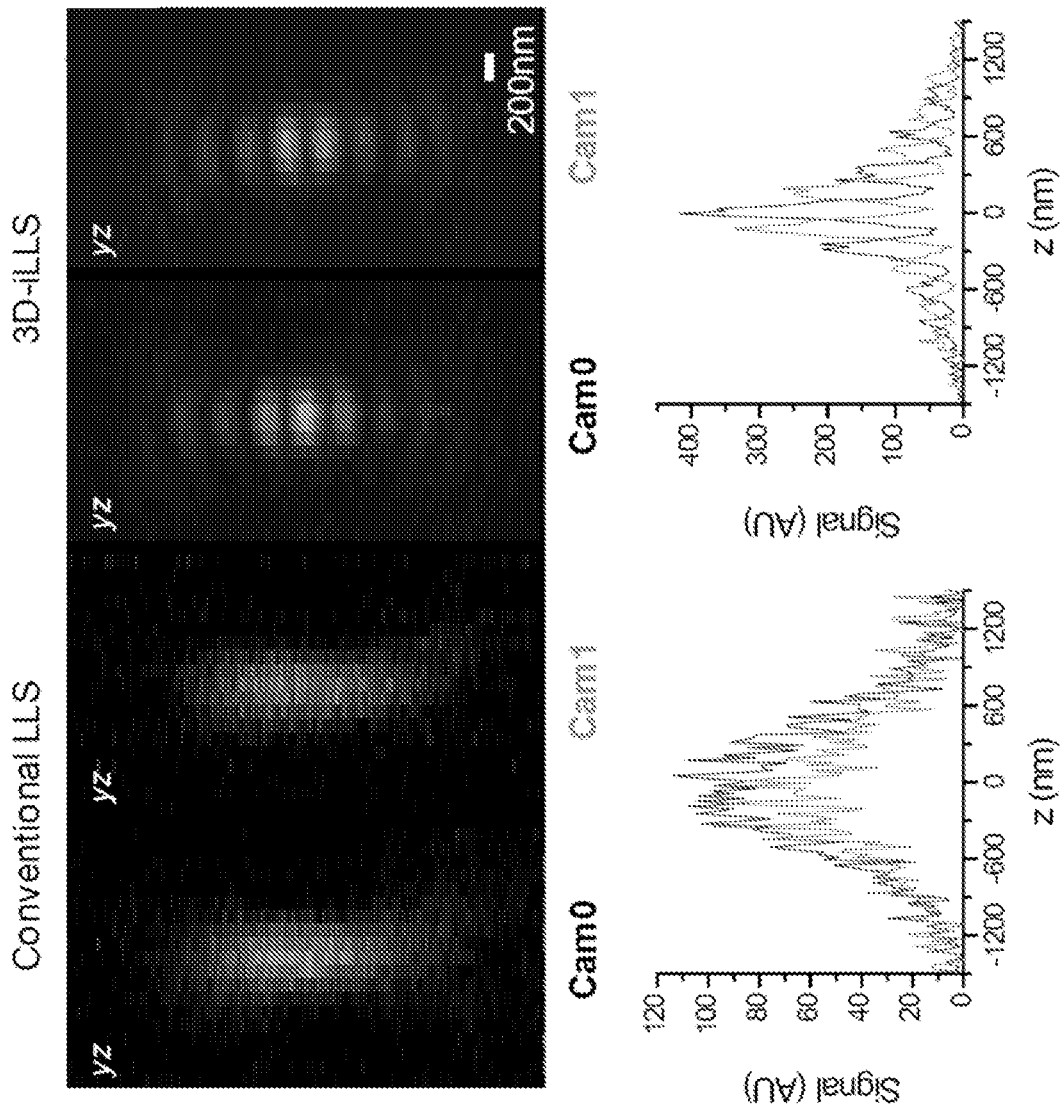

Various embodiments relate to a 3D-iLLS microscope (see FIGS. 1A and 6) which uses two 1.1 NA opposed detection lenses, in an interferometric cavity arrangement described in Wang et al., *Cell* 167, 1839-1852 e1821 (2016)[3]. For imaging, the interferometer may be tuned to the zero-path-length position, resulting in constructive/destructive interference at the two ports of the beam-splitter. A third 0.7 NA lens, orthogonal to the two opposed detection lenses, delivers the LLS excitation. The experimental 3D-iLLS PSF may be calibrated using 40-nm fluorescent beads (see FIG. 1B). The experiment calibrations recapitulate our numerical calculations, featuring the expected modulated PSF with a ~100-140 nm FWHM central lobe, thus demonstrating successful implementation of the desired 3D-iLLS optical properties. Further optimization may be implemented in various potential embodiments (FIG. 7), by correcting residual aberrations in both the detection and excitation paths that most likely limit the performance of the current instrument, for example.

Figure 2A:
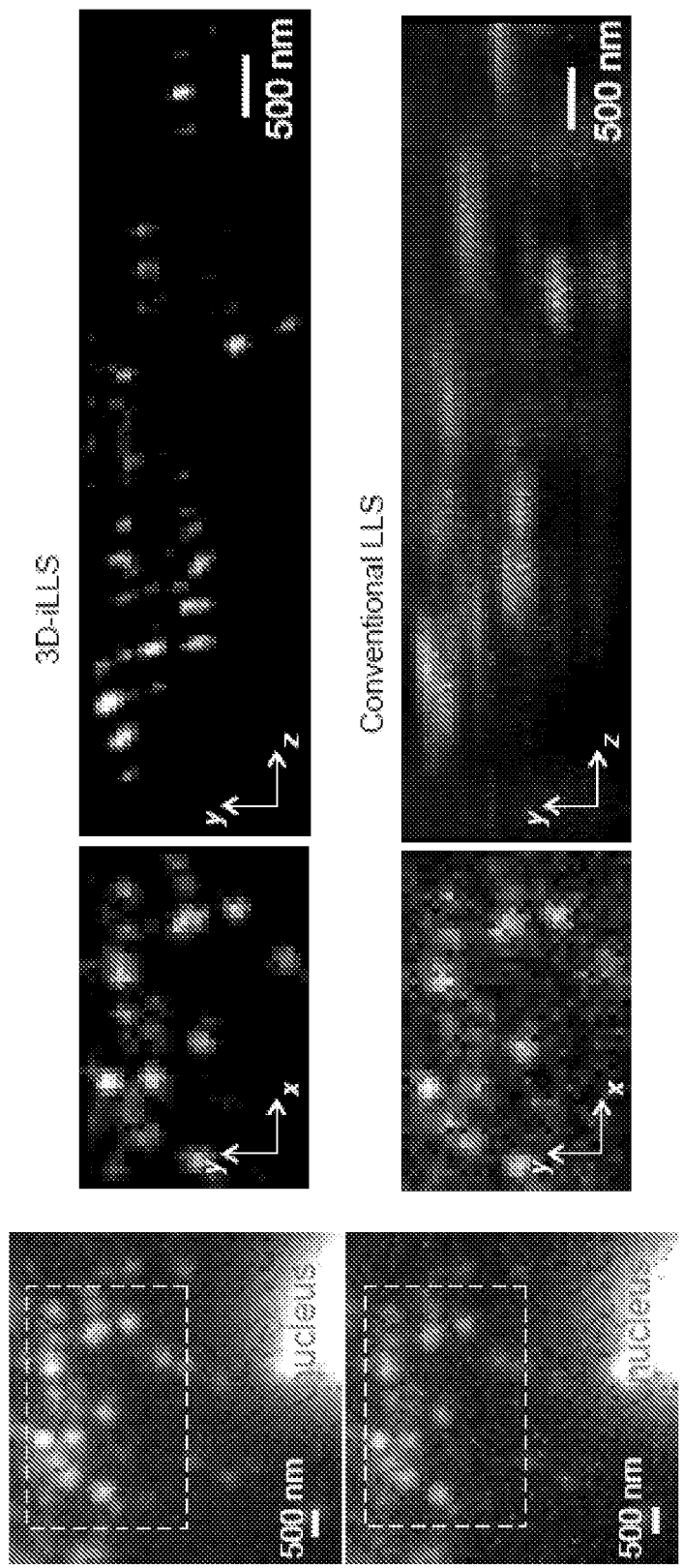
FIGS. 2A-2D illustrate 3D-iLLS outperforms conventional LLS in 3D sub-cellular imaging according various potential embodiments.
Figure 2B:
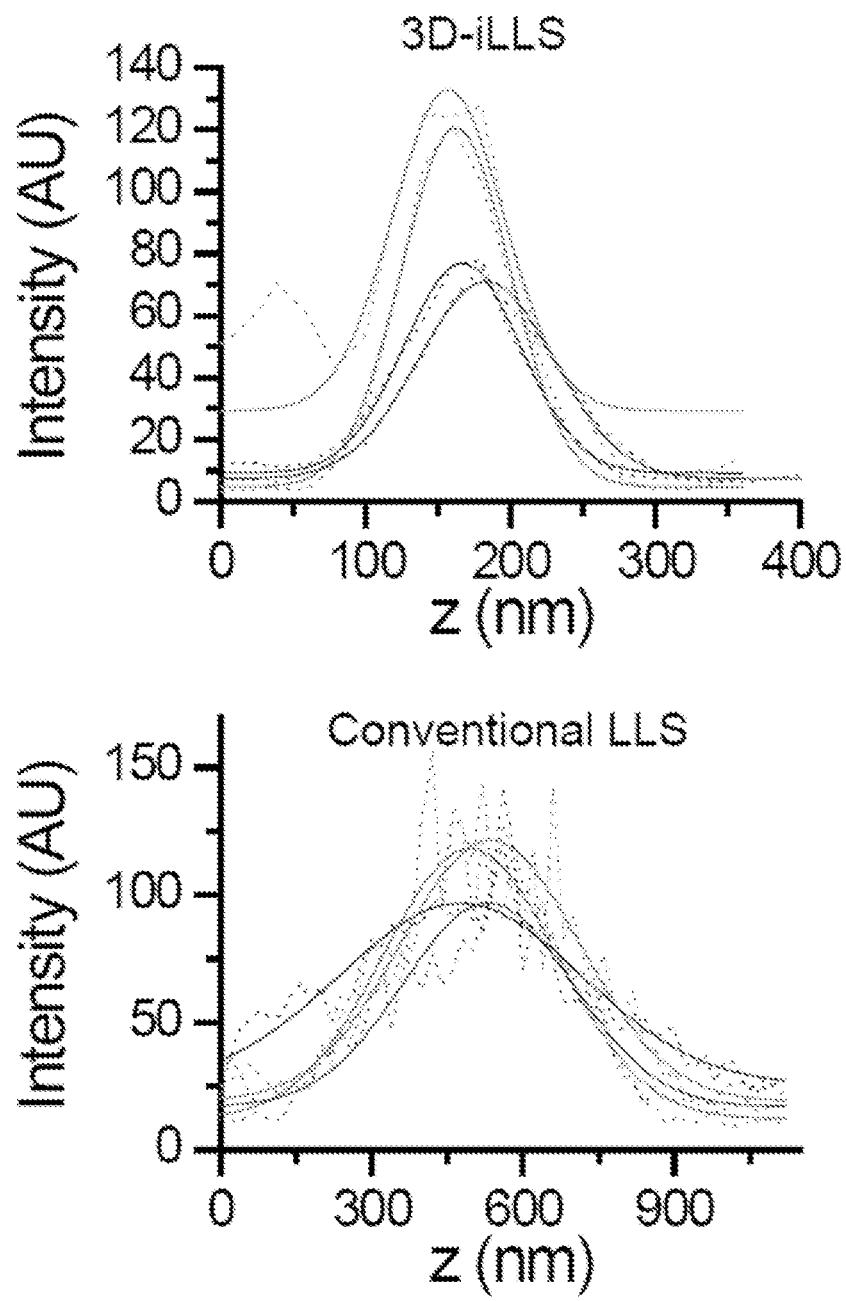

Increased axial resolution of 3D-iLLS vs. conventional LLS: To test the performance of various embodiments of 3D-iLLS with cellular samples we visualized single mRNAs in human osteosarcoma cells (U-2 OS line)[13]. Single mRNAs are tagged with PP7 phage derived stem-loops (24×PP7) and visualized with a tandem-dimer phage coat protein fused to Halo-tag (tdPCP-Halo) and staining with a JF-646 Halo-tag ligand. 3D-iLLS adequately resolved single mRNAs, even in tight clusters where conventional LLS failed (FIG. 2A). We further quantified the axial resolution by measuring the z profile of single mRNAs. For conventional LLS the obtained FWHM resolution is 496±27 nm and 444±80 nm, for raw data and after deconvolution, respectively (mean±S.D., n=4). The 3D-iLLS z profiles after deconvolution yielded a FWHM of 96±10 nm (mean±S.D., n=4) (FIG. 2B). These results demonstrate a≈4× axial resolution improvement of 3D-iLLS compared to conventional LLS for various embodiments of the disclosure.

Figures 2C, 2D:
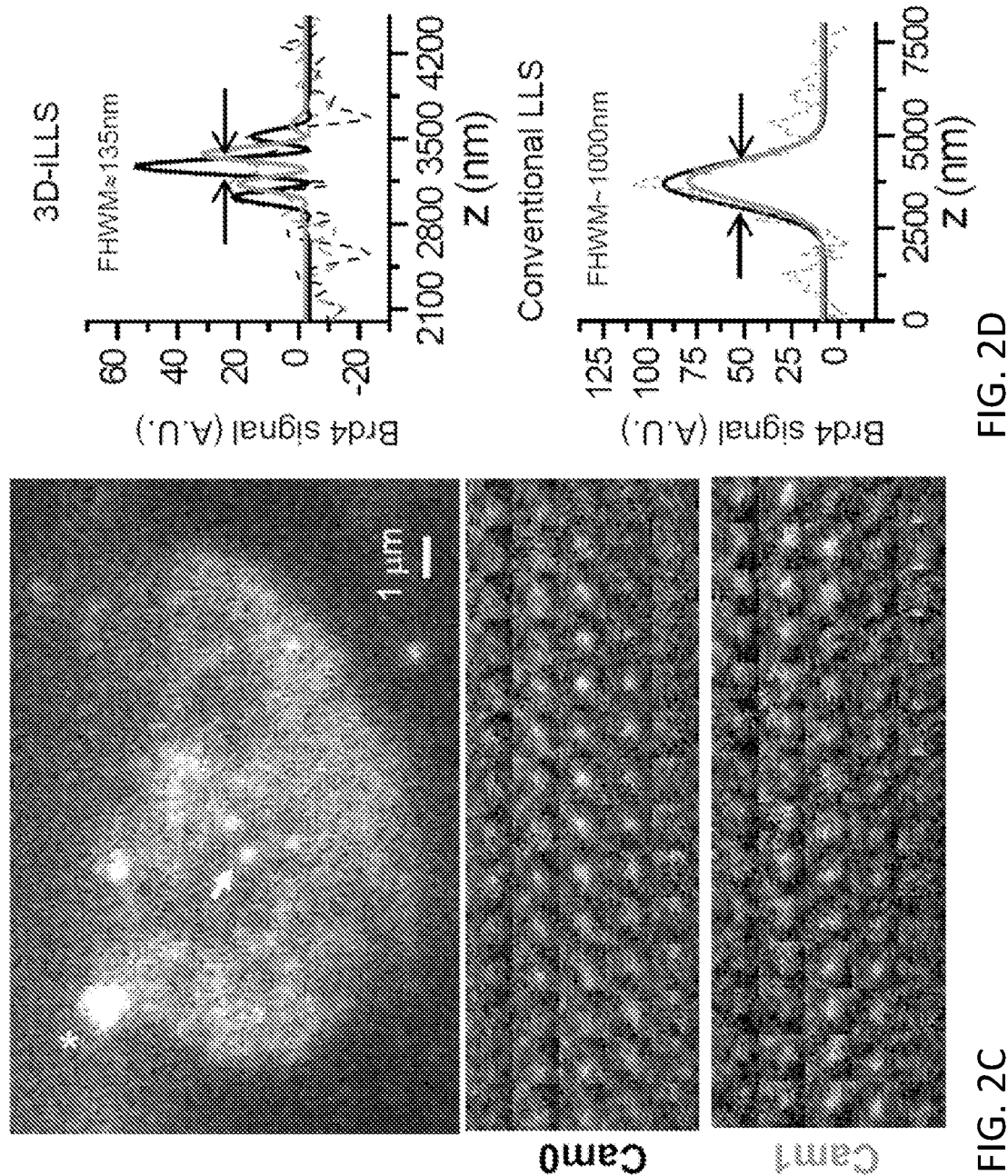

To demonstrate the performance of various embodiments of the 3D-iLLS setup in live-cell imaging, we imaged mouse embryonic stem cells (mESCs) that are engineered with a SNAP-tag knocked into the endogenous Brd4 locus[13]. We had previously shown that Brd4 forms foci containing ~15 tagged molecules at the enhancers of the Pou5f1 and Nanog genes13. Various embodiments of 3D-iLLS imaging show multiple Brd4 clusters throughout the nucleus of mESCs (FIG. 2C), suggesting extensive Brd4 clustering at mESC enhancers. 3D-iLLS resolves Brd4 clusters with increased resolution compared to conventional LLS (FIG. 2D). 3D-iLLS can also localize the center-of-mass of Brd4 clusters in the reconstructed cellular volumes with ≈10 nm z localization precision (FIG. 8). These results highlight the capabilities of various embodiments of 3D-iLLS for live cell imaging.

3D-iLLS-SIM provides improved OTF contiguity and strength: An important consideration for extended resolution and super-resolution imaging techniques is faithfully reconstructing structures of all sizes, down to the resolution limit. Different spatial frequencies present within the support of the microscope's optical transfer function (OTF) must be recovered above the noise level[28]. OTF contiguity and strength are crucial, as it becomes challenging to recover signals in weak OTF regions. Interferometric 4Pi techniques[29] as well as SPIM techniques with modulated excitation (LLS, Bessel)[7] often inherently contain OTF depressions, manifesting as side-lobes in the effective PSF. Depending on the detailed OTF structure and the spatial frequencies present in the sample, deconvolution can minimize (e.g. Extended Data FIG. 5a) or, in certain cases, even eliminate side-lobes[17]. The dithered LLS parameters can be further optimized (FIGS. 7B-7I), but beyond merely assessing the appearance of the effective PSF (e.g. based on side-lobe strength), further evaluating the full OTF structure and seeking to increase OTF strength and contiguity, throughout its support in 3D Fourier space, would be beneficial for general 3D-iLLS imaging applications.

To achieve a more uniform and further extended 3D-iLLS OTF support, various embodiments may employ 3D Structured Illumination Microscopy (SIM). By virtue of shifting and adding multiple information components in Fourier space, SIM can potentially better cover different spatial frequency ranges. Comparison between theoretical OTFs reveals that, indeed, the combination of 3D-iLLS and 3D SIM (3D-iLLS-SIM) results in OTFs that feature significantly shallower depressions than 3D-iLLS with dithered LLS excitation (FIGS. 14, 15A-15B). The corresponding 3D-iLLS-SIM PSFs also feature less prominent side lobes along the z axis than dithered LLS 3D-iLLS (FIGS. 15A-15B). Further, the support of 3D-iLLS-SIM OTFs extends further along the x axis, featuring an (anisotropically) increased resolution, similarly to conventional LLS-SIM7. These desirable optical properties predicted theoretically prompted us to further pursue and implement extended resolution 3D-iLLS-SIM imaging.

To evaluate the capabilities of 3D-iLLS-SIM, we first visualized the microtubule cytoskeleton in COS-7 cells (FIGS. 11A-11C; FIG. 16A). Consistent with the theoretical predictions, 3D-iLLS-SIM visualizes individual microtubules with improved xz resolution. Quantification of individual filaments reveals z FWHM of 137±14 nm vs. 321±23 nm and 579±66 nm, for 3D-iLLS-SIM vs. LLS-SIM and dithered LLS, respectively (mean±S.D., n=10, 7 and 4 individual z profiles). Similarly, 3D-iLLS-SIM achieves x FWHM of 214±35 nm vs. 383±18 nm for dithered LLS (mean±S.D., n=5 and 5 individual x profiles, respectively).

Further performed was two-color 3D-iLLS-SIM imaging of mitochondria and microtubules, simultaneously resolving the hollow structure of individual mitochondria and the spatial relationships between mitochondria and microtubules (FIGS. 12A-12F). The resolution in the shorter wavelength used for imaging mitochondria is 116±25 nm and 185±50 nm in z and x, respectively (FWHM; mean±S.D., n=8 and 8 individual z and x profiles, respectively). Inspection of the Fourier transforms of reconstructed data further illustrates the increased resolution and the improved recovery of axial spatial frequencies of 3D-iLLS-SIM compared to 3D-iLLS using dithered LLS excitation (FIGS. 16B-16C). Finally, we tracked mitochondria dynamics in live COS-7 cells using 3D-iLLS-SIM (FIGS. 13A-13D), at ~1 minute/volume temporal resolution and extended xz spatial resolution (143±27 nm z FWHM and 224±43 nm x FWHM; mean±S.D., n=14 and 16 individual z and x profiles, respectively). These results demonstrate the capabilities of extended resolution 3D-iLLS-SIM imaging for multi-color applications and for volumetric time-lapse imaging of subcellular dynamics.

Nanometer localization by 3D-iLLS modulation interferometry: Certain applications such as single-molecule localization-based imaging and single-particle tracking require fast 3D coordinate determination, in a narrow range near the focal plane, with sub-diffraction precision. Such localization measurements can greatly benefit from the reduced background in selective-plane illumination schemes, but conventional LLS microscopy with a single detection objective and astigmatism-based axial detection could only achieve ~40-50 nm z localization precision. Various embodiments provide ~10× more efficient photon utilization efficiency of interferometric vs. astigmatism-based localization and the 2× higher SNR of 3D-iLLS vs. conventional LLS should push the 3D nanometer localization precision to the sub-10 nm regime.

Although objects like Brd4 clusters can be localized in 3D-iLLS reconstructed cellular volumes, imaging sequential optical sections by z scanning compromises speed. Certain applications such as single-molecule localization-based imaging and single-particle tracking require fast 3D coordinate determination, in a narrow range within the focal plane, with sub-diffraction precision. Such localization measurements can greatly benefit from the reduced background in selective-plane illumination schemes, but conventional LLS microscopy with a single detection objective and astigmatism-based axial detection could only achieve ~40-50 nm z localization precision[7,14,15]. We reason that the ~10× more efficient photon utilization efficiency[3] of interferometric vs. astigmatism-based localization and the 2× higher SNR of 3D-iLLS versus conventional LLS should push the 3D nanometer localization precision to the sub-10 nm regime.

To harness 3D-iLLS for improved z localization precision, various embodiments may implement modulation interferometry[3], an approach that previously achieved ~1-2 nm z localization precision. Various embodiments extract the z position by dynamically modulating the length of one of the interferometer arms and measuring the phase of the ensuing intensity modulation (FIGS. 3A and 9A). Previously modulation interferometry relied on the coherence of two counter-propagating excitation beams. Here, various embodiments instead rely of the coherence of the emitted fluorescent photons. Importantly, for emission interference, the two ports of the interferometer beam splitter are shifted by $\approx 90°$ relative to each other, thus enabling measuring two phases simultaneously, on the two detection cameras respectively. In the excitation-only interference configuration, the fluorescence signals in the two ports of the intereferometer beam splitter are in-phase, while for emission-only interference, the two signals are out-of-phase relative to each other. This effect thus enables measuring two phases simultaneously, one on each detection camera (FIGS. 17A-17B), which also improves the temporal resolution of modulation interferometry by 2-fold (FIGS. 3A-3D, FIGS. 9A-9D and FIGS. 17A-17B). Various embodiments take advantage of this effect to improve the temporal resolution of modulation interferometry by 2-fold (FIGS. 3B and 9B). Using the combined phases from Cameras 0 and 1, with a 6-phase or 4-phase modulation cycle, embodiments of the 3D-iLLS setup may achieve $\approx 2$ nm and $\approx 8$ nm z localization precision respectively (FIGS. 3C, 3D, 9C, and 9D). This "open loop" performance, without any active stabilization, indicates short-term mechanical stability of the 3D-iLLS design in the <10 nm regime. In various embodiments, 3D-iLLS and modulation interferometry also enabled successfully tracking the 3D movement of single 24×PP7 mRNAs tagged with tdPCP-Halo-JF646 in the cytoplasm of live U-2 OS cells (FIG. 3E). These results illustrate how 3D-iLLS can also be exploited for dynamic 3D single-particle tracking in live cells.

The disclosed results establish 3D-iLLS as a versatile technique with improved volumetric imaging of crowded cellular samples. 3D-iLLS increases the axial (z) resolution to ~100 nm FWHM, compared to ~400 nm FWHM using conventional dithered LLS (after deconvolution, at 640/700 nm excitation/emission wavelengths, respectively). 3D-iLLS-SIM features ~180×250×120 nm FWHM xyz resolution compared to ~180×250×310 nm FWHM xyz resolution for conventional LLS-SIM (both at 560/580 nm excitation/emission wavelengths, respectively). The volume of the overall PSF ovoid ($\approx 4/3\ \pi r_x r_y r_z$, where $r_x$, $r_y$ and $r_z$ are the PSF half-width-at-half-maximum along x, y and z, respectively) for 3D-iLLS-SIM as implemented here (NA 1.1 for detection, NA 0.65 for excitation) is almost identical to conventional 3D-SIM with high NA oil immersion lenses (NA 1.4, ~130×130×320 nm FWHM xyz resolution), with both techniques featuring ~$2.8\times10^{-3}$ μm PSF volume at 560/580 nm excitation/emission wavelengths, respectively. However, the selective-plane illumination of 3D-iLLS-SIM offers reduced out-of-focus background and photobleaching compared to epi-illumination of conventional 3D-SIM, which facilitates imaging of weak signals. The volumetric resolution is only 17% worse (~$2.8\times 10^{-3}$ μm vs. ~$2.4\times10^{-3}$ μm) than what achieved by 3D LLS with non-linear SIM using patterned activation (3D PA NL-SIM; 118×230×170 nm FWHM xyz resolution, for the Skylan-NS fluorophore and 405/488/520 nm photoactivation/excitation/emission wavelengths, respectively). 3D-iLLS-SIM, compared to 3D PA NL-SIM, does not require specialized fluorophores or sample exposure to violet light.

In various embodiments, 3D-iLLS and modulation interferometry[3] may enhance 3D localization-based super-resolution imaging, with the reduced background being particularly useful when imaging densely labeled samples[14]. The properties of 3D-iLLS could further be leveraged for future implementations of parallelized methods that use excitation patterns featuring intensity zeros (e.g. 3D MINFLUX) and for enhancing precision and reducing background in other modulation-enhanced localization microscopy approaches, particularly for single-particle tracking and localization imaging in live cells.

Various embodiments of the 3D-iLLS approach exhibit adequate short-term stability for many applications. For prolonged time-lapse observations or for localization-based super-resolution imaging requiring hrs-long acquisitions, various embodiments could further employ active stabilization, as can be implemented for a 4Pi modulation interferometry setup, to ensure registration between the two opposed lenses and correct for phase shifts of the interferometer.

Various embodiments may employ adaptive optics[16] to correct for system and sample induced aberrations to further optimize the interferometric PSF properties, reducing the axial extend of the detection and excitation PSFs and well as better matching the detection PSFs to increase coherence, and maintaining these optical properties for 3D-iLLS imaging of optically thicker, multi-cellular systems.

3D-iLLS-SIM offers increased OTF contiguity compared to 3D-iLLS with dithered LLS, but some ringing may still be present in the final reconstructions of certain embodiments. Additional deconvolution after SIM reconstruction might further improve image quality. However multiple reasons might underlie this remaining ringing: imperfect experimental OTF calibrations or imprecise illumination parameter estimation used for SIM reconstruction, as well as sample-induced phase differences between the two detection arms and subtle distortions of the LLS excitation pattern due to system- and sample-induced aberrations. Beyond affecting global image quality, such effects could also result in an effective OTF that is spatially-varying throughout the sample volume. System aberrations could be corrected or accounted for by more detailed OTF calibrations, but sample-induced effects might be more difficult to predict a priori. In various embodiments, more elaborate data acquisition and image reconstruction schemes could then be employed to mitigate such effects: use of spatially-varying SIM reconstruction parameters and/or a spatially-varying OTF, e.g. obtained by OTF calibrations at multiple points of the field-of-view and/or data acquisitions with different phase-shifter settings.

Various embodiments of the 3D-iLLS approach could also be modified for multi-color super-resolution imaging that relies on single-molecule discrimination between spectrally overlapping dyes. To image two spectrally well-separated dyes, various embodiments may perform two-color imaging sequentially, refocusing the objective lenses after completing a z-stack for the first color. Quasi-simultaneous, e.g. by interlacing different colors at each z position, multi-color 3D-iLLS live-cell imaging and single-particle tracking could be achieved using fast adaptive optics, such as deformable mirrors, in the detection path, to enable real-time corrections of chromatic aberrations. In various embodiments, Field Synthesis Theorem[33] could also be employed as an alternative to dithered LLS, to potentially generate excitation patterns for 3D-iLLS that better fill the OTF. Further, various embodiments can be further augmented by introducing additional excitation lenses[18] and implementing full 3D SIM schemes, for eventual live-cell 3D-iLLS-SIM at sub-100 nm isotropic 3D resolution.

Section A(1): 3D-iLLS Microscope Setup

In various embodiments, the 3D-iLLS setup may be built on an actively stabilized vibration isolation platform (TMC, Stacis iX) inside a temperature-controlled room. The 3D-iLLS microscope may comprise an LLS excitation path orthogonal to the optical axis of two opposed detection lenses in a 4Pi interferometric arrangement. Various embodiments may use a custom 26.7×0.7 NA excitation objective lens (Special Optics, 54-10-7) and two 25× 1.1 NA detection objective lenses (Nikon, MRD77225).

Section A(1)(i): Detection Path

In various embodiments, the first detection lens may be mounted on a 3D flexure stage driven by differential micrometers (Thorlabs, MBT616D). The second detection lens may be mounted on a 3D flexure stage configured with differential micrometers and additional closed-loop piezoelectric actuators (Thorlabs, MAX301). An additional 50 mm-travel stage driven by a stepper motor (Thorlabs, LNR50S) may be used for coarse positioning of the second detection lens. Various embodiments may use an interferometric detection path that is similar to the modulation interferometry setup described in Wang et al., Cell 167, 1839-1852 e1821 (2016), including a motorized platform for coarse path-length scanning and a piezoelectric phase shifter for fine-tuning/fast modulation (Physik Instrumente, S-303.CD with E-709.CHG controller). The fluorescence beams from the two detection lenses interfere at a non-polarizing beam splitter, and the light from the two exit ports is filtered using quad notch filters (Semrock, StopLine NFO3-405/488/561/635E-25) and emission filters (Chroma, ET525/50m, ET595/50m, and ET700/75m; selectable using a filter wheel; Thorlabs, FW103H), before it is imaged onto two sCMOS cameras (Hamamatsu, C11440-22CU) with two f=50 cm achromatic lenses. Final magnification is ≈100 nm/pixel.

Section A(1)(ii): Excitation Path

In various embodiments, the excitation path may be built based on, for example, the LLS design reported at Chen et al., *Science* 346, 1257998 (2014)[7]. An ATOF device (AA OPTO-ELECTRONIC, ATFnC-400.650-TN and MPDS8C driver) may facilitate on-off switching of a CW laser beam (488 nm, 560 nm, and 642 nm; MPB Communications, 2RU-VFL-P-500-488-B1R, 2RU-VFL-P-500-560-B1R, and 2RU-VFL-P-500-642-B1R or 2RU-VFL-P-2000-642-B1R, respectively) and modulating laser power. An elliptical lens telescope may reshape the excitation beams before they are spatially modulated by a combination of a phase-only spatial-light-modulator (SLM; Forth Dimension Displays, QXGA-3DM), an achromatic quarter-wave plate and a polarizing beam splitter cube. The modulated beam may be Fourier-Transformed with a lens and the unmodulated light may be blocked using a custom annular mask (Photo Sciences, custom design). The resulting 2D optical lattice may be dithered using an x-axis galvanometer (Thorlabs, GVS001), placed a plane conjugate to the Back-Focal-Plane (BFP) of the excitation lens. Sample- and BFP-conjugate cameras (Thorlabs, DCC1545M and Edmund EO-0312M) may be used for inspection of the 2D lattice pattern.

Section A(1)(iii): Instrument Control and Synchronization

In various embodiments, instrument control and synchronization may be achieved with a custom Lab-VIEW (National Instruments, 2015 64-bit) application and an FPGA-based real-time hardware system (National Instruments, PCIe-7852R LX50).

Section A(1)(iv): Sample Mounting and Sample Cell

To position electron microscopy grids in the space between the three objective lenses, various embodiments may utilize a pincher-grip sample holder machined out of a stainless-steel rod. The sample holder may be mounted on a rotation mount and pitch-adjustable kinematic adapter (Thorlabs, RSP05 and TPA01), which may further be mounted on a 3D nanopositioning stage (Physik Instrumente, P-733.3DD with E-727.3CDA controller) and an xyz micrometer-driven translation stage (Thorlabs, LNR25M). The sample may be immersed from the top into a cubic chamber machined out of stainless-steel (FIG. 6). Three of the horizontal faces of the chamber may contain openings for the detection and excitation lenses. Silicone sheets (~100 µm thick) may stretch over each lens and provide sealing. The fourth horizontal face of the sample holder may contain a glass window for observing the interior of the chamber.

Section A(1)(v): Live-Cell Imaging

In various embodiments, for live-cell imaging, the temperature of the three objectives and the sample cell may be regulated to ~37° C., using, for example, resistive heaters and thermistor sensors except for the experiment in FIGS. 13A-13D, which was performed at 23° C. A separate temperature controller (Thorlabs, TC200) may be used to regulate the temperature of each objective lens, as well as a heating plate at the base and a cover plate at the top of the sample cell respectively. The exact temperature set-points may be determined empirically, while the temperature of the media inside the sample cell may be verified with an independent out-of-loop probe. The top cover plate may further be used for delivering a mixture of $N_2$, $CO_2$ and $O_2$ gases, with flow-rates that can be controlled by, for example, three independent mass-flow controllers (Omega Engineering).

Section A(2)(i): Cell Sample Preparation: EM Grid Preparation, Bead Deposition and Cell Seeding In various embodiments, cells are cultured on gold electron microscopy (EM) grids with Formvar films (Ted-Pella, 01703G). Glass may be unsuitable as it may be too thick, causing excessive levels of distortion of signal in various embodiments. In example embodiments, for mESC cells, EM grids were pre-coated with 5 mg/ml laminin (Bio-Lamina LN511) at 37° C. overnight in a humidified 5% CO2 incubator. For U-2 OS and COS-7 cells, EM grids were pre-coated with collagen (Sigma C8919) at 37° C. overnight in a humidified 5% CO2 incubator. In both cases, the EM grids were coated with the Formvar film facing up. After coating, EM grids were briefly rinsed with 1×PBS solution and flipped over for adding fluorescent bead fiducials. 0.1 µm TetraSpeck beads (ThermoFisher Scientific T7279) were diluted 1:300 with 1×PBS and $MgCl_2$ was added to the diluted beads to a final concentration of ~0.1M. Diluted beads were then deposited onto EM grids for 10 min at 37° C. and removed, rinsed briefly with 1×PBS. EM grids were then flipped over with the Formvar film facing up and placed in glass bottom microwell dishes (MatTek, P35G-1.5-14-C), ready for cell seeding. Cells were trypsinized, counted and ~0.3 million cells were seeded in the appropriate media. As various embodiments of the 3D-iLLS imaging involve optical access from 3 sides, cells growing attached on the Formvar film near the middle of the grid holes, and that could be illuminated and imaged unobstructed from the grid bars, were selected for imaging experiments.

Section A(2)(ii): Cell Sample Preparation: Cell Culture and Staining

In various embodiments, all cell cultures may be maintained at 37° C., in 5% v/v CO2 atmosphere, in a humidified incubator. In example embodiments, Brd4 OMG cells were cultured with +2i media with 400 µg/ml G418 (Sigma G8168-10ML) on 0.1% gelatin-coated dish, at 37° C. in a humidified 5% CO2 incubator. +2i media contain D-MEM (Thermo Fisher Scientific 10313021), 15% fetal bovine serum (Gemini Bio 100-500), 0.1 mM 2-mercaptoethanol (Thermo Fisher Scientific 21985023), 2 mM L-alanyl-L-glutamine (Thermo Fisher Scientific 35050079), 1×MEM nonessential amino acids (Thermo Fisher Scientific 11140076), 1000 U/mL LIF (Millipore ESG1107), 3 uM CHIR99021 (Millipore 361559) and 1 uM PD0325901 (Axon Medchem 1408). Before imaging, cells were seeded with −2i media plus 400 µg/ml G418. For SiR staining, cells were labeled with 0.3 µM SiR-BG for 10 min, at 37° C., followed by three times rinsing with new media.

In example embodiments, CMV clone 5 cells were maintained in McCoy's 5A media without phenol-red (GE Healthcare SH30200.01), supplemented with 10% fetal bovine serum (Gemini Bio, 100-500), 1×Non-essential Amino Acids Solution (Thermo Fisher Scientific 11140050), 1 mM Sodium Pyruvate (Thermo Fisher Scientific 11360070), 100 U/mL Penicillin-Streptomycin (Thermo Fisher Scientific, 15140122) plus 1 ug/ml α-amanitin (Sigma A2232) and 1 ug/ml Puromycin (Sigma P8833) . CMV clone 5 cells were nucleofected with 0.2 µg tdPCP-Halo and 0.5 µg TetR-RFP plasmids (Amaxa kit VCA-1003, Lonza) and seeded with media containing α-amanitin and Puromycin. 1-3 days post-nucleofection cells were stained with JF646-SNAP-tag ligand (JF646-BG) and used for imaging experiments. For staining, cells were incubated with media containing 1 μM JF646-BG for 1 hr, rinsed once with new media, and replaced with new media containing drugs.

COS-7 cells were maintained in EMEM (ATCC, 30-2003) media, supplemented with 10% fetal bovine serum (Gemini Bio, 100-500) and 100 U/mL Penicillin-Streptomycin (Thermo Fisher Scientific, 15140122). COS-7 cells were transfected with plasmids (Tomm-20 Halo, Addgene 123284) and then plated in EMEM media. 1-4 days post transfection cells were seeded onto collagen-coated EM grids. Before live-cell imaging, cells were incubated with EMEM media containing 1 μM JF646-Halo for 1 hr, rinsed once with new media, and placed in fresh media.

Section A(2)(iii): Cell Sample Preparation: Cell Fixation

In various embodiments, cells may be fixed with, for example, freshly-prepared 4% v/v methanol-free Formaldehyde (Thermo Scientific 28906) in 1×PBS at room temperature for 10 min, and then rinsed 3 times with 1×PBS. After fixation, samples were stored at 4° C. in example embodiments.

Cell immunofluorescence. EM grids seeded with COS-7 cells were briefly rinsed PBS and then fixed with 3% v/v formaldehyde and 0.1% v/v glutaraldehyde in PBS for 10 min at RT. The fixed cells were further rinsed with PBS and quenched with freshly made 0.1% w/v sodium borohydride in PBS for 7 min. Next, the cells were permeabilized with blocking buffer (3% BSA, 0.5% Triton X-100 in PBS) for 10 min and stained with primary antibodies (Mouse anti-α-tubulin, Thermo Fisher Scientific 32-2500, 1/100 dilution; Rabbit anti-Tomm20, Sigma HPA011562, 1/50 dilution) for 2 hr in blocking buffer. The sample was further washed with a washing buffer (0.2% BSA, 0.1% Triton X-100 in PBS) three times for 10 min each. The sample was incubated for 2 hr with secondary antibodies (Goat Anti-Mouse-IgG-Atto647N, Sigma 50185, 1/300 dilution; Donkey Anti-Rabbit IgG-CF568, Sigma SAB4600076, 1/800 dilution) in blocking buffer, and then rinsed washed with PBS three times for 10 min each. Finally, the sample was post-fixed with 3% v/v formaldehyde and 0.1% v/v glutaraldehyde in PBS for 10 min at RT, and then stored in PBS at 4° C. until imaging.

Section A(2)(iv): Cell Sample Preparation: Bead Alignment/Calibration Sample For routine alignment and calibration of the instrument, various embodiments may use, for example, a mixture of 40 nm spheres (Thermo Fisher Scientific, TransFluoSpheres 488/645, T10711) as well the 0.1 μm Tetraspek beads deposited on gold EM grids with Formvar films. The 0.1 μm beads may provide higher signal and could facilitate fast mapping of the LLS excitation profile, while the 40 nm spheres may be used for fine-tuning the interferometer alignment.

Section A(3): Data Acquisition and Analysis 3D-iLLS and conventional LLS imaging may be performed by scanning the sample through the stationary LLS excitation pattern. Various embodiments scan the sample simultaneously in yz along an axis ~35° relatively to the LLS propagation direction (see FIG. 6C). The z step size may be 20 nm and the exposure time may be 10 msec (the SLM sequence includes consecutive balanced positive and negative images, each lasting 10 msec; laser exposure was performed only in the first 10 msec, during the positive SLM image). In various embodiments, the speed constraints for 3D-iLLS are similar to conventional LLS, but to accommodate the increased z resolution, finer axial sampling and thus smaller z step size may be needed. Exposures down to a few msec are also within the capabilities of embodiments of the disclosed 3D-iLLS hardware (sCMOS camera, galvanometer and piezoelectric nanopositioners).

3D-iLLS-SIM acquisition was performed with five LLS excitation pattern phases (spaced by $2\pi/5$), by stepping the x galvanometer. Five sequential exposures were performed at each z position before moving to the next z position. Various embodiments imaged a $27\times27\times10$ μm$^3$ volume, obtaining a total of $5\times500=2500$ raw images per volume. Each raw image required ≈25 msec, for a total of ≈62.5 sec per volume. Two-color 3D-iLLS-SIM imaging was performed sequentially, by refocusing the detection lenses after a z stack for the first color was completed, using a bead fiducial.

3D particle tracking using modulation interferometry may be performed by keeping the sample stationary and stepping the piezoelectric phase shifter in increments corresponding to relative phase changes of 90° or 60°, for 4-step and 6-step modulation cycles respectively. For far-red fluorescence emission, the step sizes may be 182.5 nm and 121.67 nm respectively, as one modulation period corresponds to ≈730 nm translation of the phase shifter. Raw image data may be saved in binary format and imported for processing in, for example, MATLAB (Mathworks, 2014b).

Generation of LLS excitation patterns. For 3D-iLLS with minimal overall PSF side lobes the thinnest achievable LLS excitation is desired. Based on our numerical calculations (FIGS. 4A-4B, 5A-5B, 7B-7I, 14 and 15A-15B), various embodiments used a fundamental rectangular lattice, with wave-vector corresponding to 0.59 NA and annular mask corresponding to NA range of 0.52-0.65. The main excitation peak is ~500 nm FWHM, with additional weaker excitation peaks above and below. For 3D-iLLS with excitation confined to a single plane and for single-particle tracking with modulation interferometry, we used a fundamental square maximally symmetric lattice, with wave-vector corresponding to 0.6 or 0.64 NA and annular mask corresponding to NA range of 0.59-0.65. The main excitation peak is ~1 μm FWHM. For 3D-iLLS-SIM, as a tradeoff between speed (dictated by number of phase-stepped images required for SIM reconstruction) and OTF uniformity, we used a maximally symmetric fundamental hexagonal lattice (requiring 5 stepped images), with wave-vector corresponding to 0.58 NA and annular mask corresponding to NA range of 0.52-0.65.

Section A(3)(i): 3D-iLLS and 3D-iLLS-SIM Volume Reconstruction

In various embodiments, raw 3D-iLLS and conventional LLS data may be deskewed and deconvolved in, for example, MATLAB using the measured PSF. For example, in various embodiments, deconvolution may be applied to the images in FIGS. 2A and 2B but not to FIGS. 2C and 2D.

Deconvolution was performed in various embodiments using 10 iterations the Richarson-Lucy algorithm with no damping. For reconstruction, only the constructive interference channel (Cam0) was used, although alternative embodiments could combine the information from both constructive and destructive interference channels for optimal reconstruction. 3D-iLLS-SIM reconstruction was performed with the original 3D-SIM algorithm implemented in MATLAB, with an experimental OTF calibration for each wavelength using 100 nm fluorescent Tetraspek beads. Before 3D-SIM reconstruction, background was subtracted using a rolling-ball filter, which also removes some out-of-focus signal that could create high-frequency reconstruction artifacts. For the SIM reconstruction parameters the original algorithm was slightly modified, as follows: the modulation wavevector p was determined directly by peak-fitting the discrete Fourier transform (DFT) of the raw data. The DFT was calculated on a fine grid (10-fold upsampling factor compared to the $1/256$ pixels$^{-1}$ frequency resolution of the raw 256×256 image data), in a small region in Fourier space close to the expected peak position, to obtain the modulation wavevector at sub-pixel precision. We found that the exact value of the initial modulation phase parameter, $\varphi_0$, did not significantly affect the reconstruction results; thus, instead of estimating it computationally from the raw data, $\varphi_0$ was set manually based on the approximate experimental value (determined by the x galvo position) and adjusted (if needed) after inspecting the reconstructed data. The Wiener parameter, w, was set empirically, by inspecting the reconstructed data and balancing a trade-off between resolution and SNR: too large w results in blurred images and gaps in the FT of the reconstructed data, while too small w results in significant high-frequency noise.

Two-color SIM imaging was performed sequentially for each color. The two colors were aligned and registered in 3D using Tetrapek fluorescence bead fiducials attached on the EM grid. Live-cell time-lapse 3D-iLLS-SIM data were corrected for photobleaching using exponential fitting. The volumetric data may be imported in, for example, ImageJ for visualization and maximum projection calculations.

Section A(3)(ii): 3D-iLLS Particle Tracking Using Modulation Interferometry

In various embodiments, raw images may be imported in, for example, ImageJ and the frames from each modulation cycle may be grouped together in a single maximum projection image. In example embodiments, maximum projection images were imported in MATLAB for 2D particle tracking analysis[20]. The trajectories of selected particles were further refined by performing a 2D Gaussian fit in 11×11 pixel ROIs to obtain more accurate xy coordinates. For obtaining the z coordinate, various embodiments may first sum the intensity of the pixels in a 7×7 pixel ROI centered on the xy coordinate of the particle. To combine the intensities measured from Cam0 and Cam1, the intensity of Cam1 may be rescaled to the same mean and standard deviation as Cam0.

Embodiments of the procedure for combining the intensities of Cam0 and Cam1 is illustrated in FIGS. 17A-17B, and proceed as follows. During each n-step modulation cycle (n=4 or 6), in the first half of the cycle, Cam0 and Cam1 measure phases in the intervals 0°-180° and 180°-360°, respectively. Thus, the intensities from the two cameras measured in the first half (corresponding to the first n/2 steps of the phase shifter) can be combined in a single complete n-step modulation cycle. Similarly, in the second half of the cycle Cam0 and Cam1 now measure phases in the intervals 180°-360° and 0°-180°, respectively. The intensities from the two cameras measured in the second half (corresponding to the last n/2 steps of the phase shifter) can also be combined in a separate complete n-step modulation cycle. The end result is two successive n-step modulation cycles, each corresponding to half of the original n-step modulation cycle.

Finally, various embodiments may calculate the phase of the intensity modulation in each cycle to extract the z position. As two z position measurements can be extracted from each original n-step modulation cycle (FIGS. 17A-17B, the net effect is a 2-fold increase in temporal resolution. In each step, the modulation phase may be extracted in a $2\pi$ interval centered on the previous phase. It is noted that for particle displacements over successive cycles small compared to half of an interferometric period (a range of $\Delta z \approx 265$ nm/2=132.5 nm), various embodiments of this procedure also enable phase unwrapping and tracking over multiple interferometric fringes.

Section B: Numerical Calculations of 3D-iLLS PSFs

Various embodiments may utilize a numerical simulation pipeline that comprises the following steps: (1) estimating the excitation PSF by calculating the excitation electric field; (2) calculating the detection PSF by the electric field of single dipole emitters; (3) combining the excitation and dipole electric fields into a combined PSF, and (4) performing a near uniform orientation sampling and averaging the combined excitation-dipole electric fields of all the sampled orientations to obtain the final combined PSF. The numerical simulation pipeline illustrated with intermediate and final results is illustrated in FIG. 4A.

To calculate the desired SLM pattern for modulating the phase of the incident light and creating a certain bound 2D optical lattice, various embodiments may follow the LLS procedures outlined at Chen et al., *Science* 346, 1257998 (2014). This approach enables simulating the effects of various annular masks as well as lattice dithering. A 2D optical lattice may be created by interference of light beams that exit the excitation objective lens with propagation wave vectors strictly along a cone. The excitation light may thus enter the excitation objective back focal plane through an annulus (corresponding to a certain numerical aperture (NA)) of infinitesimal width. To confine the excitation light to a thin "sheet" along the x-axis by bounding the ideal 2D lattice along the z-axis, the propagation lattice wave vectors may be extended along the z-axis. Therefore, in various embodiments, the numerical simulation determines the wave vectors for a particular lattice, extends these wave vectors along z to confine the lattice (via the selected bounding function and the calculated SLM profile), and further constraints the z-extend of the wave vectors with the annular mask to achieve near non-diffracting illumination.

Section B(1): Calculation of Optical Lattice Excitation Electric Fields

Various embodiments may start with a desired 2D optical lattice selected from the set of all five 2D Bravais lattices. The mathematical framework for calculating 2D optical lattices is described at Betzig, *Opt Express* 13, 3021-3036 (2005) and Petsas et al., *Phys Rev A* 50, 5173-5189 (1994). Below is a discussion of key steps involved in the numerical simulation.

First, to obtain the wave vectors for a particular 2D optical lattice, a primitive vector set $A=[a_1, a_2]$ and its corresponding reciprocal vector set $B=[b_1, b_2]$ (where A and B are 2×2 matrices) can be obtained. For each optical lattice, there are infinite sets of primitive vectors that can define it. The corresponding optical lattices are of the same type except that they exhibit different periodicities depending on the choice of A: the fundamental lattice of a certain type has the minimum period, while higher order sparse lattices have increasingly higher periods.

$$A=[a_1, a_2] \quad (1)$$

For each set of primitive vectors, a corresponding reciprocal vector set B can be obtained.

$$B=[b_1, b_2]=2\pi(A^T)^{-1} \quad (2)$$

A connection between the set B and the (optical) wave vectors {k} has been established by previously reported observations[21,22]: first, a minimum of three wave vectors $k_0$, $k_1$, and $k_2$ are required to construct a 2D optical lattice; second, these wave vectors can be constructed by $$b_n=k_0-k_n, n=1, 2 \quad (3)$$

Since the excitation beams are monochromatic, all three wave vectors are of equal length.

$$|k_0| = |k_1| = |k_2| = \frac{2\pi}{\lambda} \quad (4)$$

By combining equations (5) and (6), a third condition can be obtained $$B^T \cdot k_0 = [b_1^T \cdot b_1, b_2^T \cdot b_2]^T \equiv \frac{\beta}{2} \quad (7)$$

With all three equations, the first wave vector $k_0$ can be solved as $$k_0 = (B^T)^{-1} \cdot B^T \cdot k_0 = (B^T)^{-1} \cdot \frac{\beta}{2} = \frac{1}{2\pi} \cdot A \cdot \frac{\beta}{2} = \frac{A \cdot \beta}{4\pi} \quad (8)$$

And the rest of the wave vectors, $k_1$ and $k_2$, can be solved as $$k_n = k_0 - b_n = \frac{A \cdot \beta}{4\pi} - b_n, n = 1, 2 \quad (9)$$

By Fourier transforming these wave vectors, the initial desired 2D lattice can be derived:

$$E_{ideal;fundamental/sparse}=FT[(k_0, k_1, k_2)] \quad (10)$$

However, these fundamental and sparse 2D optical lattices have broad foci that extend throughout the unit cell, thus limiting their use for creating thin sheets of illumination. To overcome this difficulty, composite 2D optical lattices are explored, which consist of a greater number of wave vectors than the minimum three: composite optical lattices have more confined excitation foci due to the constructive interference of the additional wave vectors. One way of generating more wave vectors is to perform symmetry operations on the initial three wave vectors. The maximum number of wave vectors is obtained through the maximum number of allowed symmetry operations, generating a maximally symmetric (composite) 2D optical lattice.

$$E_{ideal;composite\ (max\ symm)}=FT[\text{symmetry\_operation}(k_0, k_1, k_2)] \quad (11)$$

We can confine the ideal 2D lattice along the z-axis into a lattice light sheet using an arbitrary bounding function $\psi(z)$.

$$E_{bound}=\psi(z)\cdot Re(E_{ideal}) \quad (12)$$

The profile of this bound lattice is then used to create the phase pattern of the binary SLM with a Heaviside step function H.

$$\varphi_{SLM}=\pi \cdot H(E_{bound}-\varepsilon) \quad (13)$$

where $\varepsilon$ is an arbitrary cutoff.

Once the phase pattern for the SLM is obtained, we derive the excitation profile at the xz focal plane using an annular mask N that removes unwanted diffractions after transforming the phase-modulated beam.

$$PSF_{ex}=|FT[N \cdot FT(e^{i\varphi SLM})]|^2 \quad (14)$$

Although the above 2D simulation reveals the excitation profile at the xz focal plane, it does not describe how the bound lattice propagates along the y-axis, which ultimately determines the effective field of view. We calculate the 3D excitation electric field, which is approximately expressed in the near-focus space as[23]:

$$\vec{E}(x, y, z) = (E_x, E_x, E_x) \quad (15)$$
$$\begin{cases} E_x = -iA(I_0 + I_2 \cos 2\varphi) \\ E_y = -iAI_2 \sin 2\varphi \\ E_z = -2AI_1 \cos \varphi \end{cases}$$

where $I_0$, $I_1$, and $I_2$ are integrals over the aperture of the excitation objective; A is a scalar; $\varphi$ is the azimuth in the cylindrical coordinate system.

However, numerically solving the above equations is not efficient due to the inherent nested loops used to calculate the integrals. Interestingly, an alternative implementation of the integrals as a Fourier transform significantly increases the speed of numerical calculations[24] and thus is incorporated in this simulation.

Example simulation parameters are provided in the following tables:

TABLE 1

Lattice-type-specific parameters used in simulating the six different 2D lattice light sheet excitation profiles in FIG. 3.

| 2D lattice | Bounding Gaussian function σ (λ/NA) | Wave vector length (NA) | Annular mask inner diameter (NA) |
| --- | --- | --- | --- |
| Fundamental rectangular | 1.5 | 90% | 80% |
| Fundamental square maximally symmetric | 0.15 | 92% | 93% |
| Fundamental hexagonal maximally symmetric | 0.3 | 100% | 93% |
| First-order sparse square maximally symmetric | 0.8 | 94% | 92% |
| First-order sparse square maximally symmetric with 45° rotation | 0.8 | 94% | 92% |
| First-order sparse hexagonal maximally symmetric | 1.5 | 100% | 85% |
| Fundamental Hexagonal | 2 | 90% | 80% |

TABLE 1-continued

Lattice-type-specific parameters used in simulating the six different 2D lattice light sheet excitation profiles in FIG. 3.

| 2D lattice | Bounding Gaussian function σ (λ/NA) | Wave vector length (NA) | Annular mask inner diameter (NA) |
|---|---|---|---|
| Fundamental square maximally symmetric | 2 | 90% | 80% |
| Fundamental hexagonal maximally symmetric | 2 | 90% | 80% |
| First-order sparse square maximally symmetric | 2 | 90% | 80% |
| First-order sparse square maximally symmetric with 45° rotation | 2 | 90% | 80% |
| Fundamental hexagonal maximally symmetric with 90° rotation | 2 | 90% | 80% |

TABLE 2

Common parameters used in simulating the six different 2D lattice light sheets in FIG. 3.

| Common simulation parameters | Values |
|---|---|
| Excitation wave length | 641 nm |
| Heaviside coefficient ε | 0.1 |
| Annular mask outer diameter | 100% NA |
| Excitation objective NA | 0.65 |
| Excitation objective focal length | 7 mm |
| Refractive index of imaging medium | 1.33 |
| Emission objective wave length | 700 nm |
| Emission objective NA | 1.1 |

Section B(2): Calculation of Single Dipole Emission Electric Fields

After calculating the electric field of the excitation LLS in 3D, various embodiments may next simulate the 3D electric field of the emission from a single dipole. The dipole emission imaged by one of the detection objectives can be expressed as:

$$E_1(r, z, \varphi) = (E_x, E_y, E_z) \tag{16}$$

$$E_a = B \int_0^{\theta_{max}} d\theta \sin\theta \cdot G_{ab}{}^E(r, \theta, \varphi) p_b e^{ikz \cos\theta} \tag{17}$$

where r is the distance from the optical axis (z-axis for emission detection) to the point-of-interest; θ is the angle between the vector pointing from the focus to the point on the aperture; $\theta_{max}$ is the maximum angle of the aperture of the detection lens; φ is the azimuth angle in cylindrical coordinates; z is the distance away from the focus along the optical axis; $G_{ab}{}^E$ is a tensor whose components are given by Enderlein, *Opt Lett* 25, 634-636 (2000).

When the apertures of two opposite imaging objectives are superimposed coherently, the dipole electric field can be combined as:

$$E_{dipole} = E_1 + E_2 \tag{18}$$

$$E_2(r, z, \varphi) = \begin{pmatrix} 1 & 0 & 0 \\ 0 & -1 & 0 \\ 0 & 0 & -1 \end{pmatrix} E_1(r, -z, -\varphi) e^{\Delta \psi} \tag{19}$$

where ΔΨ denotes the path-length difference between the two detection interferometer arms.

Section B(3): Calculation of the Overall PSF

Once the electric fields of the LLS excitation and the dipole emission are obtained, the response of the interferometric LLS microscope to a single point emitter of a particular dipole orientation can be described with the overall point spread function (PSF), in various embodiments. In dithered mode, the x-axis continuous illumination is achieved by using the x-galvo to scan the excitation beam over multiples of that lattice period along the x-axis, which can be modeled numerically by shifting the 3D electric field over one period. Therefore, the averaged overall PSF is calculated as:

$$PSF_{overall,i} = |E_{dipole,i}|^2 \cdot \int_x^T dx \cdot |E_{ex} \cdot p_{dipole,i}|^2 \tag{20}$$

where $p_{dipole,i}$ is the i-th orientation of a particular emitting dipole; T is the period of the 2D optical lattice along the x-axis.

We further perform a near uniform sampling of points across a sphere to account for possible orientations explored by organic dyes or fusion fluorescent proteins that are either conjugated with a flexible linker or simply freely diffusing in the cell. However, for N other than 2, 3, 4, 6, 8, 10, or 12, there is no analytical solution to place N points at equal distance to the adjacent points on a spherical surface. Random uniform sampling of z in [−1, 1] and φ in [0, 2π] in a spherical coordinate system introduces clustering[7], which is more pronounced when N is relatively small. To avoid potential bias in the numerical calculations of the overall PSF, we follow an alternative sampling method that results in near uniform distribution of dipole orientations[8]: the sphere is first separated into equally-spaced equators, each of which is then separated into segments of length approximately equally to the inter-equator distance with ends being the sampled orientations (FIG. 3B).

Finally, we sum the overall PSFs of all sampled orientations to generate the averaged overall PSF:

$$PSF_{overall} = \sum_i^n PSF_{overall,i} \tag{21}$$

The 3D OTF was obtained from the 3D PSF using the 3D fast Fourier transform, OTF(k)=FFT(PSF(x)).

The results for calculated 3D-iLLS PSFs for different types of bound 2D lattice excitation profiles are shown in FIG. 5. The results for calculated 3D-iLLS and 3D-iLLS-SIM OTFs for different types of bound 2D lattice excitation profiles are shown in FIG. 14. A comparison between OTFs and PSFs for dithered 3D-iLLS and 3D-iLLS-SIM are shown in FIGS. 15A-15B.

Section C: Computing Environment

Referring to FIG. 10, an example system 1000 for implementing potential embodiments of the disclosure is depicted.

System 1000 includes a computing device 1010 (or multiple computing devices, co-located or remote to each other) communicatively coupled with a platform 1090 on which a sample may be placed, a detection system 1050 (which may include one or more lenses, light detectors such as cameras or other imagers, microscopes, photodiodes, charge-coupled devices, etc.) that may acquire images of the sample on the platform 1090 and which may detect signals from target molecules (e.g., light from fluorophore-tagged and excited target molecules), and an excitation system 1070 (e.g., a laser system that emits laser light or other highly-coherent light and lenses) capable of exciting the sample on the platform 1090.

The computing device 1010 may include a controller 1014 that may be configured to exchange control signals with the detection system 1050 (or components thereof), allowing the computing device 110 to be used to control the capture of images and/or signals via sensors and lenses of the detection system 1050, retrieve imaging data or signals, direct analysis of the data and signals, and output analysis results. The controller 1014 may be configured to exchange control signals with the excitation system 1070 (or components thereof) allowing the computing device 1010 to be used to control the excitation with respect to samples on platform 1090. The controller 1014 may also be configured to exchange control signals with the platform 1090 (or components thereof), allowing the computing device 1010 to be used to control the position of the sample with respect to the detection system 150 and/or the excitation system 1070. The controller 1014 may include one or more processors and one or more volatile and non-volatile memories for storing computing code and data that are captured, acquired, recorded, and/or generated.

One or more user interfaces 1018 allow the computing device 110 to receive user inputs (e.g., via a keyboard, touchscreen, microphone, camera, etc.) and provide outputs (e.g., via a display screen, audio speakers, etc.). A transceiver 1022 allows the computing device 1010 to exchange readings, control commands, and/or other data with, for example, detection system 1050, excitation system 1070, and/or platform 190, or components thereof, or with other systems and devices. Computing device 1010 may include an excitation unit 1026 configured to control the excitation system 1070 to excite a sample on platform 1090. Computing device 1010 may include a detection unit 1030 configured to control the detection system 1050 to, for example, detect fluorescence from a sample on platform 1090. Computing device 110 may also include a PSF/simulation module 1034 configured to perform, for example, the numeral calculations described in Section B.

Various additional enabling details may also be found in such references as the following:

1. Hell, S. & Stelzer, E. H. K. Properties of a 4pi Confocal Fluorescence Microscope. *J Opt Soc Am A* 9, 2159-2166 (1992).
2. Gustafsson, M. G. L., Agard, D. A. & Sedat, J. W. Sevenfold Improvement of Axial Resolution in 3d Widefield Microscopy Using 2 Objective Lenses. *P Soc Photo-Opt Ins* 2412, 147-156 (1995).
3. Wang, G., Hauver, J., Thomas, Z., Darst, S. A. & Pertsinidis, A. Single-Molecule Real-Time 3D Imaging of the Transcription Cycle by Modulation Interferometry. Cell 167, 1839-1852 e1821 (2016).
4. Gustafsson, M. G., Agard, D. A. & Sedat, J. W. I5M: 3D widefield light microscopy with better than 100 nm axial resolution. *J Microsc* 195, 10-16 (1999).
5. Shtengel, G. et al. Interferometric fluorescent super-resolution microscopy resolves 3D cellular ultrastructure. *Proc Natl Acad Sci USA* 106, 3125-3130 (2009).
6. Aquino, D. et al. Two-color nanoscopy of three-dimensional volumes by 4Pi detection of stochastically switched fluorophores. *Nat Methods* 8, 353-359 (2011).
7. Chen, B. C. et al. Lattice light-sheet microscopy: imaging molecules to embryos at high spatiotemporal resolution. *Science* 346, 1257998 (2014).
8. Gao, L. et al. Noninvasive imaging beyond the diffraction limit of 3D dynamics in thickly fluorescent specimens. *Cell* 151, 1370-1385 (2012).
9. Gebhardt, J. C. et al. Single-molecule imaging of transcription factor binding to DNA in live mammalian cells. *Nat Methods* 10, 421-426 (2013).
10. Huisken, J., Swoger, J., Del Bene, F., Wittbrodt, J. & Stelzer, E. H. Optical sectioning deep inside live embryos by selective plane illumination microscopy. *Science* 305, 1007-1009 (2004).
11. Planchon, T. A. et al. Rapid three-dimensional isotropic imaging of living cells using Bessel beam plane illumination. *Nat Methods* 8, 417-423 (2011).
12. Vettenburg, T. et al. Light-sheet microscopy using an Airy beam. *Nat Methods* 11, 541-544 (2014).
13. Li, J. et al. Single-Molecule Nanoscopy Elucidates RNA Polymerase II Transcription at Single Genes in Live Cells. *Cell* 178, 491-506 e428 (2019).
14. Legant, W. R. et al. High-density three-dimensional localization microscopy across large volumes. *Nat Methods* 13, 359-365 (2016).
15. Liu, Z. et al. 3D imaging of Sox2 enhancer clusters in embryonic stem cells. *elife* 3, e04236 (2014).
16. Liu, T. L. et al. Observing the cell in its native state: Imaging subcellular dynamics in multicellular organisms. *Science* 360 (2018).
17. Nagorni, M. & Hell, S. W. Coherent use of opposing lenses for axial resolution increase. II. Power and limitation of nonlinear image restoration. *J Opt Soc Am A Opt Image Sci Vis* 18, 49-54 (2001)
18. Pertsinidis, A. & Wang, G. WO2018106678A1
19. Gustafsson, M. G. et al. Three-dimensional resolution doubling in wide-field fluorescence microscopy by structured illumination. *Biophys J* 94, 4957-4970 (2008).
20. Crocker, J. C. & Grier, D. G. Methods of digital video microscopy for colloidal studies. *J Colloid Interf Sci* 179, 298-310 (1996).
21. Betzig, E. Excitation strategies for optical lattice microscopy. *Opt Express* 13, 3021-3036 (2005).
22. Petsas, K. I., Coates, A. B. & Grynberg, G. Crystallography of optical lattices. *Phys Rev A* 50, 5173-5189 (1994).
23. Richards, B. & Wolf, E. Electromagnetic Diffraction in Optical Systems .2. Structure of the Image Field in an Aplanatic System. *Proc R Soc Lon Ser-A* 253, 358-379 (1959).
24. Leutenegger, M., Rao, R., Leitgeb, R. A. & Lasser, T. Fast focus field calculations. *Opt Express* 14, 11277-11291 (2006).
25. Enderlein, J. Theoretical study of detection of a dipole emitter through an objective with high numerical aperture. *Opt Lett* 25, 634-636 (2000).
26. Weinstein, E.W. Sphere Point Picking.
27. Deserno, M. How to generate equidistributed points on the surface of a sphere. (2004).
28. Li, D. et al. ADVANCED IMAGING. Extended-resolution structured illumination imaging of endocytic and cytoskeletal dynamics. *Science* 349, aab3500 (2015).

29. Nagorni, M. & Hell, S. W. Coherent use of opposing lenses for axial resolution increase in fluorescence microscopy. I. Comparative study of concepts. *J Opt Soc Am A Opt Image Sci Vis* 18, 36-48 (2001).

30. Bossi, M. et al. Multicolor far-field fluorescence nanoscopy through isolated detection of distinct molecular species. Nano letters 8, 2463-2468 (2008).

31. Zhang, Z., Kenny, S. J., Hauser, M., Li, W. & Xu, K. Ultrahigh-throughput single-molecule spectroscopy and spectrally resolved super-resolution microscopy. Nature methods 12, 935-938 (2015).

32. Zhang, Y. et al. Nanoscale subcellular architecture revealed by multicolor three-dimensional salvaged fluorescence imaging. Nature methods 17, 225-231 (2020).

33. Chang, B.-J. et al. Universal light-sheet generation with field synthesis. Nature methods 16, 235-238 (2019).

34. Turcotte, R. et al. Dynamic super-resolution structured illumination imaging in the living brain. Proc Natl Acad Sci U S A 116, 9586-9591 (2019).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. In various embodiments, the terms "approximately," "about," "substantially", and similar terms may allow for, for example, a deviation of 5%, 10%, 15%, or 20%, or 25%.

It should be noted that the terms "exemplary," "example," "potential," and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A microscopic imaging system comprising:
    a light detection apparatus comprising two opposed detection lenses, the light detection apparatus being configured to detect fluorescence beams emitted from a sample; and
    a light emission apparatus comprising an excitation lens configured to deliver excitation that is orthogonal to the two opposed detection lenses.

2. The system of claim 1, wherein the light detection apparatus is further configured to combine the fluorescence beams detected via the two opposed detection lenses.

3. The system of claim 1, further comprising a non-polarizing beam splitter arranged such that fluorescence beams from the two detection lenses interfere at the beam splitter.

4. The system of claim 1, wherein the light detection apparatus further comprises a first camera arranged to detect light exiting the beam splitter in a first direction, and a second camera arranged to detect light exiting the beam splitter in a second direction.

5. The system of claim 1, wherein the excitation lens is configured to deliver lattice light-sheet (LLS) excitation to the sample from which fluorescence beams are detected via the two opposed detection lenses.

6. The system of claim 1, wherein an excitation path is orthogonal to an optical axis of the two opposed detection lenses in a 4Pi interferometric arrangement.

7. The system of claim 1, wherein an optical axis of the excitation lens coincides with a focal plane of the two opposed detection lenses.

8. The system of claim 1, wherein the light emission apparatus is configured to deliver selective plane illumination of the sample via at least one of a Bessel beam, an Airy beam, a Bessel beam array, a Gaussian light sheet, or light-sheet generation using field synthesis.

9. The system of claim 1, further comprising a plurality of additional excitation lenses, each additional excitation lens being positioned at an angle between 75 and 105 degrees with respect to the optical axis of the two opposed detection lenses.

10. The system of claim 1, wherein the system is a three-dimensional interferometric lattice light-sheet (3D-iLLS) imaging system or a three-dimensional interferometric lattice light-sheet with structured illumination microscopy (3D-iLLS-SIM) imaging system.

11. A computer-implemented microscopic imaging method comprising:
    detecting, via a processor of a computing device, fluorescence beams emitted from a sample using a light detection apparatus comprising two opposed detection lenses; and
    delivering, via the processor, excitation orthogonal to the two opposed detection lenses using a light emission apparatus comprising a plurality of excitation lenses.

12. The method of claim 11, further comprising:
    estimating, via the processor, an excitation point spread function (PSF) by computing an excitation electric field;
    determining, via the processor, a detection PSF by the electric field of single dipole emitters;
    combining, via the processor, excitation and dipole electric fields into a combined PSF; and
    performing, via the processor, a near uniform orientation sampling and averaging the combined excitation-dipole electric fields of all sampled orientations to obtain a final combined PSF.

13. The method of claim 11, further comprising determining a 3D optical transfer function (OTF), the 3D OTF comprising information about recovering Fourier components of the sample.

14. The method of claim 11, further comprising obtaining an OTF from the PSF using a Fourier transform.

15. The method of claim 11, further comprising combining, via the processor, the fluorescence beams detected via the two detection lenses using an interferometer.

16. The method of claim 11, wherein delivering excitation comprises delivering lattice light-sheet (LLS) excitation to the sample.

17. The method of claim 11, wherein an optical axis of the excitation lenses coincides with a focal plane of the two opposed detection lenses.

18. A fluorescence microscopy system comprising an objective lens arrangement having:

a first detection lens and a second detection lens opposing the first detection lens, the first and second detection lenses being configured to detect fluorescence beams emitted by a target in a sample; and a plurality of excitation lenses arranged orthogonally to the first and second lenses such that an optical axis of the excitation lenses coincides with a focal plane of the first and second detection lenses.

19. The system of claim 18, further comprising an interferometer for combining light received at the first and second detection lenses, a stage for receiving the sample to be imaged, a light source for delivering excitation beams to the sample to excite a target tagged with a fluorophore, and a non-polarizing beam splitter arranged such that fluorescence beams from the two detection lenses interfere at the beam splitter.

20. The imaging system of claim 1, configured to:

estimate, via a processor, an excitation PSF by computing an excitation electric field;

determine, via the processor, a detection PSF by the electric field of single dipole emitters;

combine, via the processor, excitation and dipole electric fields into a combined PSF; and perform, via the processor, a near uniform orientation sampling and averaging the combined excitation-dipole electric fields of all sampled orientations to obtain a final combined PSF.

\* \* \* \* \*